(12) United States Patent
Gulliksen

(10) Patent No.: US 12,050,020 B2
(45) Date of Patent: Jul. 30, 2024

(54) AIR FILTER DEVICE

(71) Applicant: Peakvent AS, Oslo (NO)

(72) Inventor: Morten Gulliksen, Oslo (NO)

(73) Assignee: PEAKVENT AS, Oslo (NO)

( * ) Notice: Subject to any disclaimer, the term of this patent is extended or adjusted under 35 U.S.C. 154(b) by 404 days.

(21) Appl. No.: 17/432,865

(22) PCT Filed: Feb. 21, 2020

(86) PCT No.: PCT/NO2020/050047
§ 371 (c)(1),
(2) Date: Aug. 20, 2021

(87) PCT Pub. No.: WO2020/171718
PCT Pub. Date: Aug. 27, 2020

(65) Prior Publication Data
US 2022/0090820 A1 Mar. 24, 2022

(30) Foreign Application Priority Data

Feb. 22, 2019 (NO) .................................... 20190246
Apr. 17, 2019 (NO) .................................... 20190522
(Continued)

(51) Int. Cl.
*F24F 13/28* (2006.01)
*B01D 46/00* (2022.01)
(Continued)

(52) U.S. Cl.
CPC .......... *F24F 13/28* (2013.01); *B01D 46/0008* (2013.01); *B01D 46/0043* (2013.01);
(Continued)

(58) Field of Classification Search
CPC ....... F24F 13/28; B01D 46/26; B01D 46/521; B01D 46/2411; B01D 46/2414;
(Continued)

(56) References Cited

U.S. PATENT DOCUMENTS 3,822,698 A  7/1974  Guy
4,244,710 A  1/1981  Burger
(Continued)

FOREIGN PATENT DOCUMENTS

CN   105124841       12/2015
CN   103990337 B     4/2016
(Continued)

OTHER PUBLICATIONS

3M Filtrete Air Filter Media Type G, GS, GSB Technical Data Sheet (Year: 1995).*
(Continued)

*Primary Examiner* — Robert Clemente
(74) *Attorney, Agent, or Firm* — Kilpatrick Townsend & Stockton LLP

(57) ABSTRACT

Air filter device comprising: one or more pleated air filters where the pleated air filters are cylindrical and designed according to the relation $Gu=f_h P_r/(2r_o \varepsilon^{0.25})>0.8$; and a motor for rotating the pleated air filters, wherein $\rho_r(r_o-r_i)/\rho_s$; $r_o$=outer radius of the cylindrical pleated filter, $f_h$=height of the cylindrical filter, $r_i$=inner radius of the cylindrical pleated filter, $p_s$=distance between two adjacent pleat tops on the inner radius, $\varepsilon$-ASHRAE efficiency.

25 Claims, 57 Drawing Sheets

(30) Foreign Application Priority Data

Jun. 14, 2019 (NO) .................................... 20190732
Nov. 15, 2019 (NO) .................................... 20191358

(51) Int. Cl.
  *B01D 46/24* (2006.01)
  *B01D 46/26* (2006.01)
  *B01D 46/52* (2006.01)
  *B01D 46/64* (2022.01)

(52) U.S. Cl.
  CPC ......... *B01D 46/2414* (2013.01); *B01D 46/26* (2013.01); *B01D 46/521* (2013.01); *B01D 46/64* (2022.01)

(58) Field of Classification Search
  CPC ............... B01D 46/0056; B01D 46/64; B01D 46/0008; B01D 46/0043; B01D 46/0049; B01D 46/0005
  See application file for complete search history.

(56) References Cited

U.S. PATENT DOCUMENTS

| | | | |
|---|---|---|---|
| 4,629,482 A | 12/1986 | Davis | |
| 4,901,716 A | 2/1990 | Stackhouse et al. | |
| 5,054,479 A | 10/1991 | Yelland et al. | |
| 5,641,343 A | 6/1997 | Frey | |
| 5,683,478 A | 11/1997 | Anonychuk | |
| 5,997,619 A | 12/1999 | Knuth et al. | |
| 6,004,365 A | 12/1999 | Flacco | |
| 6,277,176 B1* | 8/2001 | Tang | F04D 29/388 55/467 |
| 6,361,590 B1 | 3/2002 | Gilbert, Jr. et al. | |
| 6,471,738 B1 | 10/2002 | Thompson | |
| 6,517,612 B1* | 2/2003 | Crouch | B01D 63/16 55/528 |
| D497,985 S | 11/2004 | Christianson | |
| 7,083,659 B1 | 8/2006 | Joyce et al. | |
| 9,283,505 B1 | 3/2016 | Rossnagel | |
| 2002/0069626 A1* | 6/2002 | Fiacco | F04D 25/088 55/471 |
| 2007/0050898 A1 | 3/2007 | Larson et al. | |
| 2009/0183472 A1 | 7/2009 | Amano | |
| 2009/0266361 A1 | 10/2009 | Bilger et al. | |
| 2015/0336033 A1 | 11/2015 | Neitzel | |
| 2017/0266599 A1 | 9/2017 | Lin | |
| 2018/0169556 A1* | 6/2018 | Parikh | B01D 46/26 |
| 2018/0185778 A1* | 7/2018 | Barreteau | B01D 45/14 |
| 2019/0039008 A1 | 2/2019 | Ike | |

FOREIGN PATENT DOCUMENTS

| | | |
|---|---|---|
| CN | 105919212 | 9/2016 |
| CN | 106390656 A | 2/2017 |
| CN | 107013997 | 8/2017 |
| CN | 107614083 A | 1/2018 |
| CN | 109595706 A | 4/2019 |
| DK | 200700488 A | 9/2008 |
| EP | 1027129 | 2/2006 |
| GB | 2448522 | 10/2008 |
| JP | 2009202051 A | 9/2009 |
| SU | 959806 A1 | 9/1982 |
| SU | 1674920 A1 | 9/1991 |
| WO | 1999020369 A1 | 4/1999 |
| WO | 2000006288 A1 | 2/2000 |
| WO | 0110537 A1 | 2/2001 |
| WO | 2007079220 | 7/2007 |
| WO | 2009061998 | 5/2009 |
| WO | 2011159233 | 12/2011 |
| WO | 2017074954 | 5/2017 |
| WO | 2019106331 | 6/2019 |

OTHER PUBLICATIONS

RU2021127628, "Search Report", Jun. 22, 2023, 2 pages.
PCT/N02020/050047; International Seach Report and Written Opinion; Apr. 14, 2020; 14 pages.
IN202147042619, "First Examination Report", Apr. 19, 2023, 6 pages.
Application No. EP20759716.2, Extended European Search Report, Mailed on May 24, 2023, 7 pages.
NO20190732, "Search Report", Dec. 5, 2019, 3 pages.
NO20191358, "Search Report", Jun. 5, 2020, 2 pages.
NO20200240, "Search Report", Sep. 24, 2020, 3 pages.
Application No. PCT/NO2020/050047, International Preliminary Report on Patentability, Mailed on Sep. 2, 2021, 10 pages.
Application No. PCT/NO2020/050158, International Preliminary Report on Patentability, Mailed on Dec. 23, 2021, 10 pages.
AU2020226138, "First Examination Report", Jan. 31, 2024, 4 pages.

* cited by examiner

Residential usefulness
(A function of: Size, Noise, CADR, price)

Prior art - no discovery of outstanding performance at Gu=0,8. Also running at too high RPM.

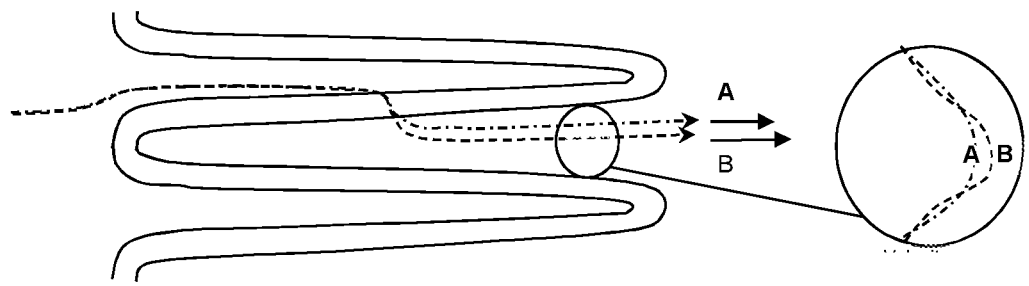
I - The corridor effect (Discovered) are lower during spin (A) and higher in a static filter (B)
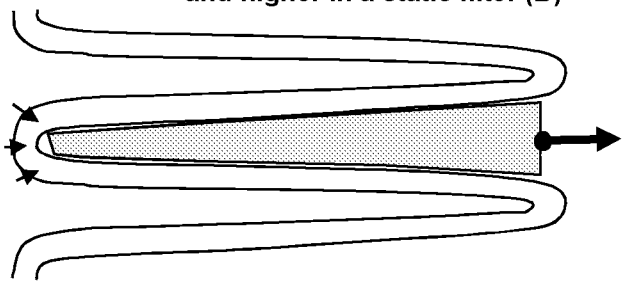
II - Column effect
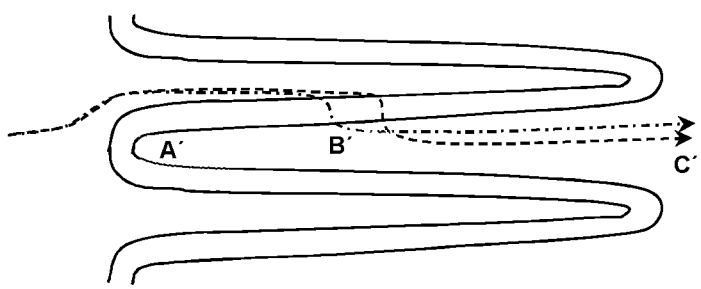
III - Result of column effect and corridor effect
Fig. 18

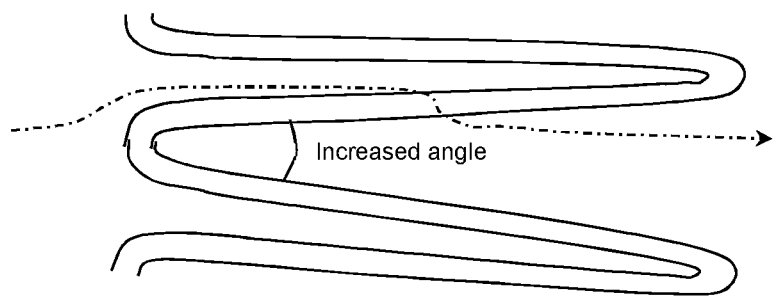
IV - Cylindrical shape: Widening exit channel reduces exit velocity. Pressure build up and corridor effects are reduced.
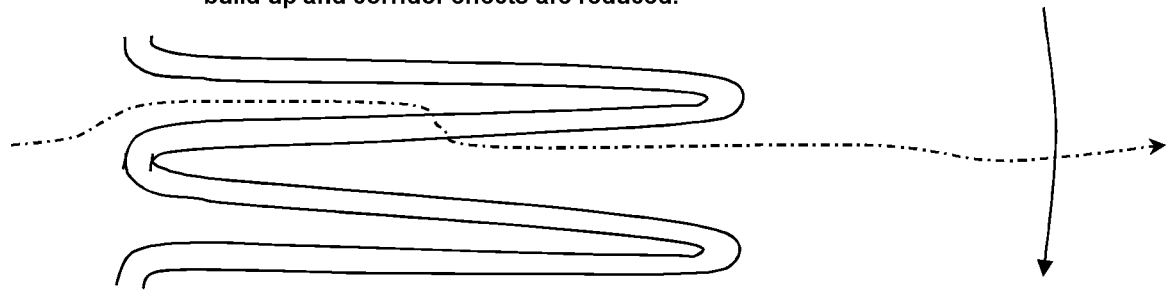
V - Spinn outside exit channels promotes suction/pull and reduces final exit velocities and hence energy loss. This increases the efficiency of the system.
Fig. 19

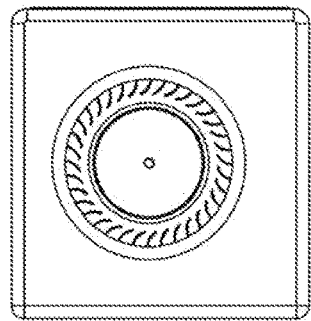
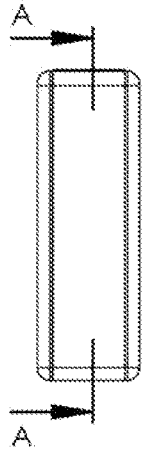
Fig. 21A
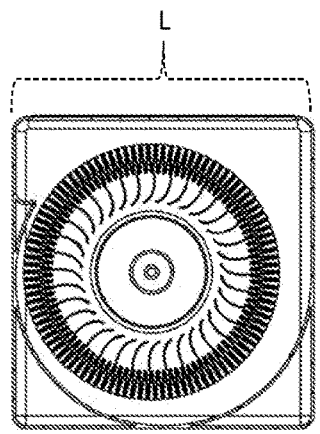
SECTION A-A
Fig. 21B
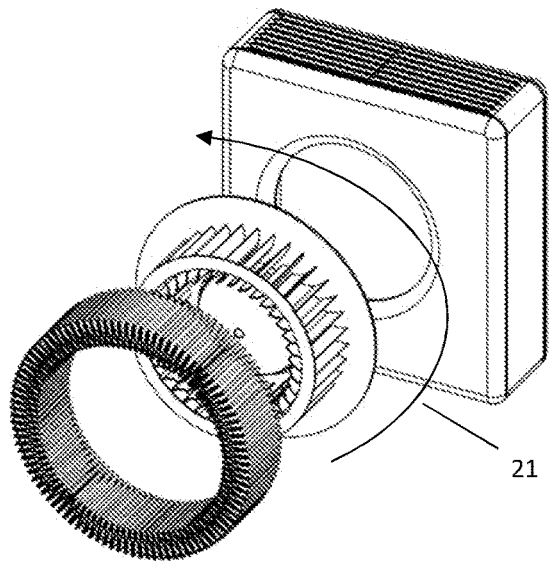
Fig. 21C

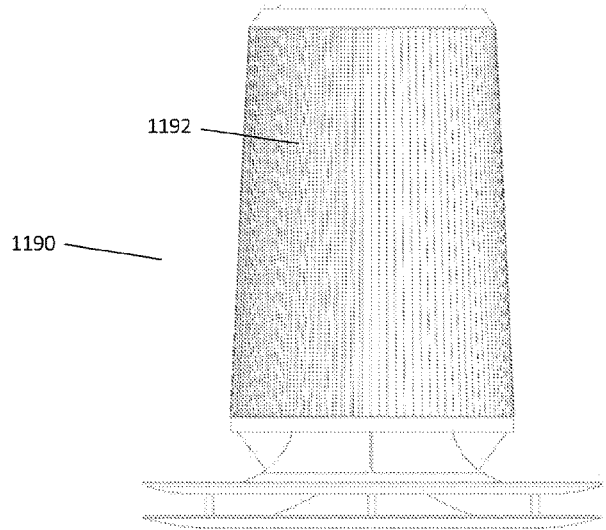
Fig. 119A
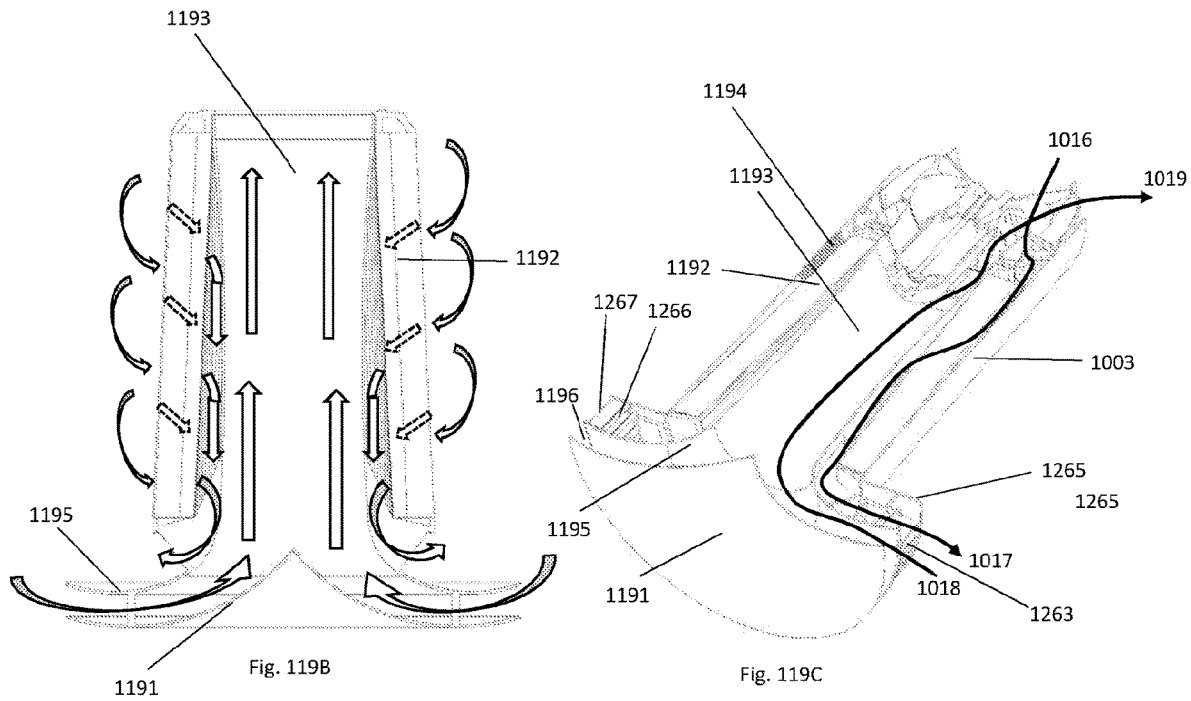
Fig. 119B
Fig. 119C

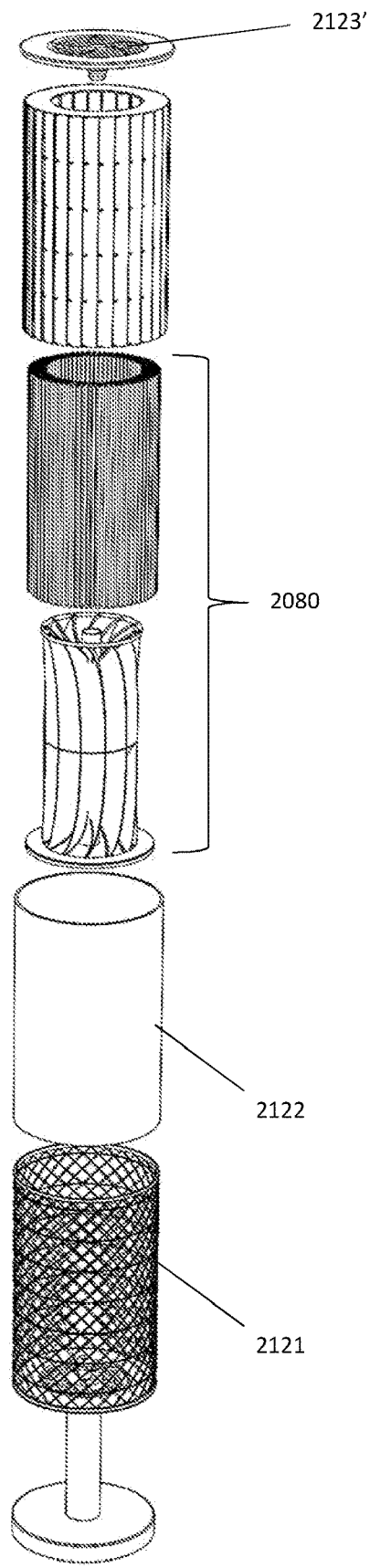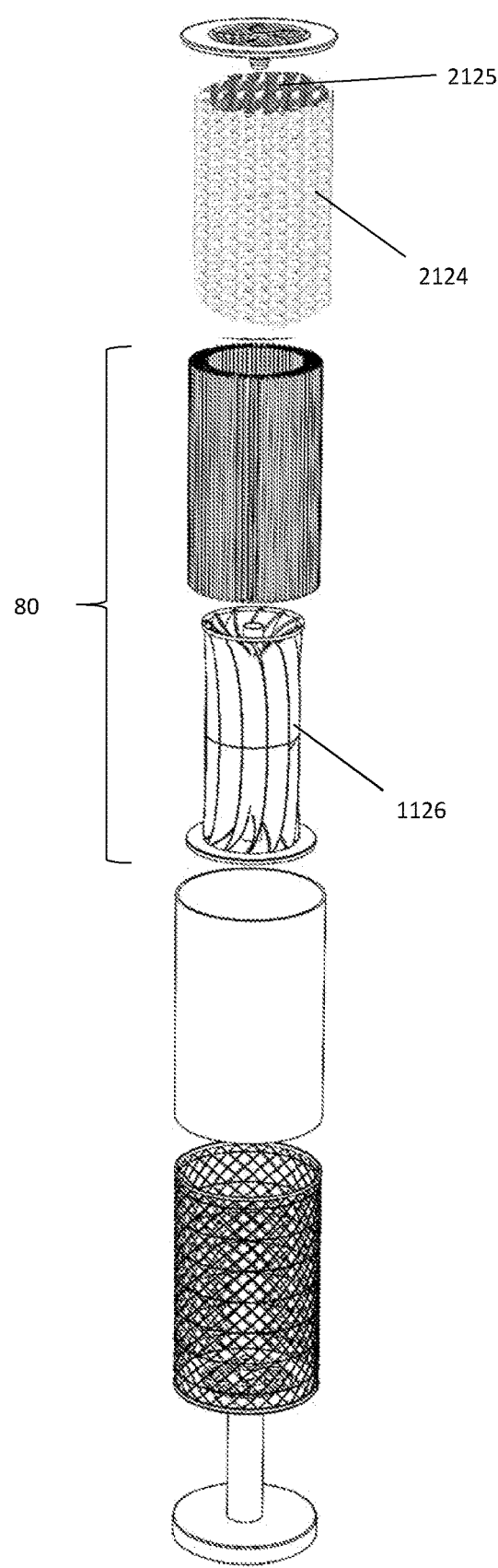
Fig.212A
Fig.212B

AIR FILTER DEVICE

CROSS-REFERENCE TO RELATED APPLICATIONS

The present application is a 35 U.S.C. § 371 National Stage patent application of International Patent Application PCT/NO2020/050047, filed on Feb. 21, 2020, which claims priority to Norwegian Patent Application No. 20190246 filed Feb. 22, 2019; Norwegian Patent Application No. 20190522 filed Apr. 17, 2019; Norwegian Patent Application No. 20190732 filed Jun. 14, 2019; and Norwegian Patent Application No. 20191358 filed Nov. 15, 2019 the contents of which are hereby incorporated by reference in their entirety for all purposes.

TECHNICAL FIELD

The present invention relates to air purifying. In particular, the invention relate to air filter construction, assembly and operation, and how to reduce noise and power consumption, without compromising flow rate and filter efficiency.

BACKGROUND

Devices for increasing air quality are traditionally made by providing air flow through a filter. Air purifier performance is defined by the air flow ($m^3$/hour) and the filter efficiency or ability to capture micro dust. The product of these two parameters are known as the Clean Air Delivery Rate (CADR). Another significant parameter is noise. Noise mainly develop when air passes rotating fan blades, and when high velocity air hits sharp edges. Device design is typically optimized for fan efficiency, flow throughput, degree of filtration or filter efficiency, production cost, space occupancy and noise emission. These properties are often in conflict, and tradeoffs has to be made. Noise is a parameter that is important when devices are operating inhouse or close to people, and the demand for low noise will be in direct conflict with the filtering performance of the product.

Another important challenge is that the efficiency of traditional air fan units seldom are higher than 50%, which has severe impact on filtering power consumption and noise. Filters require frequent replacement, and there is a cost balance between pressure build up which increases the power consumption of the fans in order to sustain the flow, and the cost of changing the filter. The handling of noise is also a big issue in ventilation, and noise dampers in ventilation systems also requires space.

In view of this situation, the present invention are an enabler for filtering sufficient volumes of air while occupying less space, with less power consumption, and less noise.

The present invention reduce the conflicts and enables device designs having higher CADR values and lower noise emissions at a lower power consumption than any traditionally same sized air purifying device on the market.

A reduction in the size and noise of filter assemblies and air purifying systems also opens up for new and more efficient design of air purifying devices and ventilation systems.

By reducing the power consumption of the filtering systems, the present invention provides environmental friendly substitutes for today's available technologies.

By combining the present air filtering and purifying system with efficient heat exchange systems, the present invention opens for even greater power savings.

The present invention builds on and claims priority to three earlier patent applications which are hereby copied in its whole, and is recited at the end of this document wherein figure references are renumbered by adding 1000 in first and second priority application and 2000 in the third, and figure numbers by 100 and 200 correspondingly.

SUMMARY OF THE DISCLOSURE

The innovation contributes to enhance the flexibility, economy, power- and size-efficiency and noise reduction in air filtering and ventilation design. The invention makes this contribution through providing an air purifying system comprising a rotating pleated filter assembly or assemblies, optionally combined with a unique fan- and heat exchanger design. Furthermore, the system may be module based such that it may comprise several filter units arranged in easy replaceable modules typically used in larger installations. A main principle of the present invention is that air entering the rotating pleated filter assembly is spinned and propelled simultaneously as the air is filtered. This allows increased flow throughput and smaller product designs. The air filtering in the present invention saves energy, partly by consuming the energy needed for filtering simultaneously as the energy is gained through a centrifugal field, almost without turbulent loss, and partly by utilizing newly discovered fluid dynamic effects taking place during spinning of pleated filters. The invention contributes to a massive improvement in air filter/fan capacity, noise reduction and many other features, and may impact the future design strategies related to air purifying and ventilation.

BRIEF DESCRIPTION OF THE DRAWINGS

In order to facilitate understanding of the invention and explain how it may be worked in practice, non-limiting examples will be described with reference to the accompanying drawings, in which:

FIG. 18 shows corridor and column effects through pleated filter FIG. 19 illustrates pleats in cylindrical filter in—air passage FIG. 20A internal view of 2 Pleated filter assemblies arranged in a floor model frame FIG. 20B floor model assembly, with protecting vents and static air barriers for inflow sides FIG. 20C floor model assembly, with protecting vents for inflow sides FIG. 20D floor model assembly with exit vents and internal assembly as shown in FIG. 20A without pre filters and carbon filters at the entrance FIG. 21A illustrate a single impeller upward throwing embodiment of the filter assembly seen from the front and side FIG. 21B illustrated a cross section view of the embodiment in FIG. 21A FIG. 21C illustrates an exploded view of a filter of FIG. 21A

DETAILED DESCRIPTION

Figure 1:
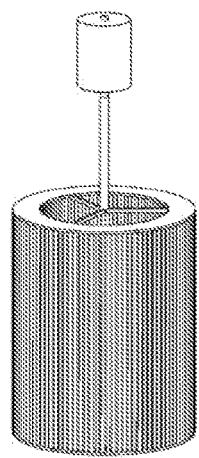
FIG. 1 illustrates a first embodiment of a rotating pleated filter.

In the following description of various embodiments, reference will be made to the drawings, in which like reference numerals denote the same or corresponding elements. The drawings are not necessarily to scale. Instead, certain features may be shown exaggerated in scale or in a somewhat simplified or schematic manner, wherein certain conventional elements may have been left out in the interest of exemplifying the principles of the invention rather than cluttering the drawings with details that do not contribute to the understanding of these principles.

It should be noted that, unless otherwise stated, different features or elements may be combined with each other whether or not they have been described together as part of the same embodiment below. The combination of features or elements in the exemplary embodiments are done in order to facilitate understanding of the invention rather than limit its scope to a limited set of embodiments, and to the extent that alternative elements with substantially the same functionality are shown in respective embodiments, they are intended to be interchangeable. For the sake of brevity, no attempt has been made to disclose a complete description of all possible permutations of features.

Furthermore, those with skill in the art will understand that the invention may be practiced without many of the details included in this detailed description. Conversely, some well-known structures or functions may not be shown or described in detail, in order to avoid unnecessarily obscuring of relevant description of the various implementations. The terminology used in the description presented below is intended to be interpreted in its broadest reasonable manner, even though it is being used in conjunction with a detailed description of certain specific implementations of the invention.

In this document the phrases "pleated air filter" and "pleated filter" are used as synonyms of the same filter. It should be generally understood to mean the same unless specifically explained otherwise.

The document defines some size and relations, and although not always specified, it should be understood that all sizes and quantities are mentioned in SI units.

The present invention provides several aspects that can be combined into a system for improved air filtering and ventilation. A first aspect relates to the design of the pleated filter and the air moving features it provides when rotating around a longitudinal axis.

The scope of the present invention is further to utilize the combination of several physical phenomena that all enhance the most important characteristics of a filter assembly and operation of such: Low air permeability, low power consumption, low noise and high efficiency. A pleated filter is advantageous due to the large filter area it represent. A radially designed pleated filter represent an even larger area due to the small footprint of such a geometry. Further it has been discovered that several fluid dynamic effects worked in a positive way when a pleated filter media is rotated.

One of these so far unreported effects increase filter efficiency by trapping particles more effectively due to particle acceleration transverse to the flow through the pleated media. The effect is more significant for larger particles and hence powerful for coarser filters.

Another of these effects are what in this document has been called the "column effect": While spinning, centrifugal forces pull the entire column of air in the exit channels creating a suction in the bottom of the exit channel. Depending upon the specific design of the pleats and media permeability, a spinning pleated filter may experience more even pressure over the filter media which promotes more flow through the innermost part of the exit channel compared to when driving the air through a static filter assembly. More even flow reduces the overall pressure over the filter media and promotes easy flow. The pressure drop in the inlet channel is not discussed, but this is important for understanding the whole picture. CFD analysis is used to confirm the anticipated effects.

The "Corridor effect" is defined for pleated filter in this document and have the following meaning and explanation:

In the case of a static pleated filter: Air molecules entering the exit channel normal to exit channel are partly accelerated by the high velocity core flow B, as seen in FIG. 18, which in turn, are accelerated by a super pressure in the bottom of the exit channels. The resulting increased pressure, compared to that of a parallel flow situation, is thus postulated as the Corridor effect. This effect has been confirmed by CFD simulation. In a case when pleated filter 2 are spinning, this effect is difficult to distinguish from the corridor effect, however it is assumed that in the case of spinning pleated filter centrifugal forces pull/accelerate the newly fed air molecules A together with the air column, hence the air velocity of the exit channel core can be somewhat lower in order to exit the same amount of air. The Corridor effect is then reduced and a more uniform velocity profile occur at the outlet, reducing the pressure drop in the exit channel. Efficiency is increased with less viscous loss and loss of kinetic energy in the exit jet. With wide exit channels and high filter media velocities at low media permeability, the corridor effects becomes very important.

Figure 3A:
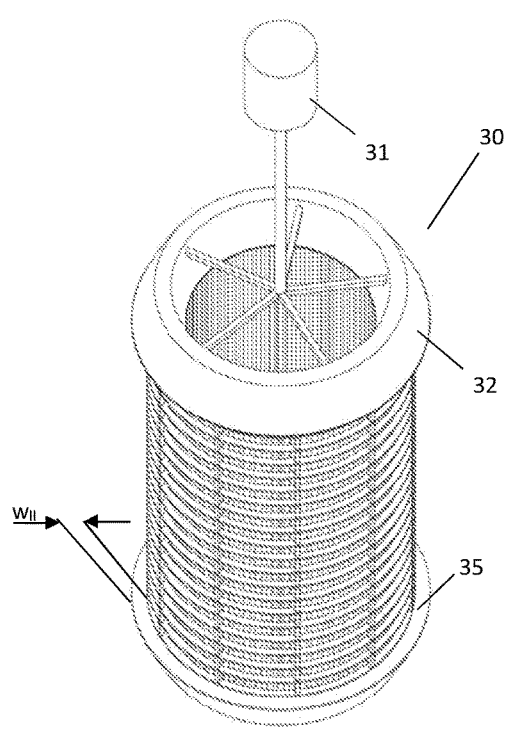
FIG. 3A illustrates a filter embodiment for mounting to a ceiling point
Figure 3B:
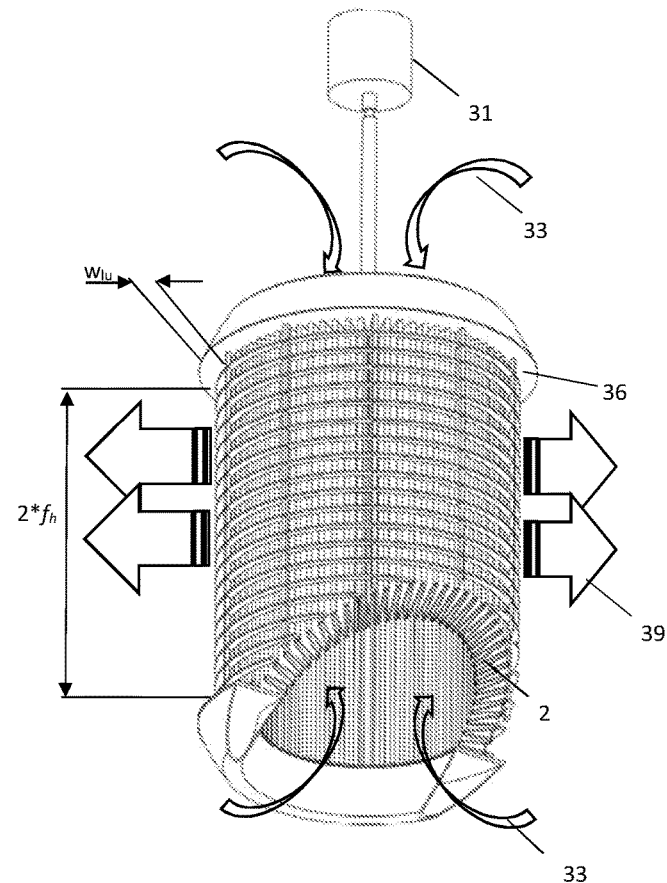
FIG. 3B illustrates the air flow through the filter of FIG. 3A, and a small portion of the figure in a cross section to illustrate the pleated air filter construction FIG. 3C show the assembly of FIG. 3A with additional air flow directors

The Suction instability effect: The air leaves the rotating cylindrical pleated filter 2 with energy that gives rise to an instability. Because along with rotating exit flow 39, there also comes a suction, and this suction pulls ambient air in from the sides from the pleated filter ends towards the longitudinal middle section, longitudinally outside the pleated filter 2. This again results in a gathering of rotating air at the middle section with a following increased suction over this middle section. When the filter has two openings, too much of the entering air 33 therefore finds it easier to continue to the mid section rather than distributing evenly longitudinally into the pleats which is preferred for optimal filter function. To recover the dynamic energy of rotating exiting air to pressure and ensure an even distribution, the present invention add air barriers/end ledges 35,36 as seen in FIGS. 3A and 3B. The ledges 35, 36 hinder ambient air from disturbing and mixing into the pressure recovering spinning field in the exit space outside the spinning pleated filter. At typical filter 2 permeability and ledges as shown, this technique recovers and converts approximately 50% of the energy in the tangential velocity at $r_o$ to a suction pressure, hence promoting the filter flow and increasing efficiency of the system. By making the ledges 34, 34" longer as seen in FIG. 3C and if the lower ledge 34" where mirror shaped relative the upper ledge 34 (not shown) like approaching each other with cymbals like shapes, the effective cross sectional area of the exiting air can be controlled so that even more pressure is recovered.

Figure 3C:
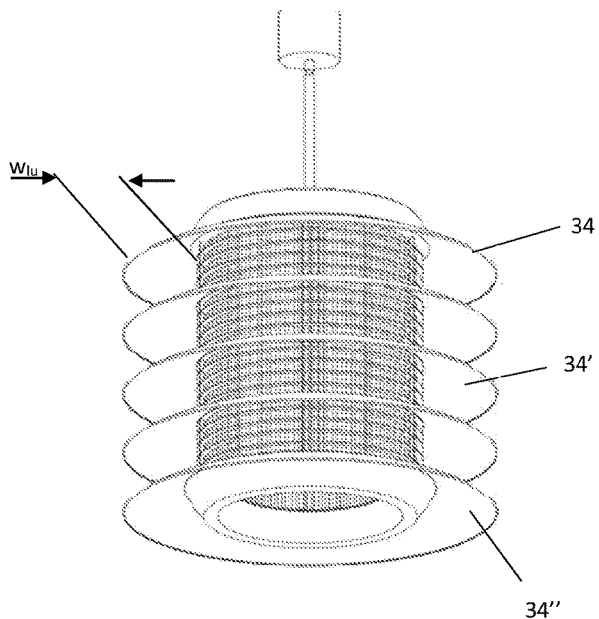
FIG. 3D illustrates air flows around the filter assembly of FIG. 3C
FIG. 3E is an example of adjustable rotating air directors FIG. 3F show a set of radial impeller blades with a forward angle of attack

FIG. 3C shows further optional air directing collars 34' for directing and further stabilizing exiting air flow. These air directing collars 34' may be arranged and positioned by user depending on user need.

Figure 3D:
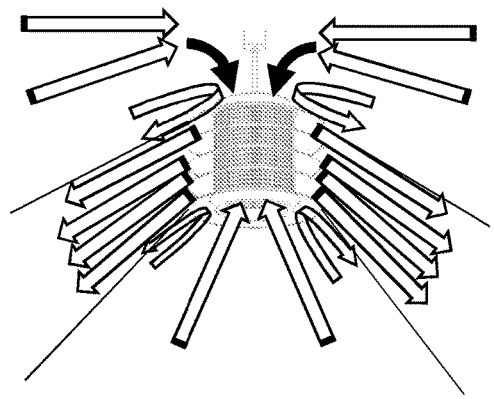

FIG. 3D illustrates air flows into and out of the pleated filter assembly shown in FIG. 3C.

The filter device feature is demonstrated in three example embodiments of the present invention in FIGS. 3A-C and 4A-K. Spinning exiting air from the filter 2 and centrifugal forces generates a significant suction effect enhancing the flow throughput. To avoid reduction of this suction by feeding air that impose ambient pressure, the ledges 34, 34", 35, 36 is provided at the longitudinal ends of the filter 2 establishing a physical air barrier between the outside ambient pressure and the air exiting the outer radius of the air filter 2. The ledges 34, 34", 35, 36 will hinder the ambient air to reach the outlet of the filter 2 where it normally would impose and define its pressure. Instead the ambient exert its pressure after the jets have started burning out and the spin of the exit air is reduced. In this area, reaching some centimeters out radially, the flow cross section has increased. Conservation of the flow implies that the flow have de-accelerated and the pressure consequently have increased according to the Bernoulli equation if the viscous loss in the turbulence could be disregarded. In practice this happens in a chaotic turbulent jet where also the tiny jets from the pleats contribute. Even though the ledges increase over all flow in the system by modest 13% with short ledges, the most important role of the ledges is to make an even flow utilizing the whole filter also in the Z-direction, longitudinal direction, which also increases the filter life significantly. The instability is sufficiently hindered with the size and shape shown in FIG. 4 A-H.

Figure 4A:
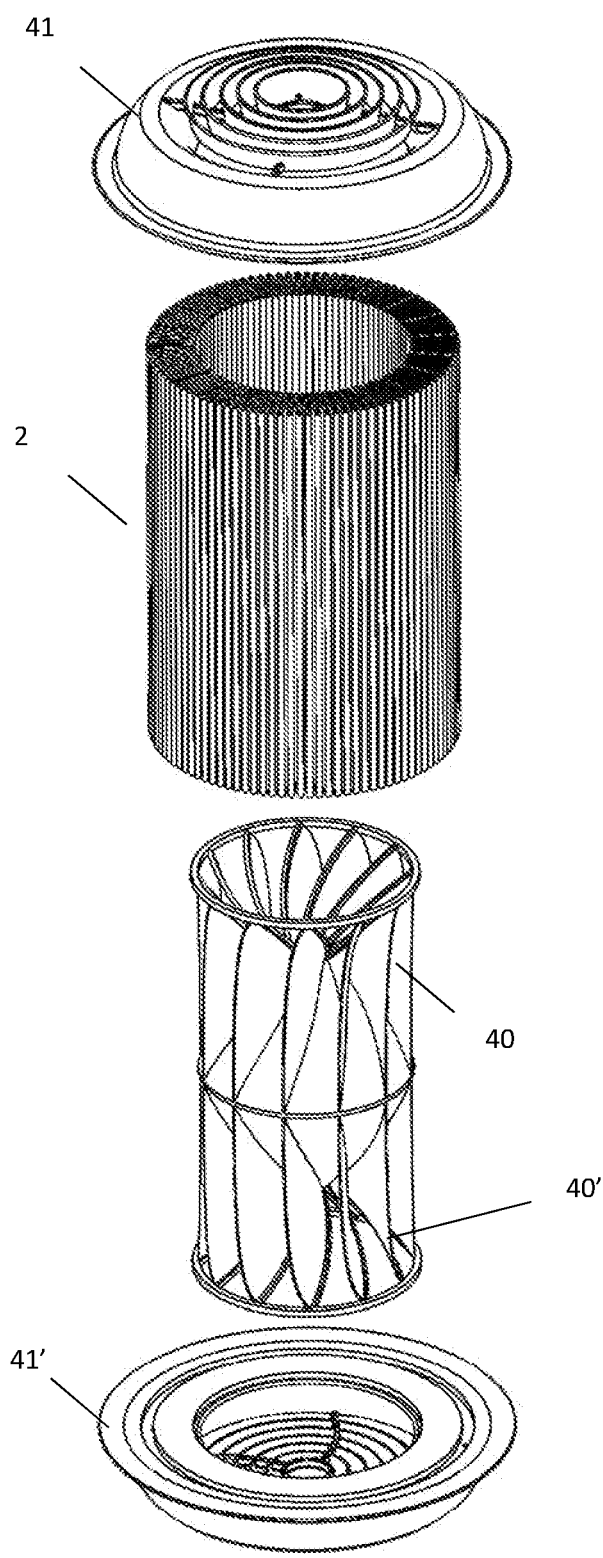
FIG. 4A illustrates an exploded view of a filter assembly comprising an axial to radial fan to be arranged inside the filter FIG. 4B Illustrates an embodiment of the filter assembly of FIG. 4A
Figure 4B:
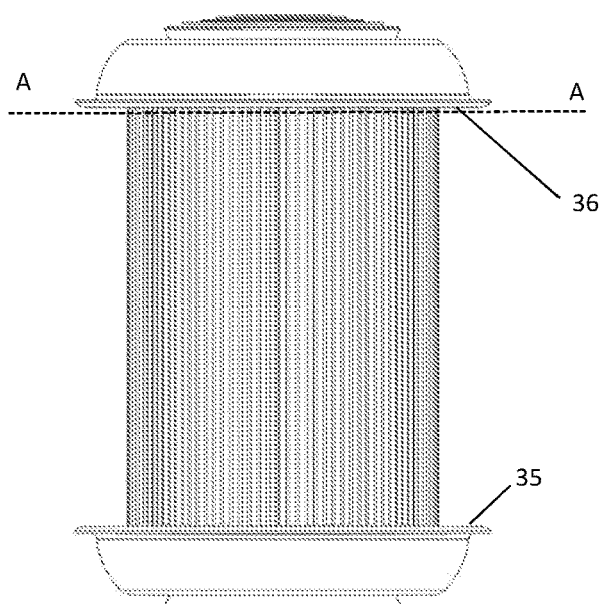
FIG. 4C is an oblique view of filter assembly of FIG. 4B
FIG. 4D is a cross section of filter assembly of FIG. 4B
FIG. 4E is a top view of the cross section A-A in FIG. 4B FIG. 4F Illustrates and further embodiment of the filter assembly of FIG. 4A
FIG. 4G is an oblique view of filter assembly of FIG. 4F
FIG. 4H is a cross section of filter assembly of FIG. 4F
FIG. 4I is a side view of outside static lamellas for controlling exiting spin field
FIG. 4J is a cross section view of the outside static lamellas as shown in FIG. 4I
FIG. 4K is a top view of the outside static lamellas as shown in FIG. 4I
Figure 4C:
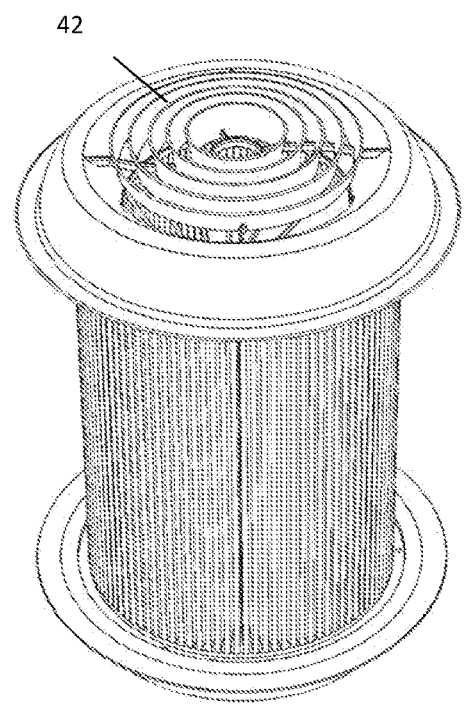
Figure 4D:
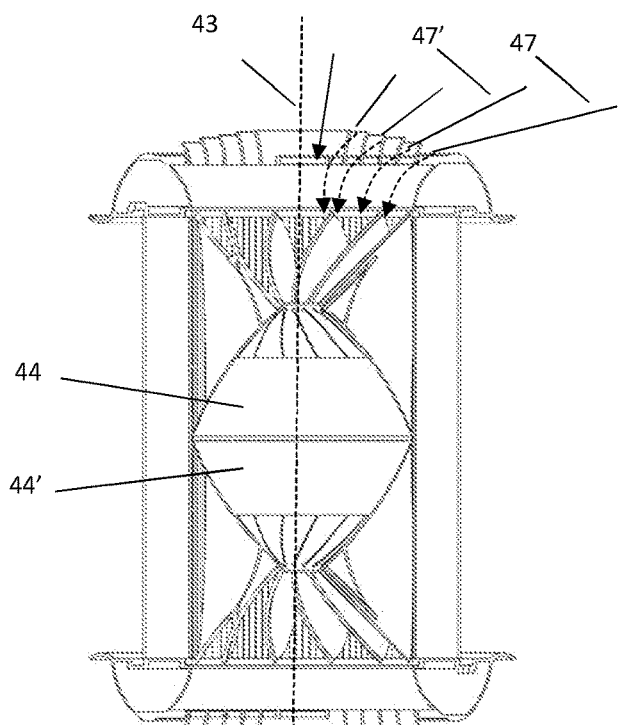
Figure 4E:
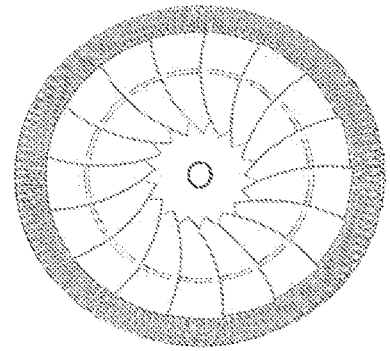
Figure 4F:
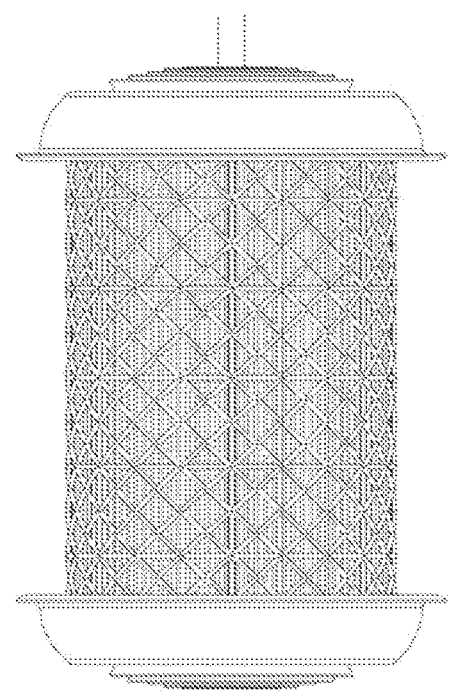
Figure 4G:
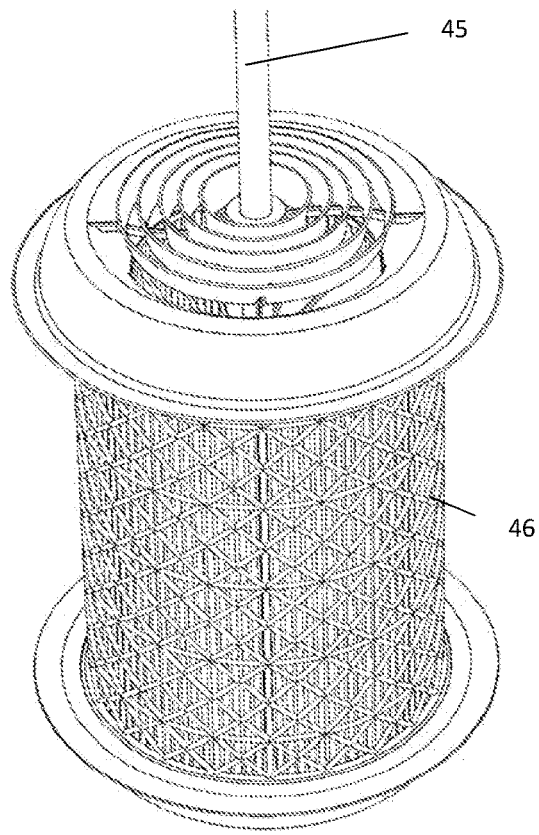
Figure 4H:
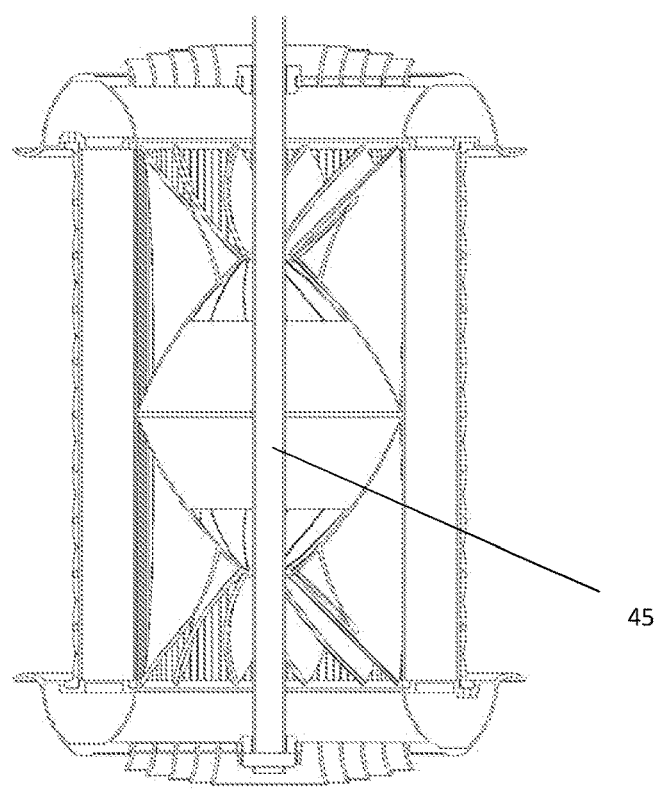
Figure 4I:
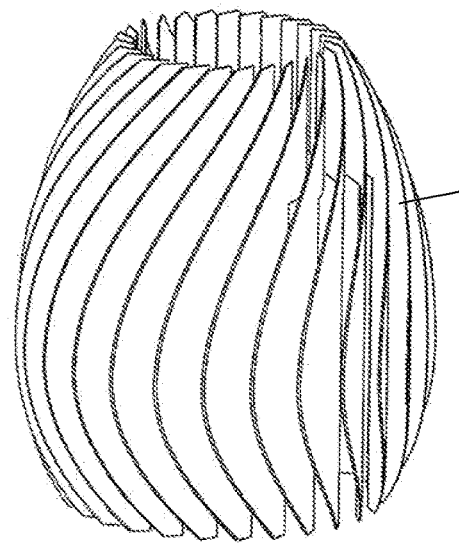
Figure 4J:
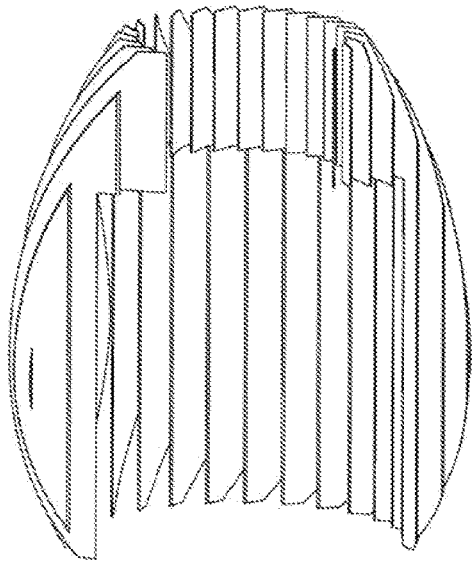
Figure 4K:
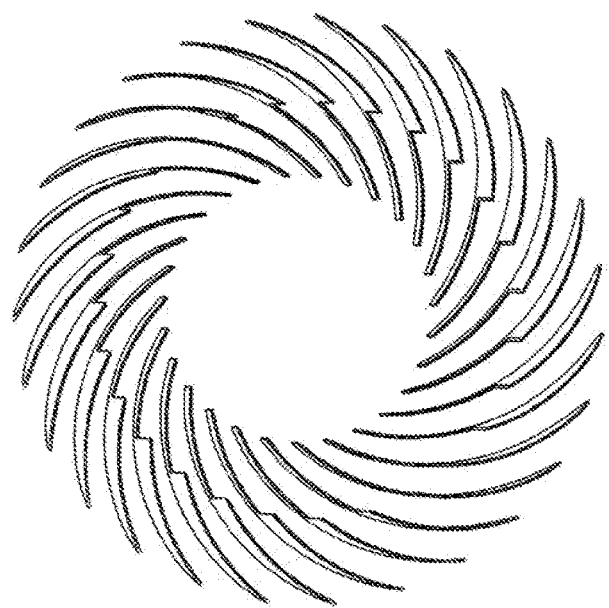
Figure 5A:
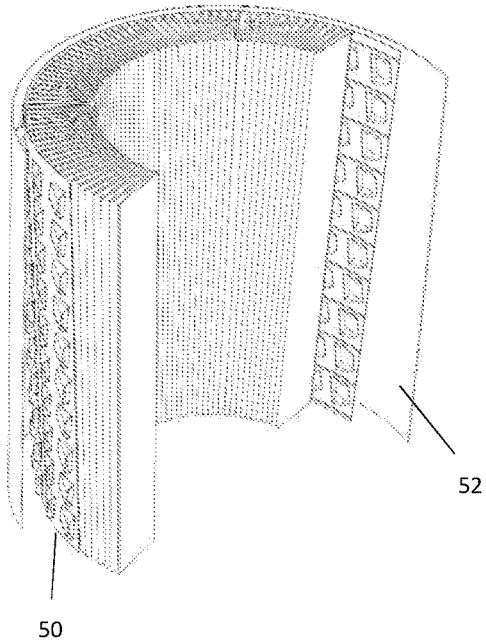
FIG. 5A is a cross section view of a first half of a slightly coned rotating pleated filter with outside mounted air directing foil, and air channel sleeve FIG. 5B same as 5A from a different view angle.
Figure 5B:
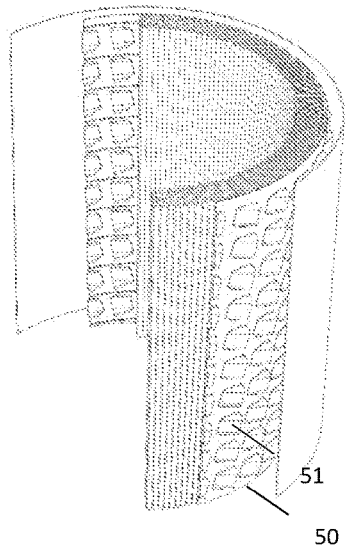

Adding a set of static arranged longitudinal lamellas 48, encircling the rotating cylindrical formed pleated filter, as illustrated in FIG. 4I-K, reaching radially outwards and tangential in the direction of the exiting air flow, may further improve the suction effect and the overall flow rate.

There is also a hydrodynamic shock of negative pressure after the air enters the end openings in the z-direction of the cylindrical pleated filter 2 along the rotational axis 20, making it hard for the filter close to the opening to suck it out radially. To help overcome this an air director inlet vent is arranged before the entrance area where incoming air is directed in the z-direction.

Figure 3E:
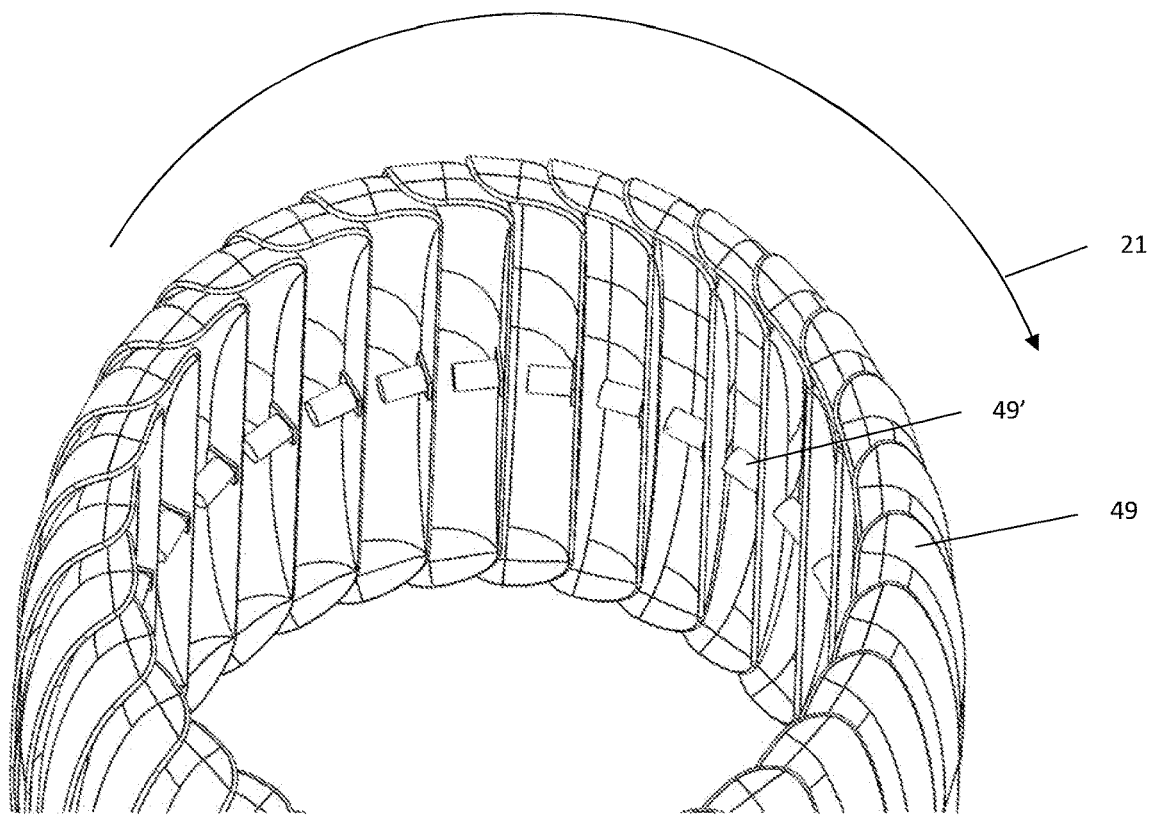

The rotating pleated air filter may as seen in some embodiments have stabilizing or reinforcement details 46, 2035 for upholding the filter shape when in use. The reinforcement may also hold other outside elements of the pleated filter. The outside elements may be a set of tiltable capsule formed blades 49 as shown in FIG. 3E forming air channels with exit jets in-between for direction exiting air in preferred angles relative the horizontal plane. These capsule formed blades 49 is provided with a capsule formed blades connector element 49' at a longitudinal middle on the inside of each capsule formed blades. This capsule formed blades connector element 49' may be provided in various embodiments, and the specific embodiment illustrated is a pivot pin 49'. Each pivot pin is formed to be gripped by a corresponding gripping element (not shown) on the middle section of the outside of the pleated filter. This connection may be provided in a click on/click off fashion, and the pivot pin 49' may when capsule formed blades 49 are mounted to provide a way to change the angle orientation of the capsule formed blades 49 around the pleated filter. In one position the capsule formed blades are resting towards the pleated filter at the lower region of the capsule formed blades 49, opening up at the upper part so that the jets mainly escape there. This position is typically chosen wintertime to let the swirl of air go upwards so it will not disturb people. In the second of the bi-stable positions while spinning, the upper region rests towards the pleated filter while opening the jets on the lower parts so that swirling air spins downwards to provide an cooling effect like a smooth air fan when it's hot. When one portion rests towards the pleated filter the other end will be positioned radially out from the pleated filter, and the air will more easily exit from these regions. Depending on the pivot resistance of the pivot pin 49' connection, changing the position may simply be achieved by holding the finger super light towards the preferred side of the capsule formed blades 49 while rotating.

Figure 209:
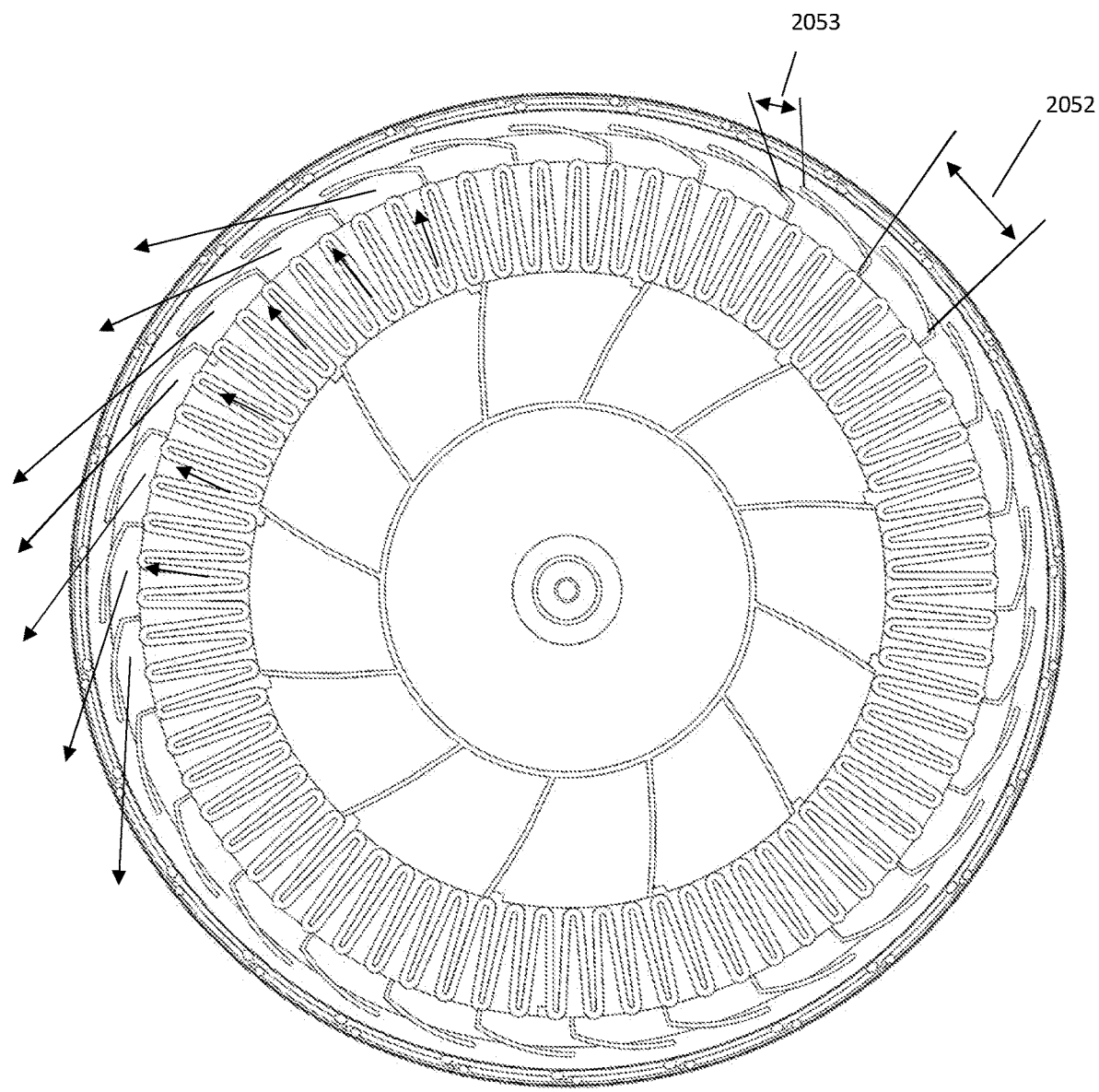

The outside elements may be a set of longitudinal fan blades extending outwards from the cylindrical pleated filter 2. In one embodiment the longitudinal fan blades 144 extends perpendicularly out of the cylindrical pleated filter 2, and in a different embodiment the outside fan blades are arranged to provide a jet effect by being arranged to have a generally tangential direction relative the outside of the cylindrical pleated filter 2 as seen in FIG. 209. Variations of the outside radial fan blades may be used to improve desired effects, also including a more encircling form, similarly to the form that is shown in FIG. 4K of the static longitudinal lamellas 48, adding a visual aspect of the spinning cylindrical pleated filter 2.

The present invention provides an important filter effect influencing the power consumption coming from the propelling of both dust particles and air into a rotating pleated filter. Compared to an air supply system where a fan works in combination with a static filter, the turbulent hydrodynamic energy loss or the fan loss, is almost eliminated. As a result the power consumption is significantly reduced. Compared to products with similar function and size, power consumption is reduced with 40-90%.

Figure 2A:
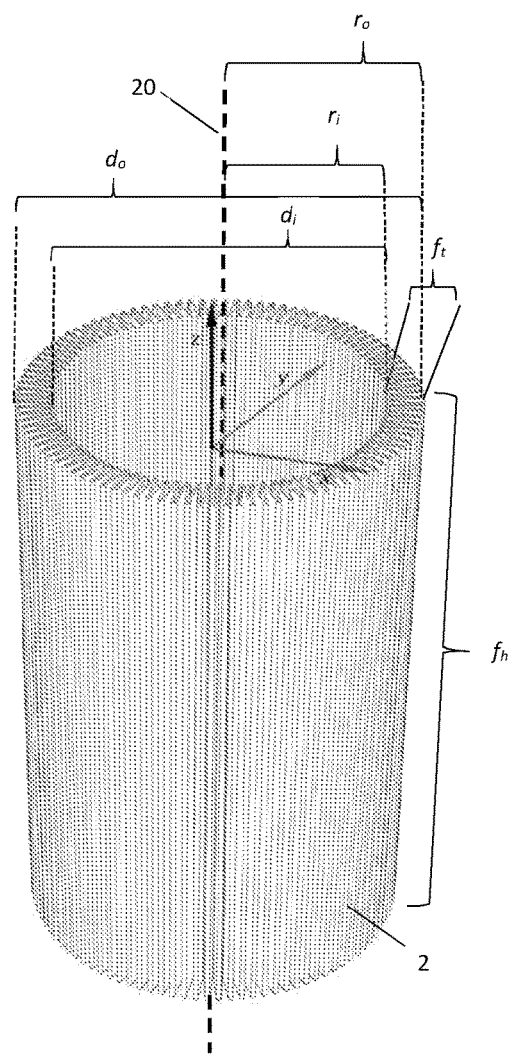
FIG. 2A illustrates a cylindrical formed pleated filter seen at an oblique angle
Figure 2B:
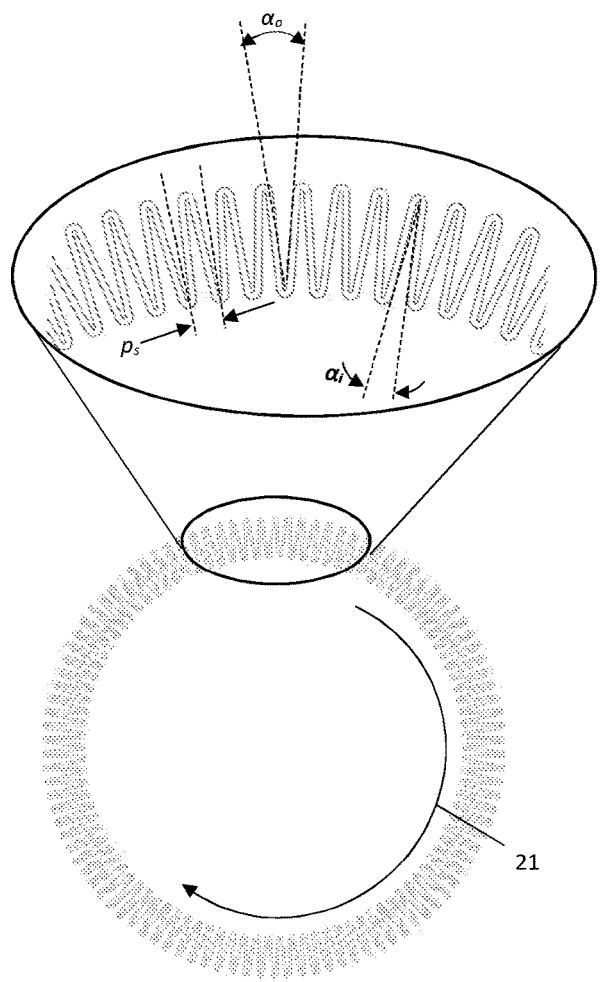
FIG. 2B is the filter in FIG. 2 seen from above with a section of the pleats enlarged

Reference is made to FIG. 2A and FIG. 2B, which shows a pleated filter having a longitudinal cylindrical shape.

The filters of present invention provides a certain ratio between the inner radius $r_i$ and the outer radius $r_o$ of the filter, and between the inner radius $r_i$ and the length $f_h$ along the rotational axis 20. If the inner radius $r_i$ is to large, and the RPM too high, like if a filter was placed in a centrifugal fan of a flat room heat convector, the entering air would hit the pleats too hard, and energy is spoiled in in turbulence and noise instead of building up pressure. In such a case, in order to obtain sufficient centrifugal driving pressure overcoming the pressure drop of the filter, the outer radius $r_o$ could be chosen larger, however since the tangential exit velocity scales with r, this results in too much energy input to the spinning exiting air. On the other hand, too small inner radius $r_i$ of the pleated filter result in small entrance area into the channels in the pleated filter that result in high air inflow velocity that makes it hard to feed the filter portion close to the entrance, resulting in uneven filter use. The same negative effect from high air inflow velocity can be seen when air is fed from just one of the filter openings. Further negative effects with one opening is that it requires greater motor torque to maintain the performance which in turn requires a larger and more expensive motor.

The usefulness of different embodiments of rotating pleated filters depend upon a series of measures or parameters that might be weighted differently for the different embodiments. The product size is of importance for most customers and the price increase following a large product is also of importance. Other vital parameters, when used in air purifiers, are the noise and clean air delivery rate (CADR). The latter is often defined as the floor area the air purifier can cover. After studying the range of available prior art air purifiers thoroughly, as well as the intricate physics holding the key to the potential of the rotating pleated filter, it has been discovered that it is possible to define a new relation that surprisingly well describes the commercial usefulness of the rotating pleated filter of present invention as an air purifying element.

For appropriate operation without other functioning pressure improving parts attached, the relationships between $r_i$, $r_o$, pleat spacing $p_s$, filter efficiency $\square$ and height $f_h$ of the spinning pleated filter can be expressed by the dimensionless number which hereby has been denoted as the Gu number. The number apply also for rotating pleated filters used in ventilation systems.

The relation is phenomenological and empirical based and derived through CFD (Computational Fluid Dynamics) simulations, 3D printing and measurements on numerous models as well as testing different filters. The Gu number is defined as:

$$Gu \text{ number} \equiv f_h * p_r / (2 * r_o * \square^{1/4})$$

Where $r_o$ may represent the outer pressure generating radius spanning over an optional additional filter, such as for example a carbon filter. $p_r$ is defined by: $(r_o-r_i)/p_s$, where $p_s$ is the pleat spacing. The precision of the Gu number is more accurate in the growth interval of the usefulness level, however as system scales the boundary layer need to be accounted more properly for better precision. These considerations will be investigated as the present invention is further developed. It is assumed that smaller systems than tested will underperform. In practice also the larger will underperform since it is not expedient to spin very thick filters. As the Gu number gets higher, passing 10, it will be more difficult to interpret usefulness depending on which parameter is altered, and how the resulting effect from these alterations are regarded by the observer. Such variations may be in relation to how the observers regard product size, and how they perceive different levels of noise. Also the pollution level and type in the environment of use will contribute, and the recommended air exchanges rate, (air changes per hour for a room) differs accordingly, typically from 2 to 4 or higher.

The Gu number take into account the fluid dynamics in every involved parameter, but its not trivial in any way to isolate or address why and how these parameters contribute isolated and hence apply. By best effort it is concluded or stated that every parameter contribute well, over a relatively wide range. The relation apply for filter efficiencies from 20% to well above 90%.

Figure 17A:
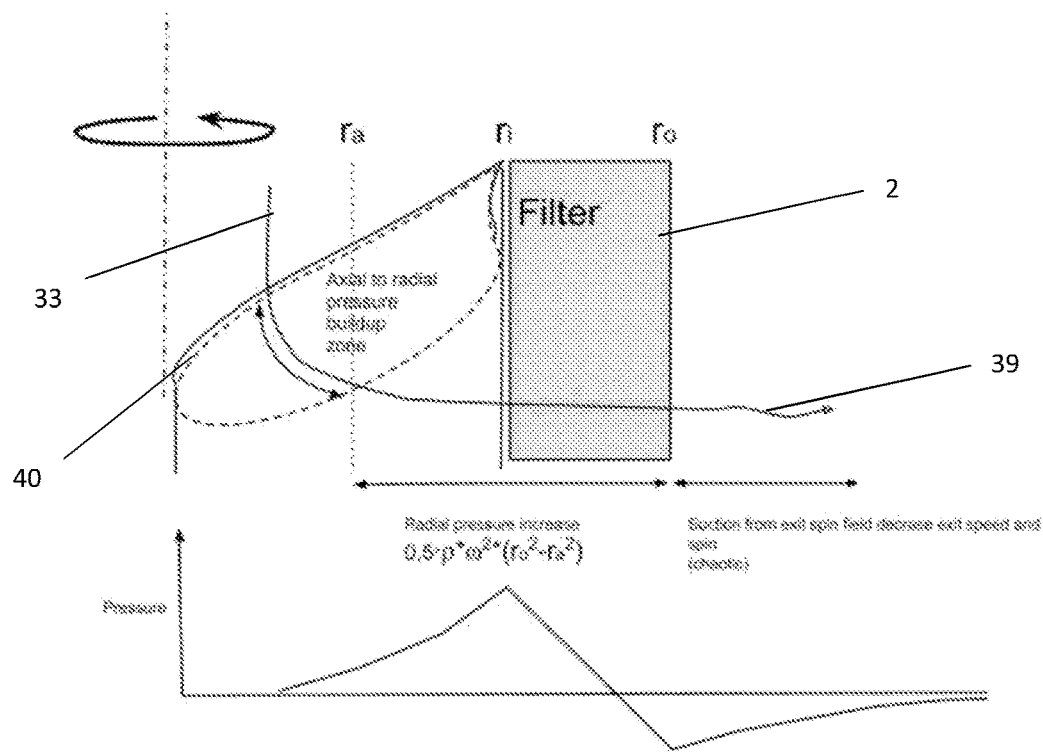
FIG. 17B illustrates the value of a filters' Gu-number according to the present invention
FIG. 17C is a concrete case study of performance CADR/L at 35 dB with various Gu for present invention v.s. typical prior art
FIG. 17D is a concrete case study of performance CADR/ Volume of filter cylinder at 35 dB with various Gu for present invention v.s. typical prior art
Figure 17B:
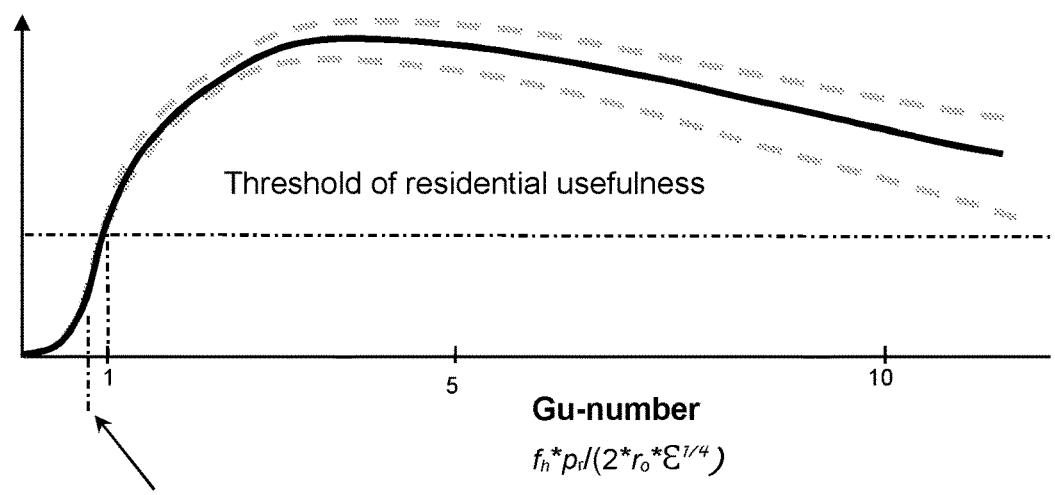

In order to be able to prove the unique positive effects of the rotating pleated filters it has been necessary to do experiments within the interval shown in FIG. 17B. Outside this interval at Gu ≤0.8 it is not possible to explore the benefits due to high noise per CADR. In prior art the above discussed and postulated effects has not been recognized, and they have been running at Gu numbers below 0.8. Additionally prior art embodiments has been running at too high RPM without reflecting on the above discussed relationships, or even discussing any such, manufacturers has put their minds and development in other directions, and the hidden potential has remained undiscovered.

An example of a product having shape factors of Gu substantially equal to 1 with radial blades according to present invention is shown in FIG. 21A-C. Present invention claim the following interval:

$$Gu > 0.8$$

TABLE 1

Benchmark present invention v.s. prior art

| eff = 0.88 | $f_h/r_o$ | Gu | CADR/L @35 dB | CADR/Volume of filter cylinder @35 dB | FIG. |
|---|---|---|---|---|---|
| Prior art | 0.43 | 0.8 | 322 | 60 000 | |
| Present inv. slimmer filter design - higher $f_h$ | 0.7 | 1.29 | 478 | 85 000 | 21A-C without casing and enhanced blades |
| Present invention: Gu10 | 1.42 | 3.22 | 904 | 90000 | 4A |
| Present invention: PL | 2.08 | 4.83 | 1160 | X | 202 |

In Table 1 it is provided an empirical test of best available prior art, compared with 2 or 3 versions of present invention wherein the residential usefulness of claimed relationship to the Gu number is concretized by in a first test using CADR/L at a constant noise of 35 dB measured at 1 m. L is the longest device length in the horizontal plane. Looking at the embodiment of present invention as described in FIG. 21A-C L is approximately $1.25*\text{diameter}=1.25*2*r_o$ of pleated filter, due to the snail house design.

Figure 17C:
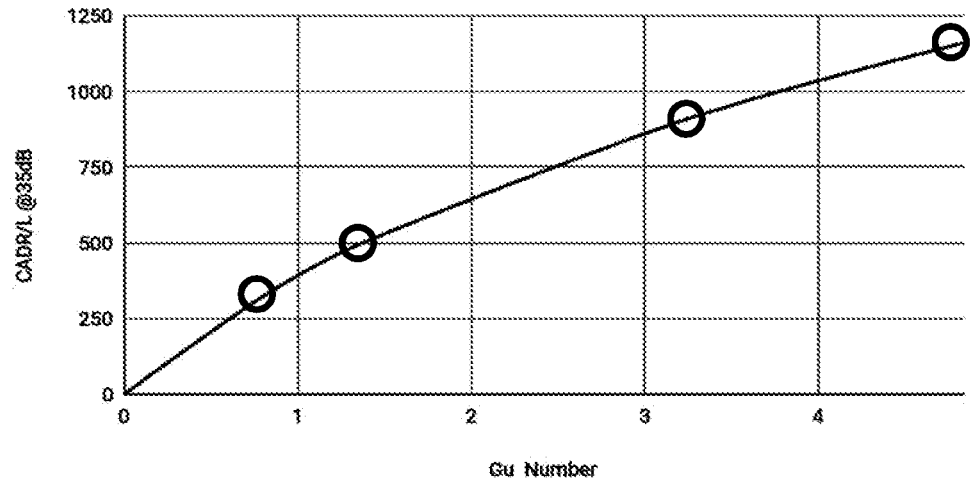

Table 1 is plotted into the concretized graph in FIG. 17C showing an interval of Gu values from 0 to 5, wherein the first row is related to a prior art spinning filter shape replica having Gu=0.8.

The three following rows show numbers related to three embodiments of present invention, being that of FIG. 21A-C without casing and non-enhanced fan blades, 4A, and 202 correspondingly.

A second test using CADR/Volume of filter cylinder at a constant noise of 35 dB measured at 1 m.

Figure 17D:
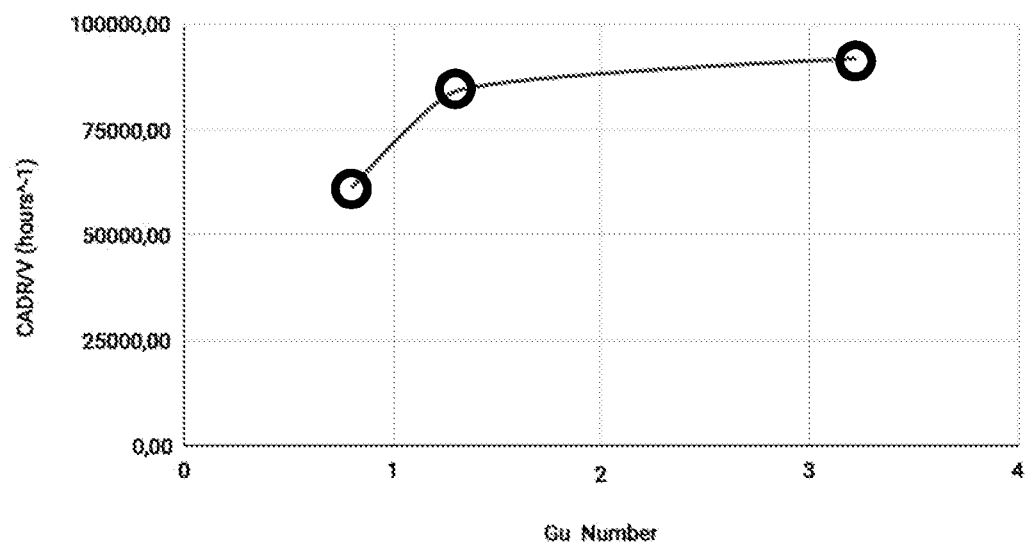
Figure 20A:
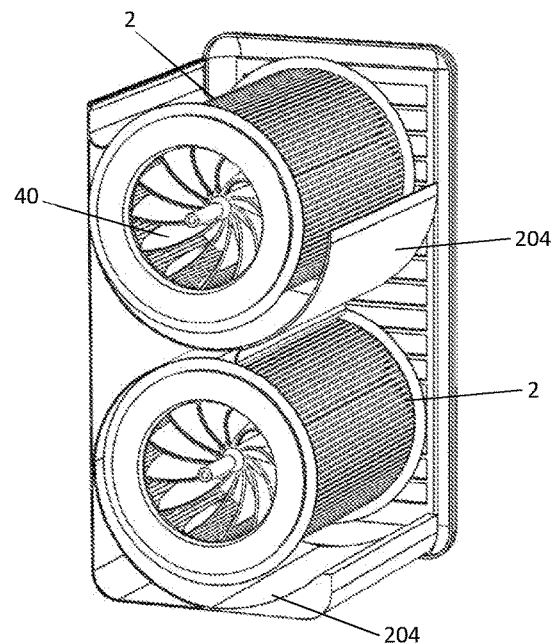
Figure 20B:
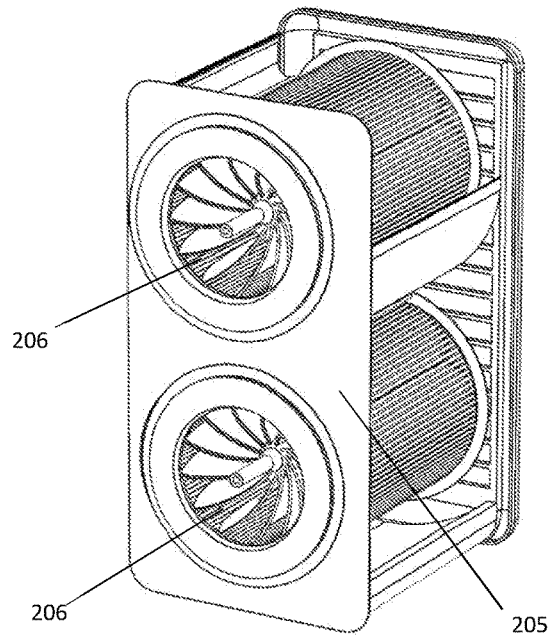
Figure 20C:
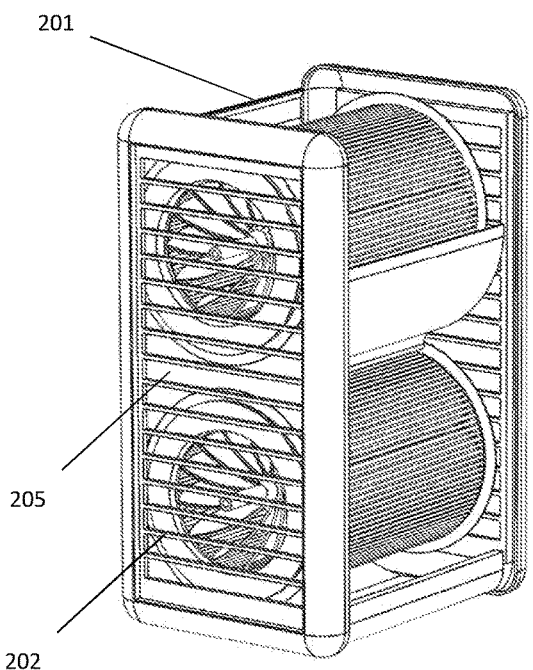
Figure 20D:
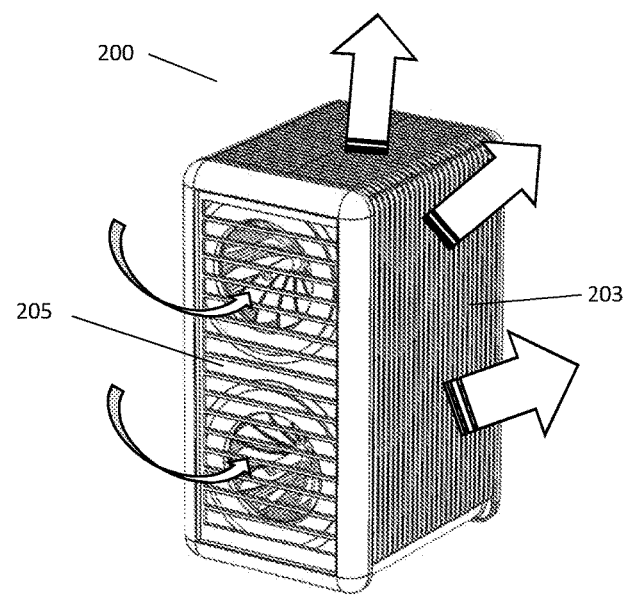

Table 1 is plotted into the concretized graph in FIG. 17D showing an interval of Gu values from 0 to 5, wherein the first row is related to a prior art spinning filter shape replica having Gu=0.8.

The two following rows show numbers related to two embodiments of present invention, being that of FIG. 21A-C without casing and non-enhanced fan blades and 4A correspondingly.

Common for all filters are □=0.88.

The conclusion that can be drawn from the empirical tests is that a filter design according to present invention confirms the unique and unparalleled performance of present invention.

Figure 3F:
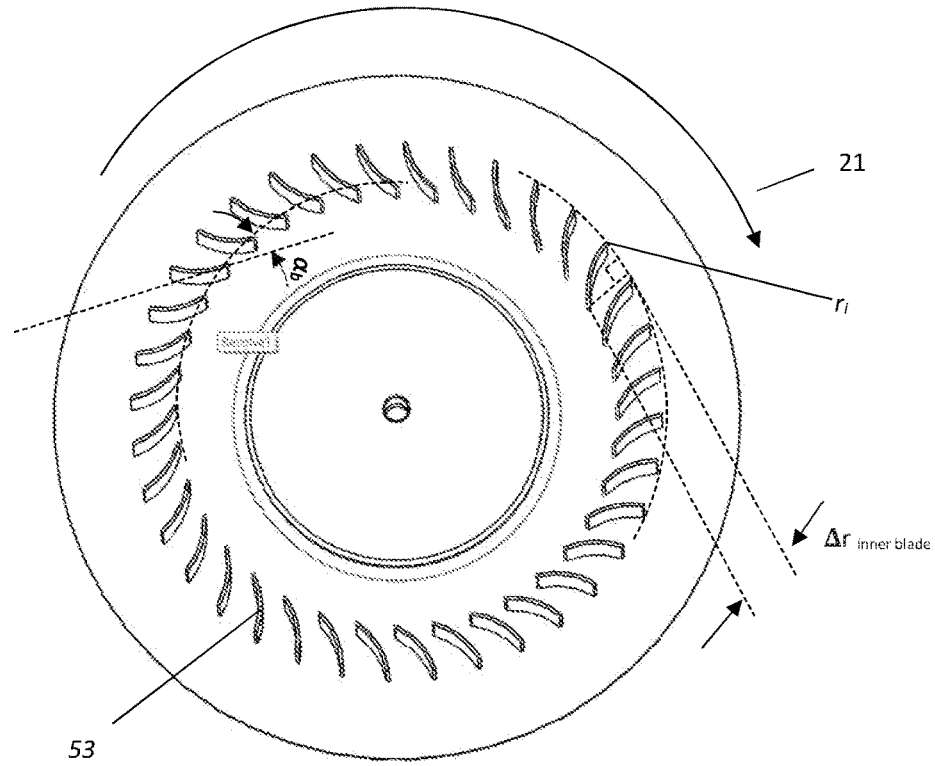

In the embodiment when rotating a pleated filter with two openings indoor with a radial impeller 40, 40' inside or radial blades 53 inside, outside or both inside and outside of the pleated filter, the performance will depend on the blades regarding angle of attack $\alpha_b$, the inner blade height $r_{inner\ blade}$ or the sum of the blade heights if more than one layer of blades are employed. The attacking blade edge meeting incoming air may advantageously be rounded. According to FIG. 3F, illustrating the principle of inside radial blades 53 (pleated filter not shown), the angle of attack $\alpha_b$ may be less than 75°, preferably between 75° and 30°, depending upon $r_i$, $f_h$ and the $r_{inner\ blade}$. The inner blade height $r_{inner\ blade}$ inward from inner filter radius $r_i$ shall be more than 12 mm, preferably $0.2*r_i < r_{inner\ blade} < 0.4*r_i$ mostly depending upon $f_h$.

At same flow and else similar shape factors, a matched attacking inner blade $r_{inner\ blade}=10$ mm resulted in a noise improvement of approximately 4.5 dB relative standard forward leaning blades optimised for unhindered flow in a radial fan geometry. Typically forward refers to the outer part of the blade, hence tilting in "wrong direction" relative our case. Matched attacking blades with double blade lengths $r_{inner\ blade}=20$ mm lead to noise improvement of up to approximately 10 dB.

Similarly improvements are observed relating to power use of up to 30% savings in light of radial blade construction.

The extruded shape of the radial blades 53 might be shaven to obtain even better performance. For morphed blades 40, 40' inside the filter, there are no requirements of characteristic lengths because they change shape continuously over its length.

If filter parameters are chosen such that the Gu number is close to or falls below the threshold of residential usefulness or running over noise critical RPM, approximately above $130/r_o$, one or more of the effects studied in relationship with the present invention, also including matching the media permeability, will cause weak and noisy function due to back flow and turbulence. This may be the reason why industry development has focused on other filter solutions. Outdoor applications without noise restrictions do not need to satisfy either of the relations.

When considering outer blades, all rotating channels either consisting of pleats or blades should be accounted and hence define $r_o$.

At Gu number of 4.8 it has been demonstrated that the flow through an isolated rotating cylindrical pleated filter with carbon filter attached inside is higher and at the same time less noisy compared to when the same filter was in use in static operation in a prior art high quality air purifier for which it was designed and optimized for. By spinning the filter without any blades inside at 1220 RPM the filter gave the same CADR as the fine-tuned prior art air purifier did at top speed using two axial impellers in series at high RPM. The noise emitted by the filter was 50 dB compared to 56 dB emitted by the product itself. With blades inside and two openings the potential is far greater. The fluid dynamic principle of the present invention is new and improved and the enhancement in performance may be obtained without extra external fans and other parts that take up space and increase the product size. Hence the spinning filter 2 itself will constitute a first embodiment of the present invention as illustrated in FIG. 1.

When for example implementing the spinning pleated filter 2 as illustrated in FIGS. 3A, 3B and 3C, it is demonstrated that such a design arranged for mounting to a ceiling light power output, a rotating pleated filter in a frame 32 may filter more than 230 m³/h practically soundless and at a total weight including motor of less than 1 kg. Same small geometry can filter 460 m³/h with filter efficiency of 80% at 44 dB which is outstanding. That equals a performance per size and weight of many fold that of the best techniques of prior art that have made it to commercial products. Without the center axial-to-radial impeller structure 40, 40', 44, 44' presented in FIG. 4A-H the spinning filter will generate more noise and have reduced efficiency compared to a filter spinning with the impeller structure 40, 40', 44, 44'.

Further data of the example embodiment using a spinning pleated filter of the present invention with an axial to radial impeller compared to traditional static filter assembly at:
RPM: 946
$r_i$: 0.05 m
$r_o$: 0.072 m
$f_h$: 0.2 m
☐: 0.88
Gu-number using one entrance: 3.33
Noise dBA-1 m: 29.5 dB
CADR of 188 (ASHRAE 0.3 um, 88% efficiency)
One fourth the space occupancy
One fifth the sound power (−16 dB) @ same CADR top speed.

The occupied volume of the lampshade assembly shown in FIG. 201-207 is 20% smaller than the high quality air purifier product of prior art discussed in the example above, however the testing was done without a carbon filter. To deliver a CADR of 310 m3/h the commercial product consumed 29 W while the lampshade assembly was delivered a torque work power of 2.4 Watts. With a motor efficiency of 0.5 that equals 4.8 W which correspond to a power ratio of eight in favor of the spinning lampshade. The corresponding dB levels was 56 dB for the commercial product while 26 dB for the present invention.

Because the pressure is used where it arises, the rotating pleated filter, alone or even better in combination with an rotating axial to radial impeller 40, 40' inside the pleated filter, as illustrated in FIGS. 4A and 4B, enhances the CADR (Clean Air Delivery Rate) per noise significantly compared to a static filter with externally driven flow. The fan efficiency is superior to the standard obtained in large well designed fans (50-75%) since the tangential velocity of the approaching air matches that of the filter entrance. This is provided by the axial to radial impeller. As discussed earlier, since air in a pleated filter is allowed to pass relatively easy from all the discussed effects, even a spinning pleated filter 2 without other parts has inherent, so far, undiscovered possibilities in air purifying applications. The utilization of these effects are demonstrated and some product realizations are shown ranging from the purest form of just a pleated filter spinning, to the more advanced versions with outstanding performance.

A first embodiment of the present invention air purifying device 30 is illustrated in FIGS. 2A, 2B, 3A, 3B and 3C. The pleated filter 2 is rotated 21 in a frame 32, wherein the rotation being provided by an electrical motor 31. The pleated filter 2 can however be considered as of two symmetrically connected pleated filters 2 with two openings having a height 2*$f_h$, an outer radius $r_o$, and an inner radius $r_i$. Thus pleat thickness $f_t = r_o - r_i$. A cylindrical pleated filter will have a larger pleat exit channel angle $\alpha_o$, than the pleat inflow angle $\alpha_i$, and hence also wider exit channels. This also promotes the low effective permeability, especially for densely pleated filters.

By spinning the filter, the airflow through the cylindrical filter is maintained by centrifugal forces and the suction effect of the exiting air, enabling more even air flow than if the air is pushed into or sucked out of a static filter arrangement given that the pleats have the right shape, hence reducing the total pressure needed but also increasing the lifetime of the filter.

To distribute the flow and purify the air properly in the room the air purifying device 30 may be designed to comprise air directing foils 34, radially arranged around the purifying device 30 as exemplified in FIG. 3C.

When the air purifying device 30 rotate 21, air movement through the filter 2 pulls a constant air inflow 33 into the space inside the filter. The exhaust air leaves the filter surface in a spinning fashion 39, and results in increased flow through filter due to a suction effect, as discussed already.

Typical shapes of the filter 2 are cylindrical or coned cylindrical. Coned cylindrical shape may typically be used in embodiments like filter cassettes for ventilation systems wherein the air input to the filter comes from one side only, the widest opening of the filter typically. Evenly formed cylindrical filter are more suitable in air purifiers. Depending on where the purifier is placed the air input may be provided from one or both longitudinal sides of the filter.

In a further embodiment of the present invention air purifying device 30 it is provided an axial to radial fan 40, 1126 arranged inside, and rotationally connected to, the pleated filter 2 as illustrated for example in FIG. 4A-H. The fan may be constructed for inflow air from one or both longitudinal sides. The exploded view of the filter assembly in FIG. 4A comprise an axial to radial fan 40, 40', a filter end cap 41, 41', and the filter 2. In FIG. 4E-H the spinning-/support-shaft 45 enters the filter assembly through the upper end cap 41, and passes through the interior of the filter assembly and is connected to the center of the bottom end cap 41'. A spinning-/support-shaft 45 is connected to a motor 31 and the motor thus rotates the filter assembly.

The end cap 41, 41' may comprise end cap foils 42 arranged radially outwards from the center axis 43. The radial foils 42 is formed to guide the multi directional incoming air in an axial direction so that air entering the filter compartment avoids the shock effect observed in apertures where air is focused inward towards the center. The resulting even flow enables further even distribution done by the impeller blades.

The axial to radial fan 40, 40' distributes the air flow over the filter. Even distribution is partly ensured by morphed fan blades. They starts at the entrance by attacking incoming air with a velocity matched angle, then gradually changing shape to distribute the flow axially to radially in accordance with the fraction of remaining air and radial and axial cross sectional areas. Better control of the distribution of the deeper air flow along the inner filter surface is provided by an integrated cone formed fan element 44, 44' arranged to taper from its largest diameter arranged at the deepest point for the air to exit through the filter. The cone tapers away from the filter inside towards the inflow area of the filter assembly. Due to the rotational relationship between the axial to radial fan 40, 1126 and the pleated filter 2, the axial to radial fan 40, 1126 delivers air flow at almost the same angular velocity as the filter and tangential velocity close to the tangential velocity inside surface of the pleated filter 2. Hence a relatively small amount of rotation related turbulence and energy dissipation occurs. The figure illustrates an assembly providing inflow air from both sides of the filter, hence two oppositely arranged cone formed fan element 44, 44' with associated axial to radial fan blades supports the inflow air distribution.

The efficiency obtained with the embodiment after tuning the system and with all parts of the invention in place is exceptionally high. The efficiency calculated from motor work used by the rotating filter assembly and flow throughput has been measured to be higher than it would be if the same filter was used flat in combination with a lossless ducting system and a lossless fan. With basis in a flat filter configuration that is more than 100% efficiency. The motor efficiencies in both systems has here been ignored. In traditional air purifiers the ducting system loss and fan losses combined typically consume several fold as much power as the theoretical work done here in the flat filter. Hence an air purifier based on the principles of present invention will outperform all traditional air purifiers.

Also, when a static filter in a traditional fan-filter assembly clogs, the fan has to overcome a larger pressure. Since the fan blades then operates outside its designed optimum flow-pressure region, this results in turbulence, loss of energy and more noise. However, if the filter is acting as a pump while rotating, increased angular velocity can compensate to deliver the pressure needed without correspondingly more noise and loss of energy like arising in the traditional fan-filter assemblies. The noise emitted over the lifetime span of the present invention will therefore be significantly lower compared to traditional fan-filter assemblies.

One advantage of such rotating pleated filters of the present invention, is that it creates both suction and push, thus it is possible to eliminate the need for gluing the filter edges if the filter is fastened between two soft seals/frames 32, one at each longitudinal end the direction of the axis of rotation 20. Like a lid that embrace the ends of the filter. In this way there is no need to glue or fear leakage since the forces act radially on the filter and its shape is maintained. The filter can thus be used as soon as it comes out of the pleating machine which is very cost effective.

Present invention with spinning filter also provides the air easier access to the bottom of the exit channel inside of the rotating pleated filter due to the Column effect. Contributing is also the axial to radial fan, the radially expanding exit channels and the suction field in the exiting flow.

The rotational connection between the radial elements of the axial to radial fan and the inside of the pleated filter eliminates much of the noise generating turbulence traditionally associated with fan-filter constructions, and present invention delivers unparalleled noise, efficiency and power rates.

The use of pleated filters are advantageous in present invention, but there is considerable advantage to use a radial spinning filter of any type in combination with the axial to radial fan described herein.

One such advantageous embodiment may be to use a spinning radial carbon filter in a kitchen stove air filter unit downstream a fat droplet trap and collector downstream a metal mesh aerosol stopper (not shown). Such a rotating assembly may provide enhanced capacity to suck out and centrifuge out fat and steam noiseless, without dripping of such onto the food cocking below. A carbon filter reusable after heat treatment would be optimal for this. Also the backwards lamellas 2002 would be perfect in this combination to avoid unpleasant draft in the room.

It is also provided in line with present invention a spinning filter assembly comprising a pleated filter and an radially arranged carbon filter, or other type of filter, inside or outside the pleated filter.

All types of filter may comprise of two or more parts. In larger embodiments 2001 a separation in 4 or 6 parts are optimal to ease replacement of filters and to ease the assembly of the product.

Figure 214A:
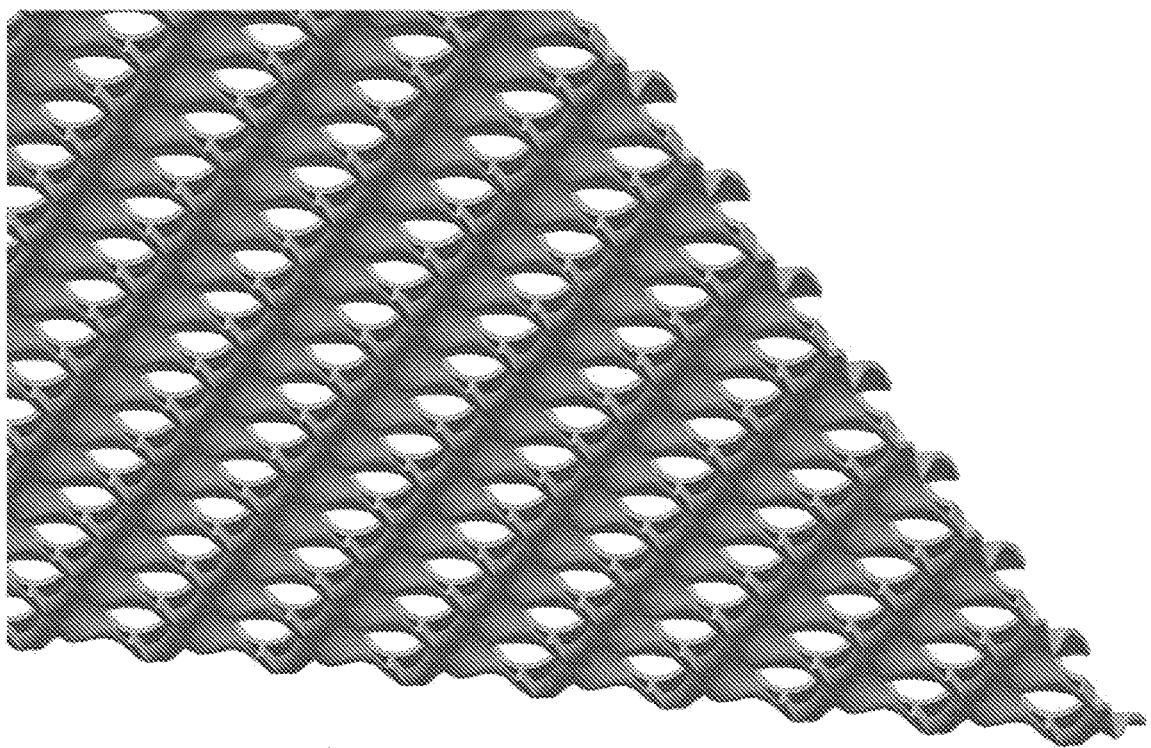
Figure 215A:
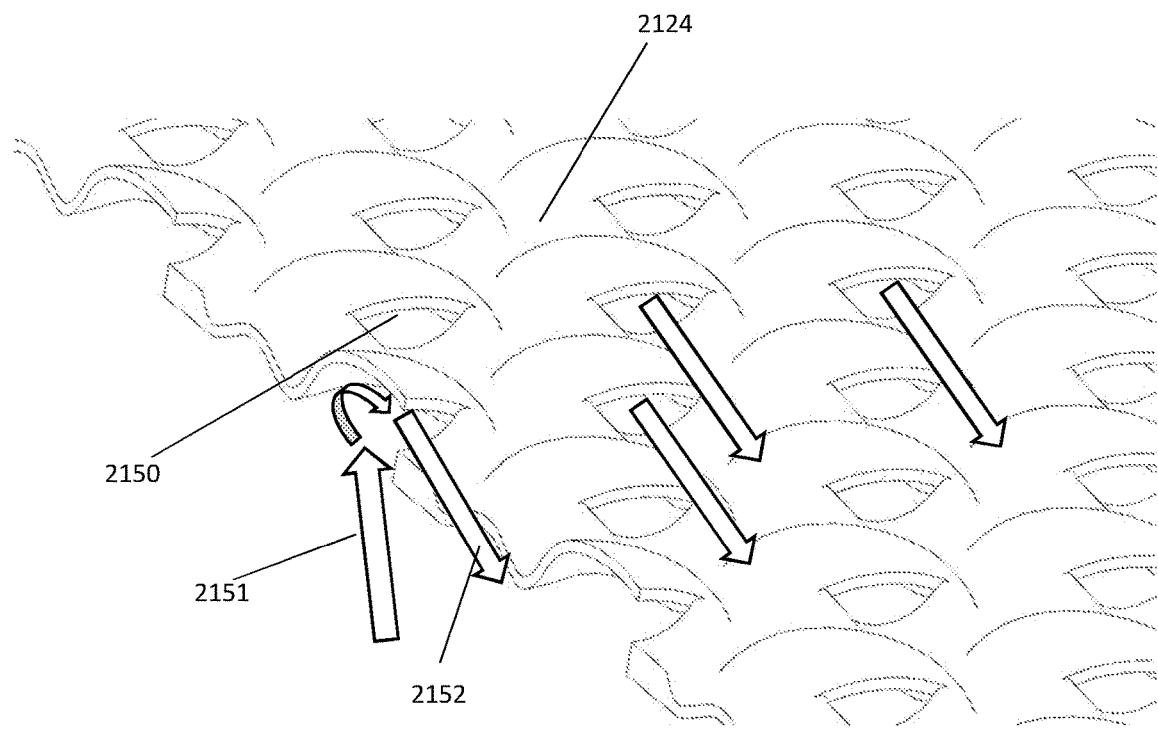
Figure 215B:
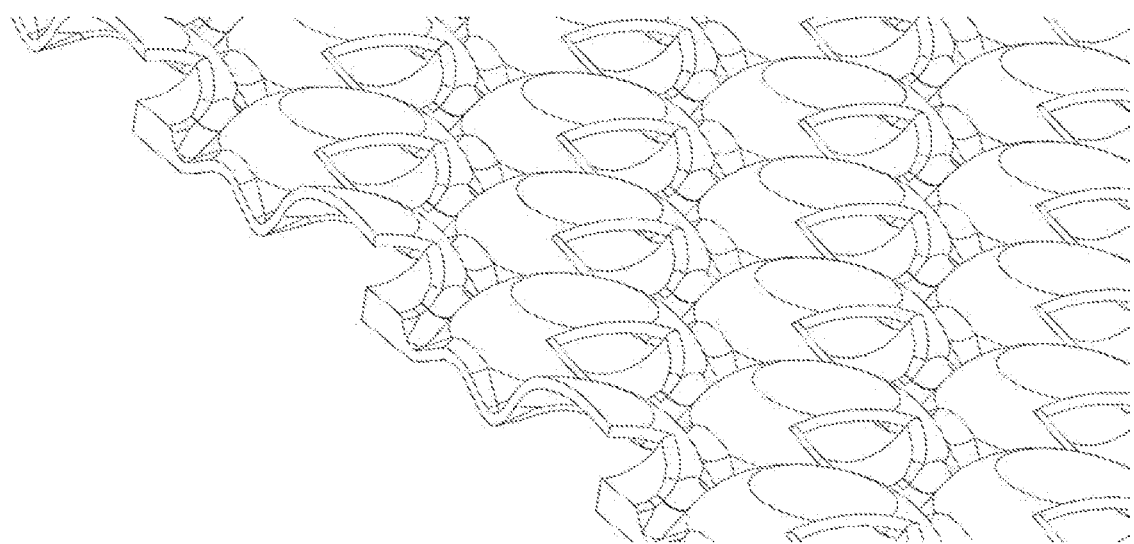
Figure 215C:
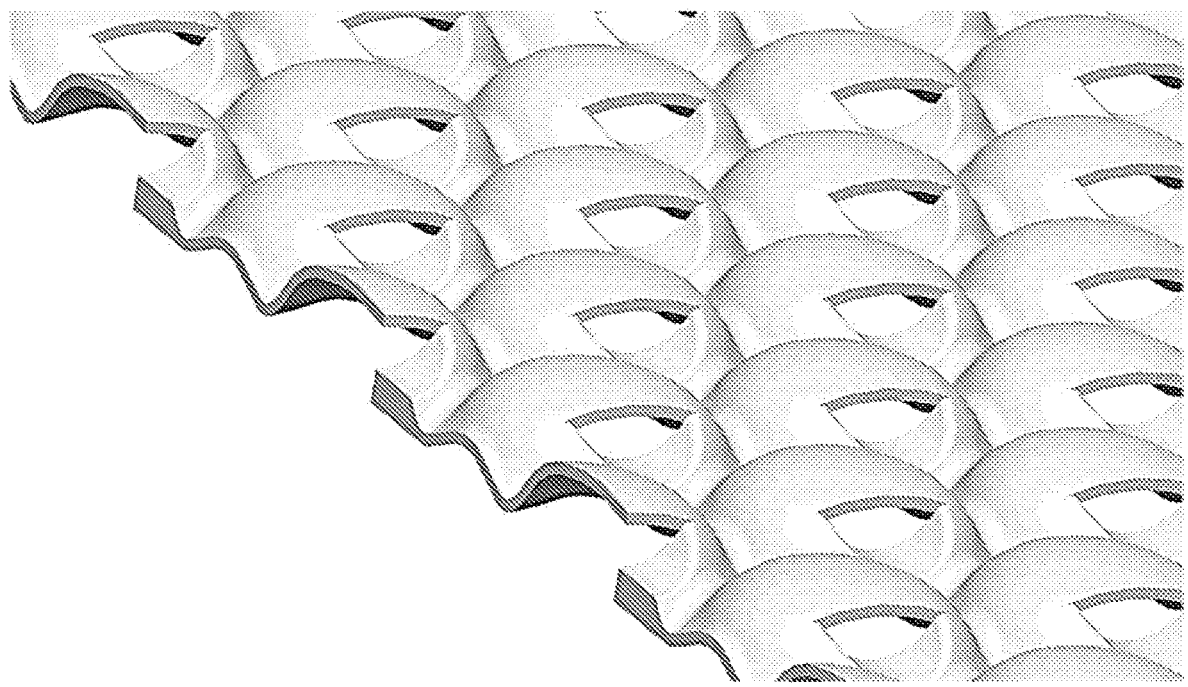

In an even further embodiment of the rotating pleated filter an air directing device comprising a concentric cylinder or coned cylinder shaped solid cover 50, 2124, 2125 comprising a plurality of jet nozzles 51, 2150, as illustrated in FIGS. 5a, 5b, 212B, 214A and B, and FIGS. 215A, 215B and 215C. The nozzles can also be shaped as continuous or partly continuous slits like seen in FIG. 3E between the tiltable capsule formed blades 48. The result is that exhaust air jets propels the rotation of the filter 2 which reduce the power consumption further. A sleeve 52 may be provided around the pleated filter assembly to provide an output guiding channel for air exiting the pleated filter assembly. Now further example embodiments of the present invention is described as illustrated in the simplified FIGS. 6, 7, 8, 9, 10 and 11.

A casing 70 having at least 4 walls 73 is provided. The casing 70 if provided for encompassing one or more, typically four, of any of the rotating pleated filters assemblies as discussed above, wherein the air is lead into the center area of the filter from above, the inside of the filter assembly comprise a filter bottom 165 providing an airtight seal, and all air need to exit through the filter. The pleated filter assembly is arranged such that the outlet air exits the casing in the same direction as the inflow. Thus, the casing has a casing input side 73 and a casing exhaust side 74.

Figure 6:
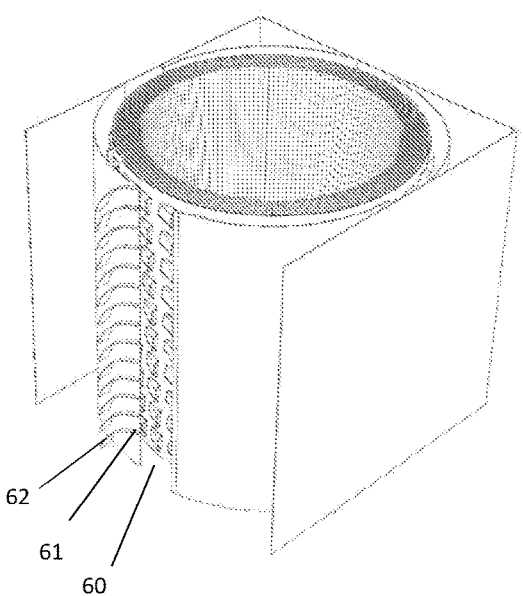
FIG. 6 is a cross section view of a filter with outside mounted air directing foil mounted in a casing, seen from an oblique angle from above and right
Figure 7:
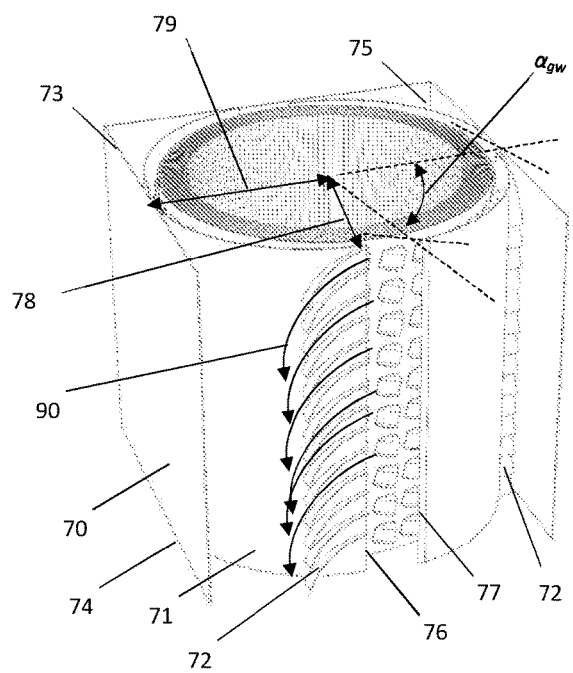
FIG. 7 is the same object as in FIG. 6 seen from another angle
Figure 8:
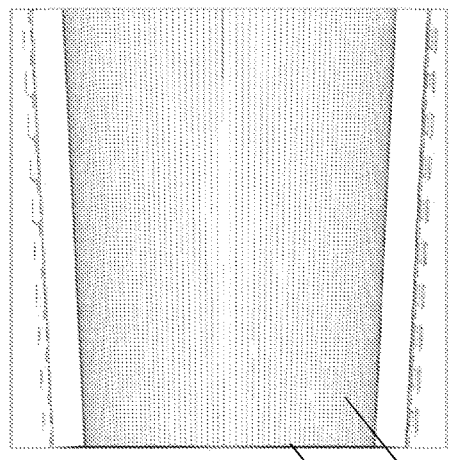
FIG. 8 is a cross sectional view of a conical cylindrical pleated filter with outside mounted air directing foil
Figure 9:
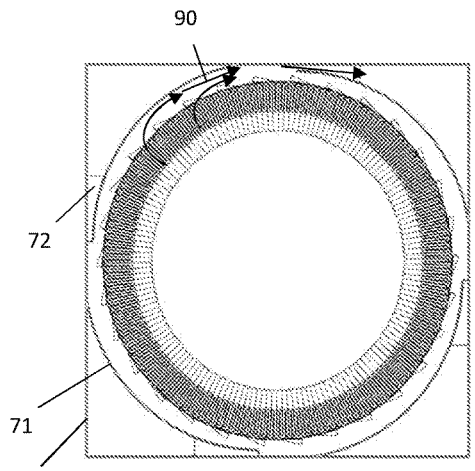
FIG. 9 shows the object in FIG. 8 from above
Figure 10:
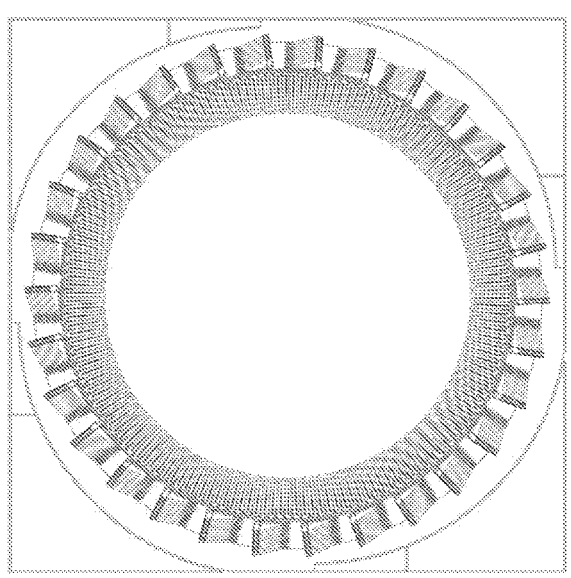
FIG. 10 shows the object in FIG. 8 from below

In one embodiment the casing 70, adapted to encompass one filter assembly as shown in for example FIG. 6, comprise longitudinal guiding walls 71 which is arranged inside the casing 70 for leading the air flow from the exits of the spinning filter to the casing exhaust side 74. The guiding walls 71 may be arranged to seal off each corner space 75 of the casing 70 not occupied by the cylinder shaped rotating filter. The guiding wall itself may typically have a fraction of a cylinder shape, or coned cylinder shape, and the fraction having an angle width $\alpha_{gw}$ of 90° or less.

The guiding walls 71 is adapted on a first longitudinal side 76 to have a radius 78 from center of filter slightly larger than the outer radius of the pleated filter, and a second longitudinal side 77 to have a radius length equal to the distance from center of filter assembly to a mid-section of the casing 70 wall, where it typically may be fastened. In practice this provides a longitudinal slit opening 60 between the first longitudinal side 76 of one guiding wall 71, and the second longitudinal side 77 of the adjacent guiding wall 71. The exhaust air 90, when exiting the filter assembly, will accumulate and rotate along with the spinning filter assembly between the outside of the filter assembly and the inside of the guiding wall 71 towards the longitudinal slit 60, and most of the air will exit between the first longitudinal side 76 of the next guiding wall and the wall of the casing 70.

Curved air foils 72 may be arranged outside of the guiding wall 71 for guiding the exiting air 90 towards the exhaust side 74 of the casing 70. An entrance portion 61 of the curved air foils 72 may also be used to define the opening width between the first longitudinal side 76 and the wall of the casing 70. The curved air foils may curve towards the exhaust side 74 of the casing 70, and the exit portion 62 of the airfoils 72 may have a different depth, for example larger, than the entrance portion 61 depth.

The result is that when the filter assembly spins, exhaust air flow 90 exits the filter assembly and is channeled and lead into and out through the corner space 75 of the casing 70.

Figure 11:
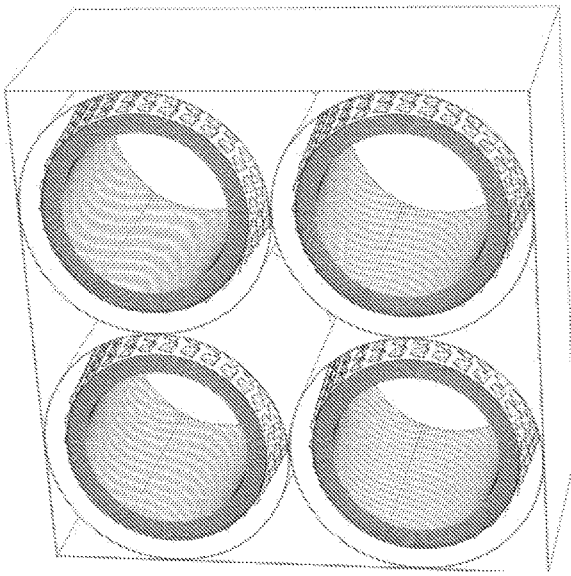
FIG. 11 illustrates a system combining four filter assemblies as illustrated in FIG. 5-10

FIG. 11 shows a horizontal cross section view embodiment wherein 4 filter assemblies are arranged in a casing comprising 4 walls seed from below. In this embodiment the coned filter assemblies are typically arranged in separate, one for each filter assembly, cylinder shaped casing. These cylinder shaped casings may be of ta bucket type wherein one bucket comprising a filter assembly may easily be replaced.

An even further example embodiment of the present invention is described as illustrated in the simplified FIGS. 12, 13, 14, 15 and 16.

Figure 12:
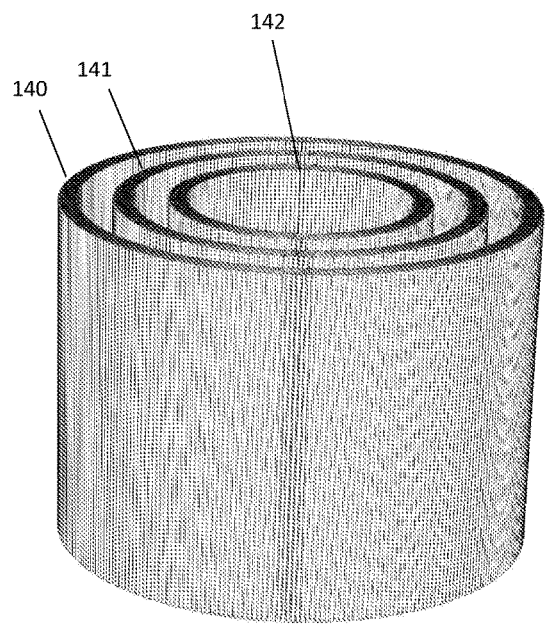
FIG. 12 illustrates a filter assembly of three radially spaced filters of different diameters.
Figure 13:
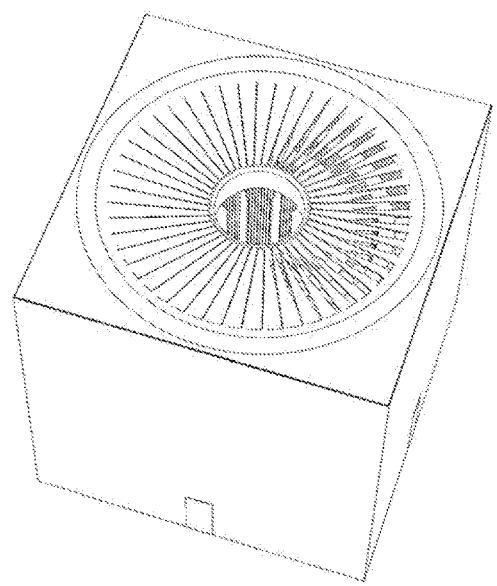
FIG. 13 illustrates a casing for a filter unit comprising multiple radially spaced filters with a pre spinner impeller

FIG. 12 shows a different configuration where more than one cylindrical or coned filter are assembled concentrically.

Figure 14:
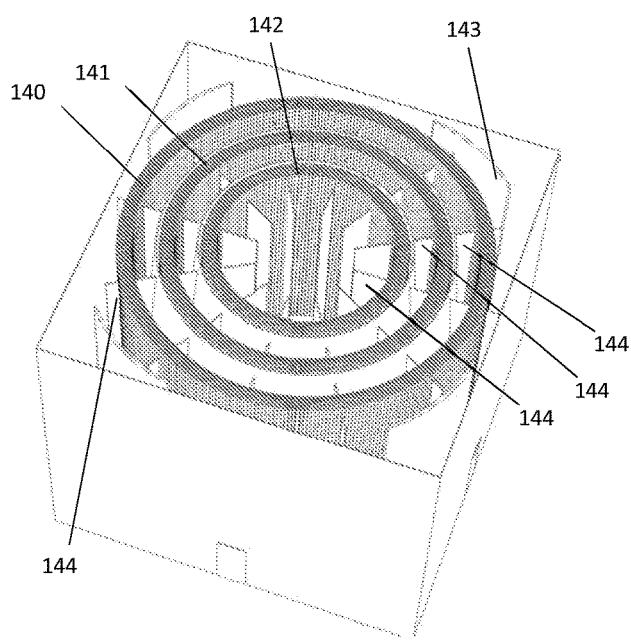
FIG. 14 is a cross section top view of the filter unit in FIG. 13
Figure 15:
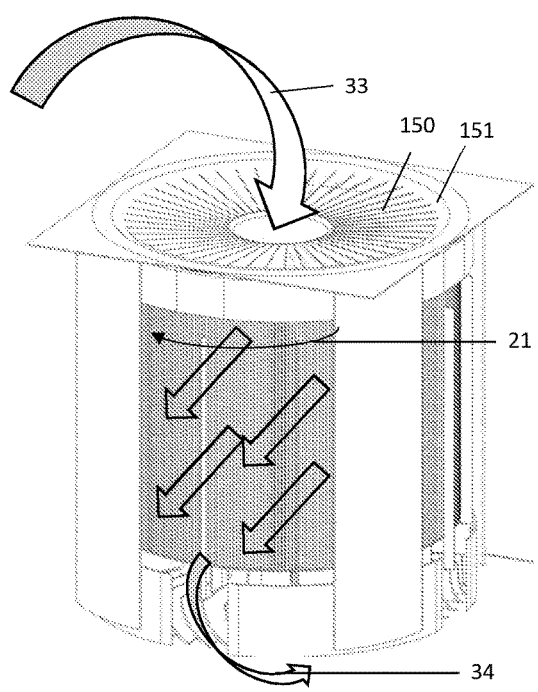
FIG. 15 is a detail view of the elements of the filter assembly in FIG. 13 without the casing walls shown
Figure 16:
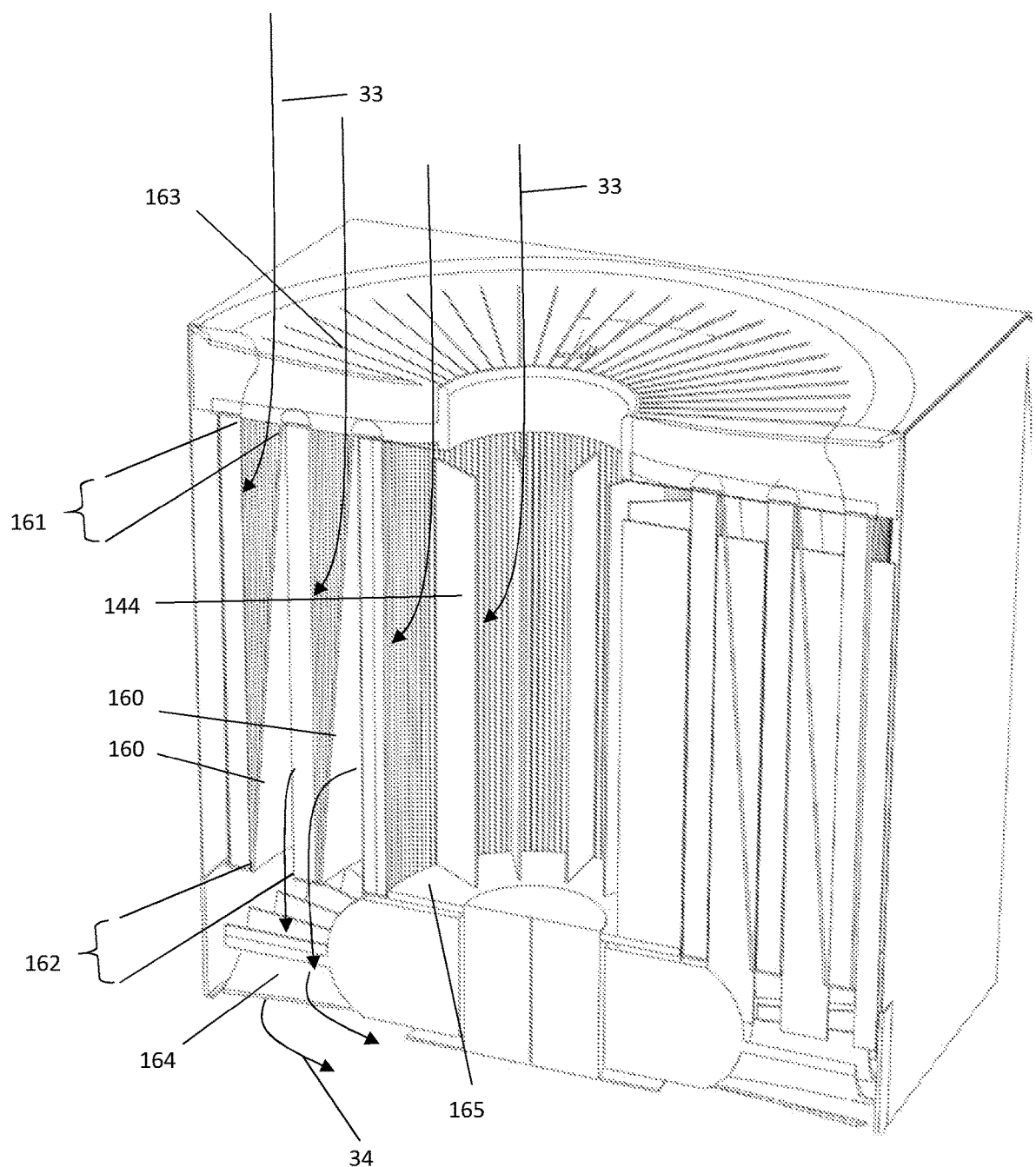
FIG. 16 shows a cross section of the filter unit arranged inside a casing with radial fan elements, air directing foils and motor FIG. 17A describes the pressure graph over the axial to radial impeller and filter when operating in FIG. 4 A-K configuration

FIG. 14 show a cross section of upper portion of one embodiment using such multiple filters 140, 141, 142 of different diameter. The filters may be mounted in an assembly wherein each space between filters are provided with a diagonally arranged air tight sleeve 160 providing an input guiding channel 161 for air entering into the inner space of the filter 140, 141 being arranged outside a smaller diameter filter 141, 142 as illustrated in the assembly cross section in FIG. 16. The same air tight sleeve thus provide an output guiding channel 162 for air exiting to the outside space of the filter 141, 142 being arranged inside a larger diameter filter 140, 141.

Radial foils 144 may be arranged inside and outside (in between) the filters, to provide radial fanned air flow. Thus when the multi-filter assembly rotates 21, the inflow air 33 is pushed into the inside of each filter, centrifugal forces drives the air through the filters, and in the case of pleated filter the exit channels between the pleats further enhance the air flow through the filter.

An axial to radial impeller 150 is arranged in the input casing lid 151. The purpose is to spin the air smoothly up to the angular velocity of the assembly supplying the radial fan feature of the filter assembly. Like axial fans the air foils 163 shall have an angle of attack matching the incoming air, however unlike axial fans that strive for low exit spin, the air shall leave the air foils 163 in a spinning fashion similar to the rotating pleated filter.

A rotating exhaust air director unit 164 may be rotationally attached to the filters 140, 141, 142 exhaust side of the assembly to provide a reverse exit direction relative the rotation 21. Air inflow 31 enters the inside of each cylindrical shaped filter and exits out of the filters in an exit flow 34 as illustrated in the figure. The foils may also from the lowest radius be tilted upwards towards the filters for more even pressure over the exit of the director.

The following description describes in more detail the effects of how the spinning pleated filter enhances the transport of air molecules through the filter, and which is illustrated by the details in FIG. 17A and FIG. 18.

In FIG. 17A, a cross section half of the spinning filter and axial to radial impeller 40 blade is illustrated with the air flow 33, 34 building up radial pressure p as it passes through the impeller. Ideally in accordance with: $p=0.5*\rho*\omega^2*(r_o^2-r_a^2)$. Where r is the inner radius of the pleated filter. $r_a$ is a characteristic radius depending upon incoming radius for each streamline and more specifically where the morphed impeller cause more radial than axial pressure build up. ? is the air density, ? the angular frequency. The radiuses $r_o$ and $r_a$ are defined in FIG. 17A. However the actual pressure field is much more complex and it is difficult to express useful relationships by simple analytic expressions.

The pressure zone can simplified be divided in the following sections:
1) The axial to radial pressure build up zone.
2) The radial spin pressure.
3) The pressure distribution in the filter.
4) The pressure in the rotational exit air.

A phenomenological representation of how the tangentially averaged pressure is distributed radially is shown in the bottom of FIG. 17A. The actual pressure however variate a lot depending upon how the both blades and pleats in the filter accelerates and decelerates both around the z axis and in radial direction. The shaping of the impeller blades are done to evenly distribute in both z direction and around the circumference of the z axis. The figure illustrates how the exit velocity and spin field represents a suction effect on the air molecules exiting the pleated filter.

In FIG. 18 we see exaggerated examples of streamlines through the pleated filter under static and rotational conditions, and how slow air molecule buildup in static filters increase pressure drop relative to a spinning filter wherein:

I. Corridor effect (Discovered): Air molecules entering the exit channel normal to exit channel are partly accelerated by the high speed core flow (B) which in turn, in the static case, are accelerated by a high pressure in the bottom of the exit channels. The resulting increased pressure, compared to that of a parallel flow situation, may thus be postulated as the Corridor effect. When spinning a pleated filter, centrifugal forces pull/accelerate the newly fed air molecules together with the column and core, hence the speed of the core can be lower in order to exit the same amount of air. Corridor effect is then reduced and a more uniform velocity profile occur at the outlet, reducing the pressure drop in the exit channel. Efficiency is increased with less viscous loss and loss of kinetic energy in the exit jet (A). With narrow exit channels and high media velocities the corridor effects becomes more important.

II. Column effect (Discovered) while spinning: Centrifugal forces help pull the entire column so the actual pressure buildup along the exit channel decreases. Given the right pleat geometry a spinning pleated filter enables more even pressure which promotes more flow through the innermost portion of the exit channel relative a static pleated filter situation. More even flow is the result and this reduces the differential pressure over the filter media. Pressure drop in the inlet channel is not discussed, but this is important to understand the whole picture.

III. Result of column effect and reduction of corridor effect while spinning: More flow can enter at low radius at bottom of exit channel A'. Filter usage is more even B' hence media pressure difference is reduced. Core velocity in exit channel are reduced hence less pressure is needed to accelerate the core C'. This reduces the pressure deep in the exit channel and promote flow through filter media at low R. Dynamic losses in exit channel are reduced as air exit with lower speed.

In FIG. 19 it is shown how the cylindrical shape of the pleated filter facilitates wider exit channels than input channels, which is the result when bending a pleated filter in a curve and to a cylindrical shape. The present invention postulates that because the pressure drop in the exit pleat channel is larger than a same sized inlet pleat channel it is beneficial to reverse the direction of flow of cylindrical filters from how they typically are used today where the air goes through the filter from the outside of the filter to the inside of the filter. When additionally the other positive discovered effects that are present in a rotating pleated filter are added, the advantages of a rotating filter become very significant.

IV. Cylindrical shape: Widening exit channel reduces exit velocity. Pressure build up and corridor effects are reduced further.

V. Spin outside exit channels promotes suction/pull and reduces final exit velocities and hence energy loss. This increases the efficiency of the system.

Some or all features discussed in relation to FIG. 17-19 is independent on which embodiment configuration the pleated filter is implemented in. Obviously when filters of different diameters are mounted outside each other as depicted in FIG. 12-16 and/or filters installed in casing 70 the exit suction has less impact in filter performance.

Further embodiments may include using the impeller and backflow jet techniques discussed above with a rotating filter, not necessarily pleated, in a kitchen stove ventilation unit (not shown). Filter types may include carbon filter, aluminum mesh filters, aluminum metal filters, knitted mesh filter, hood grease filters and other.

It is further claimed that the centrifugal forces of a spinning filter of almost any type, such as for example a spinning carbon filter, wherein an axial to radial impeller is working inside the spinning cylindrical filter, have unparalleled characteristics to a filter of same configuration which is mounted for static operation.

FIG. 20A-D illustrates a floor mounted air cleaning device 200 utilizing the above described rotating pleated filter. The device may have or more rotating pleated air filters 2 mounted inside a chassis 201, 2141, where the chassis are equipped with inlet vents 202 and outlet vents 203, 2136 and guidance of exiting air by a collector 204, 2132 of rotating air, in accordance with the air flow path set up by the rotating pleated air filter 2. The cross sectional area formed between the collector 204, 2132 and the surface of the rotating pleated air filter 2, is gradually increasing along the circumference of the rotating pleated air filter 2.

The collector 204 encircles only a portion of the corresponding rotating cylinder formed pleated air filter 2 such that when two or more rotating cylinder formed pleated air filters are mounted in a stacked vertical fashion as seen in the figures air exits mainly to the side of the lower rotating cylinder formed pleated air filter 2, and mainly upwards from the upper most rotating cylinder formed pleated air filter 2.

A static air barrier 205 is provided at the front and back side of the floor mounted air cleaning device 200.

The invention can also be described as a first embodiment wherein the air filter device comprising one or more rotating pleated air filters (2), and a motor (31) for rotating the pleated air filter, wherein the air filters having a cylindrical form, and is further designed according to the relation $Gu=f_h*p_r/(2*r_o*\varepsilon^{1/4})>0.8$, wherein Gu number correlates to a function of the commercial usefulness based on, and accounting for, the main customer's needs, such as CADR, dB, product size, functioning and cost, wherein $p_r=(r_o-r_i)/$ pleat spacing $(p_s)$, and pleat spacing $(p_s)$ is the distance between two adjacent pleat tops on the inner radius $(r_i)$, and $\varepsilon$ is the ASHRAE efficiency.

A second embodiment of the air filter device according to the first embodiment, wherein Gu>1.2.

A third embodiment of the air filter device according to the first embodiment, wherein Gu >1.5.

A fourth embodiment of the air filter device according to any one of the first to third embodiment, wherein the cylinder form being open in one or both ends, such that when the rotating pleated air filter 2 rotates 21 centrifugal forces drives air through the pleated filter resulting in a suction upstream of the rotating pleated air filters 2 sucking air into through the one or to open ends, and filtered air exiting radially outwards downstream of the rotating pleated filter in all directions.

A fifth embodiment of the air filter device according to any one of the first to fourth embodiment, further comprising radial fan blades arranged inside the rotating pleated air filters 2, the radial fan blades being rotationally connected to the rotating pleated air filters 2), and the total blade height being ≥12 mm.

A sixth embodiment of the air filter device according to the fifth embodiment, wherein the total blade height being ≥15 mm.

A seventh embodiment of the air filter device according to any one of the fifth to sixth embodiment, wherein the radial blade geometry comprise a forward attacking angle $\alpha_b$ between 15° and 75° relative the inner radius $R_i$ of the rotating pleated air filter 2.

An eighth embodiment of the air filter device according to any one of the fifth to sixth embodiment, wherein radial fan blades being formed as a radial flow impeller arranged outside the rotating pleated air filters 2.

A ninth embodiment of the air filter device according to any one of the fifth to eighth embodiment, wherein radial fan blades being formed as a radial flow impeller arranged inside the rotating pleated air filters 2.

A tenth embodiment of the air filter device according to any one of the first to ninth embodiment, further comprising inflow impeller for providing spin to the inflow air into the rotating pleated air filters 2.

An eleventh embodiment of the air filter device according the ninth embodiment, wherein the fan blades being formed as with an axial angle of attack, and the inflow impeller being rotationally connected to the rotating pleated air filters 2.

A twelfth embodiment of the air filter device according to the eleventh embodiment, wherein the inflow impeller and the radial flow impeller being combined to one impeller having blades in a morphed form working as an axial to radial fan for providing an even air flow along and into the pleats of the rotating pleated air filters 2.

A thirteenth embodiment of the air filter device according to any one of the first to twelfth embodiment, further comprising pleated filter end cap 32, 41 being arranged and connected to one or both longitudinal ends of the rotating pleated air filters 2.

A fourteenth embodiment of the air filter device according to any one of the first to thirteenth embodiment, further comprising one or more ring formed foils 42 being arranged at the entrance opening of the rotating pleated air filters 2 for directing 47, 47' inflowing air and thus also for providing a safety grill to the interior of the rotating pleated air filters 2.

A fifteenth embodiment of the air filter device according to any one of the first to fourteenth embodiment, wherein an air barrier 35, 36, 34', 34" arranged mostly perpendicular to the longitudinal direction is provided at the inflow side of the rotating pleated air filter 2, to prevent ambient air flow from mixing with the air flow exiting from the rotating pleated air filter 2.

A sixteenth embodiment of the air filter device according to any one of the first to fifteenth embodiment, further comprising air directing foils 34, 34', the air directing foils 34 being radially arranged around the rotating pleated air filter 2.

An seventeenth embodiment of the air filter device according to the fifteenth embodiment, wherein where one or more rotating pleated air filters 2 are mounted inside a chassis 201, 2141, where the chassis is equipped with inlet vents 202 and outlet vents 203, 2136, and a collector 204, 2132 for guidance of air exiting the rotating pleated filters, in accordance with the air flow path generated by the one or more rotating pleated air filters 2.

An eighteenth embodiment of the air filter device according to the seventeenth embodiment, wherein the cross sectional area formed between the collector 204, 2132 and the surface of the rotating pleated air filter 2, is gradually increasing along the circumference and rotation direction of the rotating pleated air filter 2, and the collector 204, 2132 encircles only a portion of the corresponding pleated air filter 2.

A nineteenth embodiment of the air filter device according to the eighteenth embodiment, wherein the portion of a first of the one or more the pleated air filter 2 not encircled by the collector 204, 2136 is mainly directed upwards.

A twentieth embodiment of the air filter device according to the nineteenth embodiment, wherein the portion of a second of the one or more the pleated air filter 2 not encircled by the collector 204, 2136 is mainly directed to the upward rotating side of the pleated air filter 2.

A twenty-first embodiment of the air filter device according to the eighteenth embodiment, wherein a static air barrier 205 arranged mostly perpendicular to the air inflow direction is provided at the inflow side of the rotating pleated air filter 2, the static air barrier 205 have corresponding openings (206) arranged at the inlet of the rotating pleated filters 2, to prevent ambient air flow from mixing with the air flow exiting from the rotating pleated air filter 2.

A twenty-second embodiment of the air filter device according to any one of the first to twenty-first embodiment, further comprising a set of statically arranged longitudinal lamellas 48, encircling the rotating circular formed pleated air filter 2 reaching radially outwards and tangential in the direction of the exiting air flow to further improve the suction effect and the overall flow rate.

A twenty-third embodiment of the air filter device according to any one of the first to twenty-second embodiment, wherein the cylinder formed pleated air filter 2 has a conical shape, and the cone diameter is largest at the inflow opening.

An twenty-fourth embodiment of the air filter device according to any one of the first to twenty-third embodiment, further comprising pleated air filter assembly formed to comprise two or more radially spaced cylinder formed pleated air filters 2.

A twenty-fifth embodiment of the air filter device according to the twenty-fourth embodiment, wherein an airtight cylinder formed sleeve 160 being arranged between any of two adjacent radially spaced cylinder formed pleated air filters 2 and wherein the cylinder formed sleeve 160 being connected to the inner side of the outermost cylinder formed air filter at the output side, and having a relative decreasing diameter relative the cylinder formed air filter towards the inflow side of the cylinder formed air filter, and connected to the outer side of the innermost cylinder formed air filter closest to the input side of the device such that outflow spaces 162 are defined between the two cylinder formed air filters for exhausting filtered air outside the innermost filter, and inflow spaces 161 for guiding inflow air to the inside the outermost filter.

A twenty-sixth embodiment of the air filter device according to the twenty-fifth embodiment, wherein radial fan blades are arranged as longitudinal lamellas 144 mounted radial spaced apart and shaped to maintain a static distance between the airtight cylinder formed sleeves and the cylinder formed air filters.

A twenty-seventh embodiment of the air filter device according to any one of the first to twenty-sixth embodiment, further comprising an outer casing 70, the outer casing defining a confinement with an inflow side 73 and an exhaust side 74, the inflow side 73 corresponds to inflow end of the filter, and the exhaust side corresponds to the side where exit air from the rotating cylinder formed pleated air filter 2 is lead.

A twenty-eighth embodiment of the air filter device according to the twenty-seventh embodiment, wherein the outer casing 70 has a mainly square duct shape.

A twenty-ninth embodiment of the air filter device according to any one of the first to twenty-eighth embodiment, further comprising: a low noise air directing device 48, 50 arranged peripherally to the filter for directing the exhaust airflow with a directional distribution outside the filter to provide optimal flow distribution.

A thirtieth embodiment of the air filter device according to the twenty-ninth embodiment, wherein the air directing device 50 is rotationally connected to the filter.

A thirty-first embodiment of the air filter device according to the thirtieth embodiment, wherein the air directing device comprising: nozzle openings 51 for providing air jet flow in a direction opposite to the rotating direction of the rotating fan assembly to reduce power consumption and exit air velocity.

A thirty-second embodiment of the air filter device according to any one of the first to thirty-first embodiment, wherein the one rotating cylinder formed pleated air filter 2 further comprise an integrated cone formed fan element 44, 44' arranged to taper from its largest diameter arranged at the deepest point for the air to exit through the rotating cylinder formed pleated air filter 2, and the cone tapers away from the filter inside towards the inflow area of the rotating cylinder formed pleated air filter 2, such that better control of the distribution of the deeper air flow along the inner filter surface is provided.

A thirty-third embodiment of the air filter device according to the thirty-second embodiment, wherein two oppositely arranged cone formed fan element 44, 44' with associated impellers 40, 40' ensures inflow air distribution from both sides of the filter.

A thirty-fourth embodiment of the air filter device according to any one of the first to thirty-third embodiment, further comprising a set of tiltable capsule formed blades 49 arranged outside the rotating cylinder formed pleated air filter 2 for providing air channels with exit jets in-between for direction exiting air in preferred angles relative the horizontal plane, the capsule formed blades 49 having capsule formed blades connector element 49' at a longitudinal middle on the inside of each capsule formed blades 49.

A thirty-fifth embodiment of the air filter device according to the thirty-fourth embodiment, wherein the capsule formed blades connector element 49' is a pivot pin, and each pivot pin 49' is formed to be gripped by a corresponding gripping element on the middle section of the outside of the rotating cylinder formed pleated air filter (2).

First Priority Applications: No. 20190246 and NO20190522

The overall goal for the invention of the first and second priority is therefore to provide an extremely compact and complete ventilation device and system for room ventilation wherein the mentioned tradeoffs are eliminated or considerably reduced.

The invention, a ventilation device and a system, is provided comprising in a first embodiment a unit casing and a compact rotating heat exchange unit, a dual acting fan, a filter unit, arranged inside the unit casing, and a first embodiment of a room unit. The parts comprised in the ventilation device provides a dual air flow channel design, enabling a simultaneous dual directional and optimized air flow through the ventilation device.

In a further second embodiment the ventilation device and system is provided comprising a unit casing, a dual mode fan assembly, and an optional filter unit, arranged inside the unit casing and a second embodiment of a room unit, enabling a simultaneous dual directional and optimized air flow through the ventilation device optimized for ventilating houses and rooms, where there is a wish to maintain a higher or lower temperature inside the house/rooms than outdoor. The internal duct assembly may comprise a static filter.

In yet a further third embodiment the ventilation device of either the first or second embodiment is optimized for arrangement in thick wall structures, comprising duct extender assembly where the unit casing is correspondingly extended to provide a length corresponding to the thickness of the wall.

The first and second embodiment may be provided as multi-operation-mode device wherein the rotating heat exchange unit and the room unit of the first embodiment is exchangeable with a summer mode assembly comprising the internal duct assembly and optionally the large static filter and the room unit of the second embodiment, without needing to dismount the unit casing.

The dual mode fan may in a fourth embodiment of the invention be combined with a counter flow heat exchanger, providing an optimized unit for drying out rooms having a moisture and/or radon problem, such as in cellars.

Figure 100:
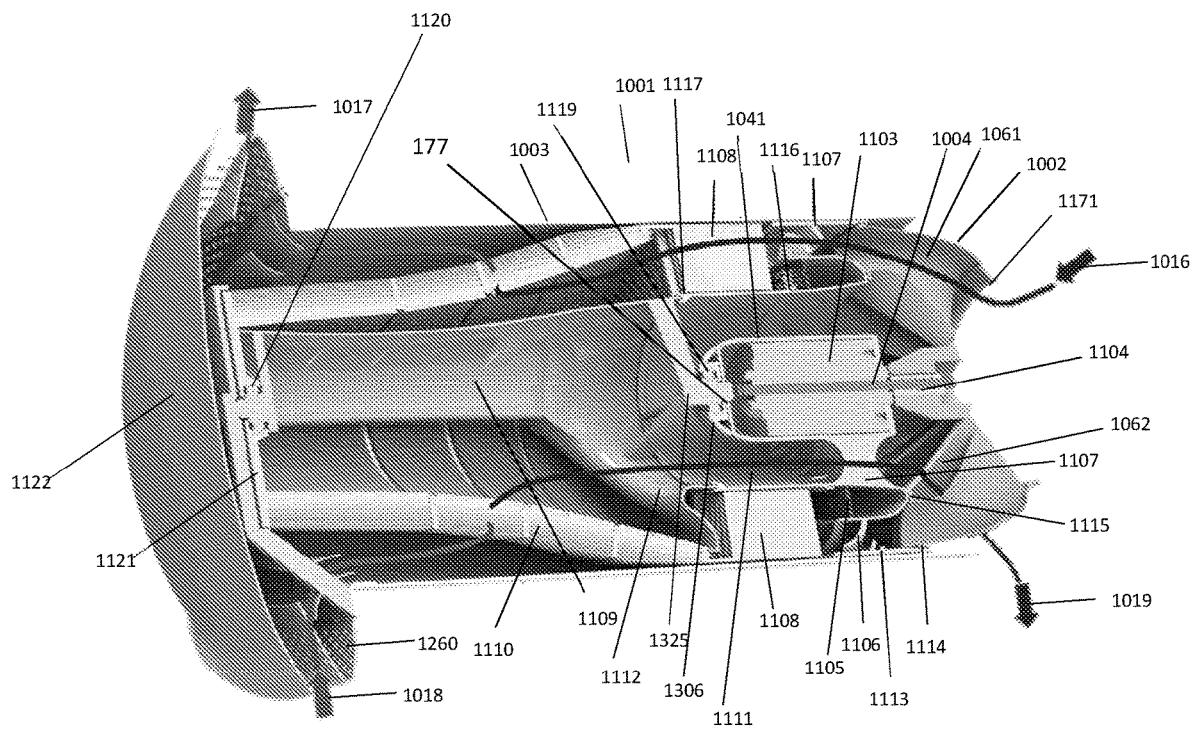
Figure 102:
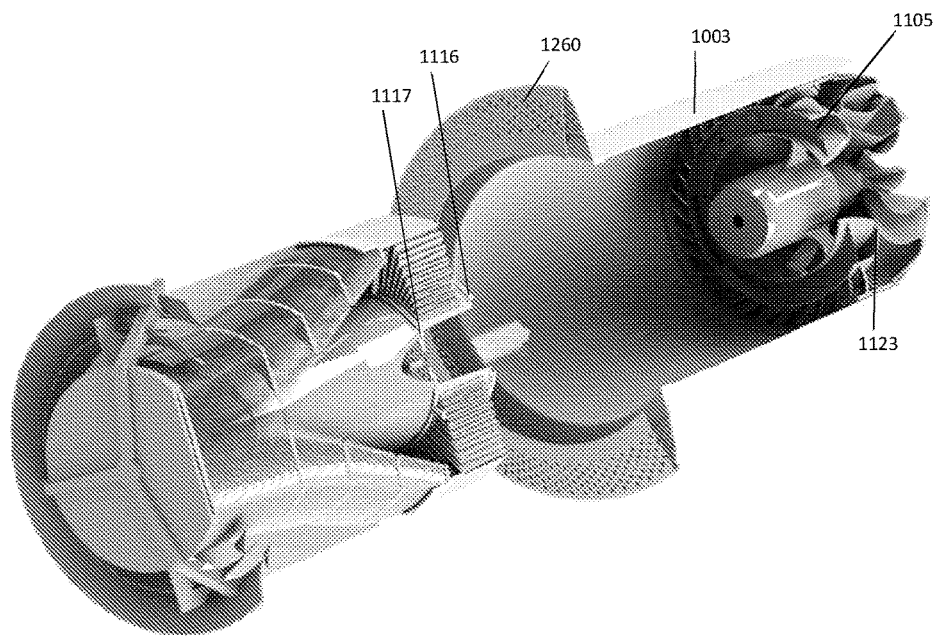
Figure 103:
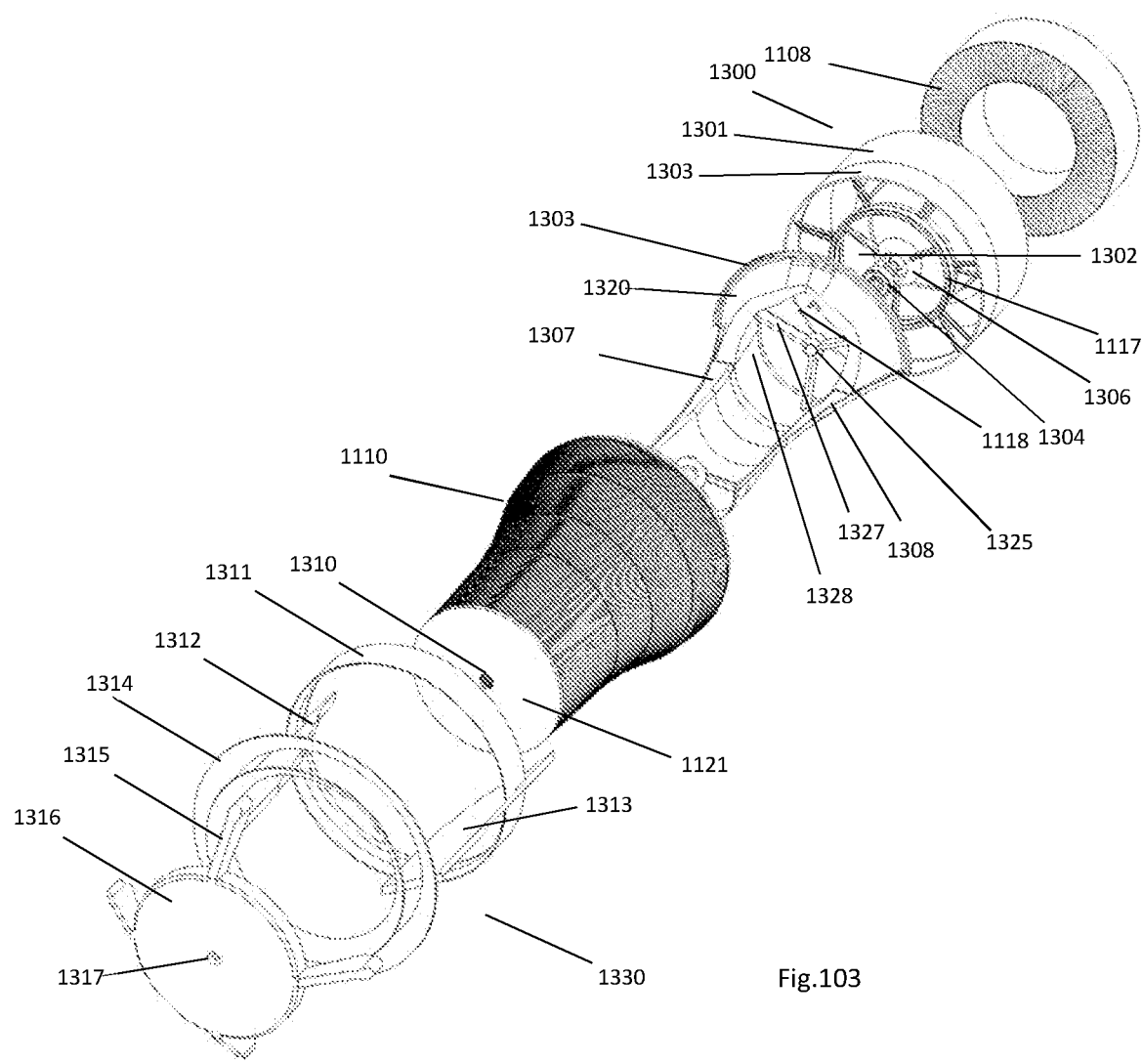
Figure 104:
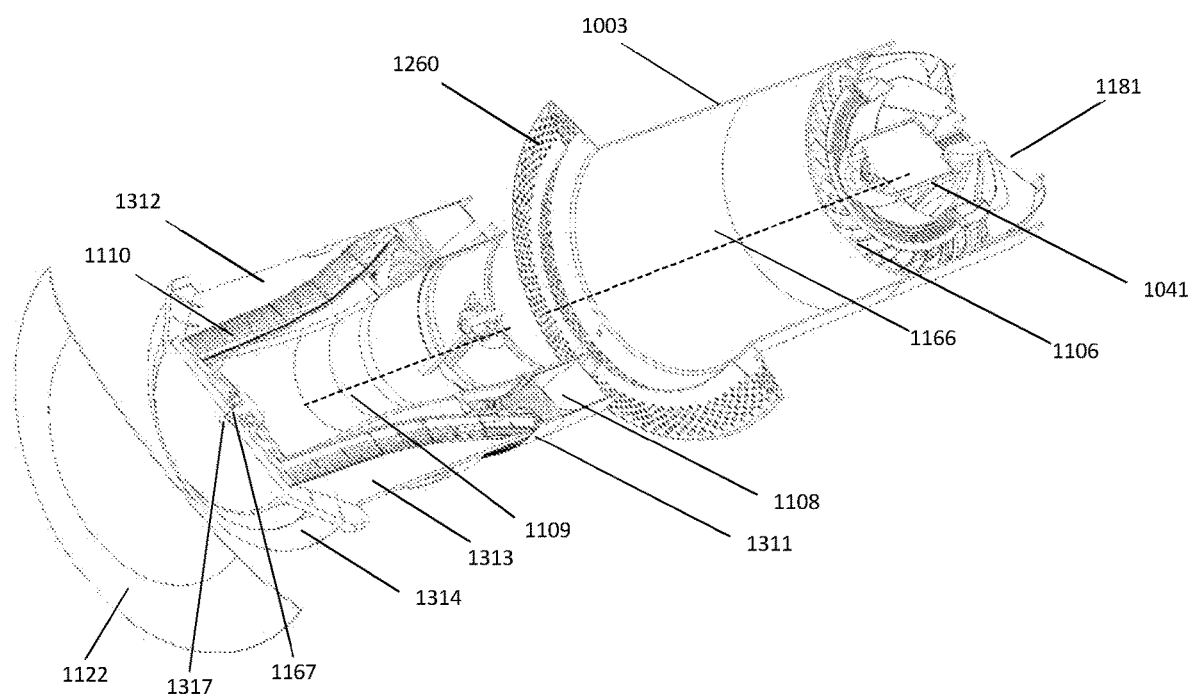
Figure 105:
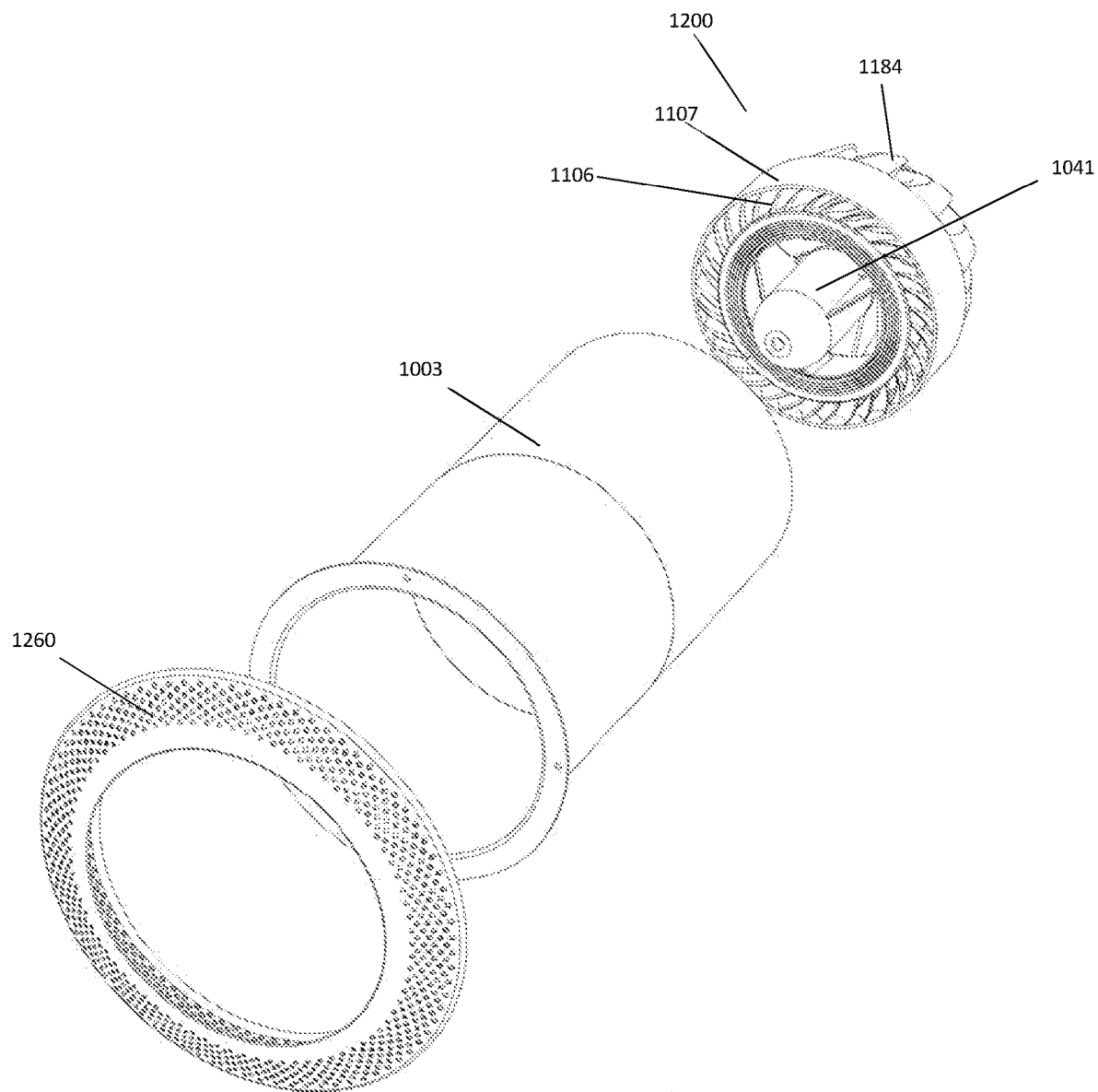
Figure 106A:
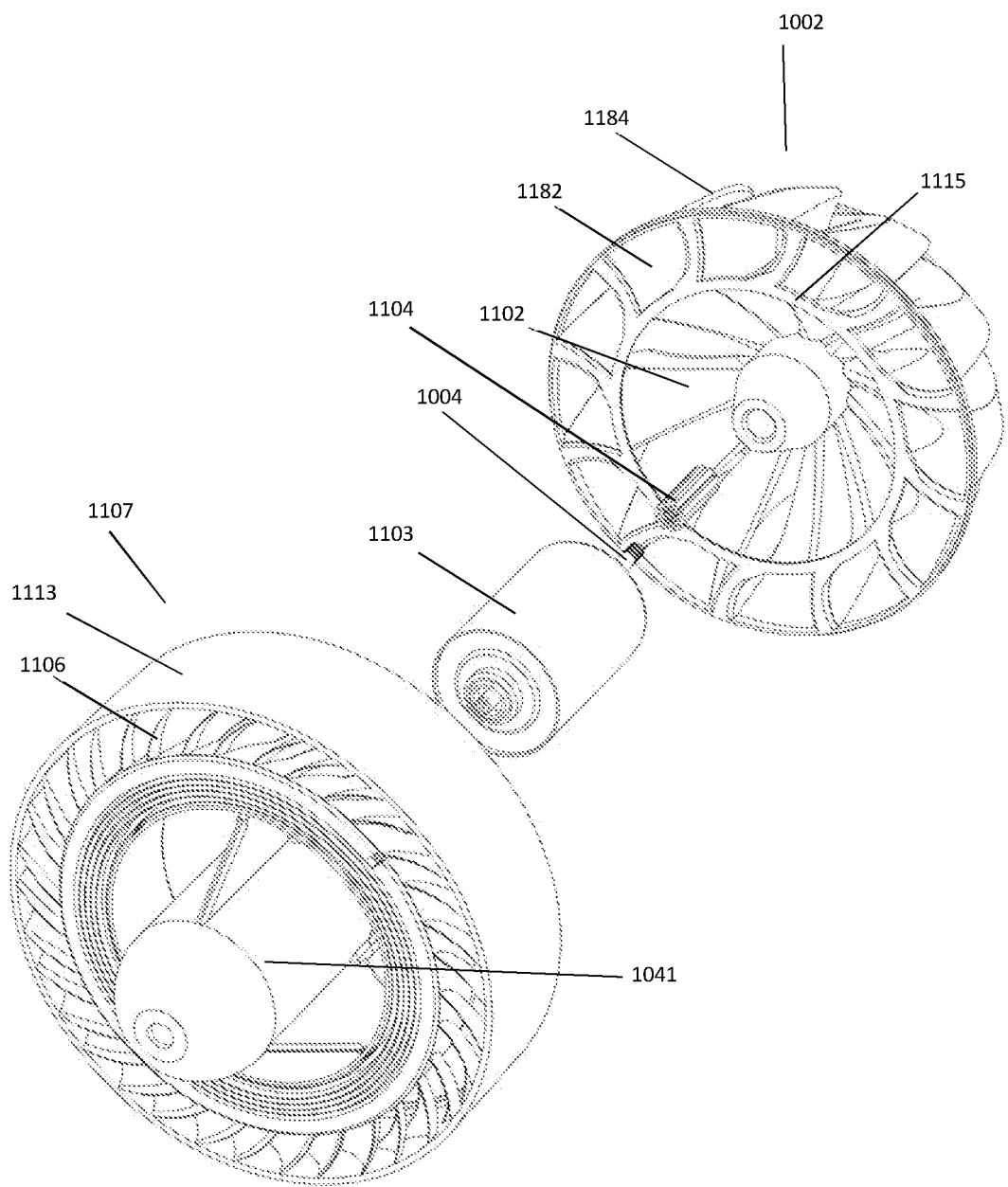
Figure 106B:
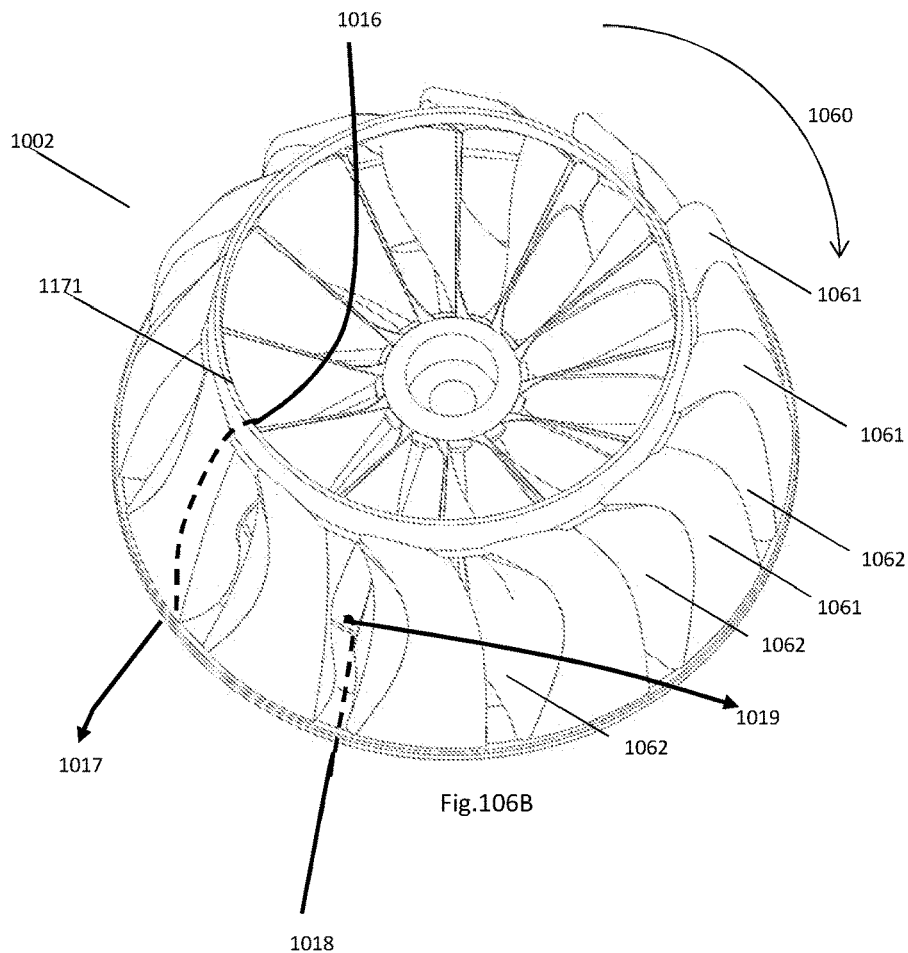
Figure 106C:
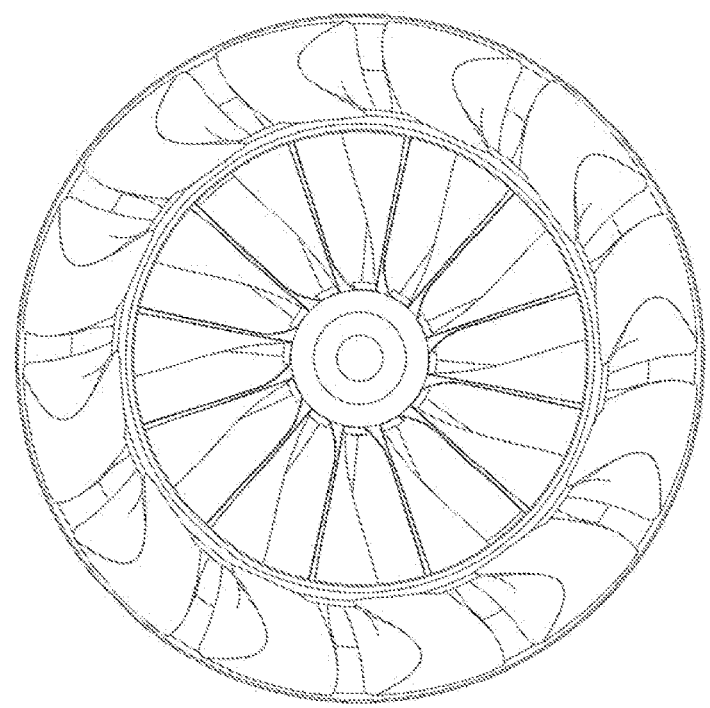
Figure 107:
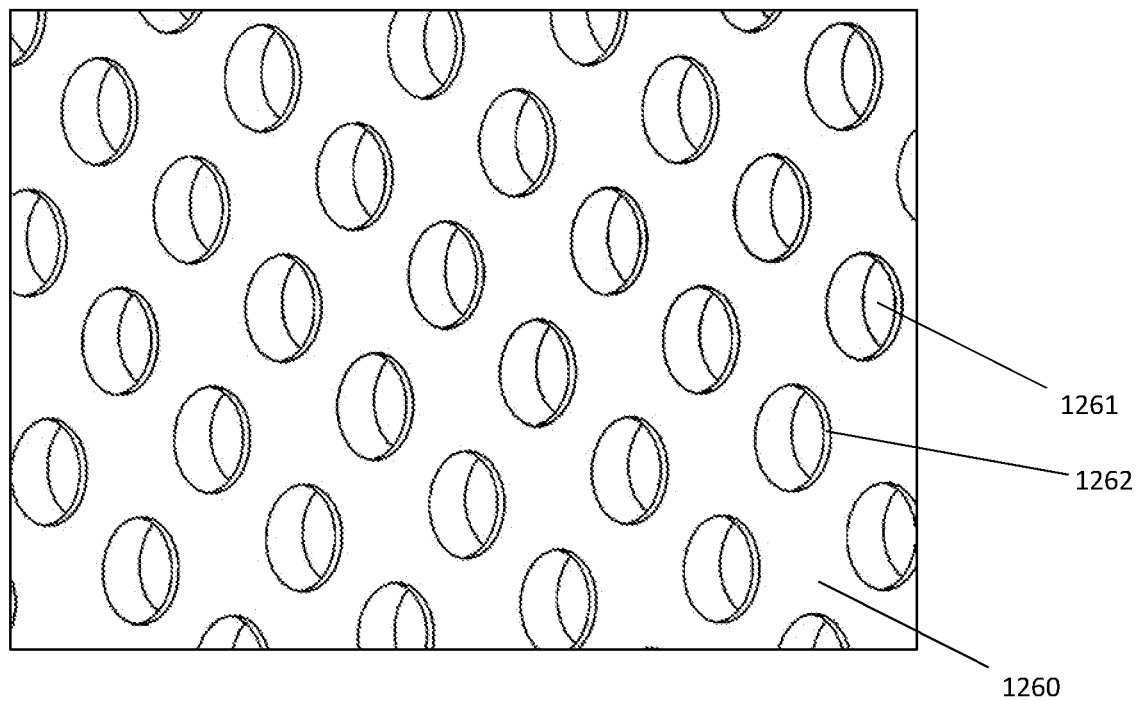
Figure 108:
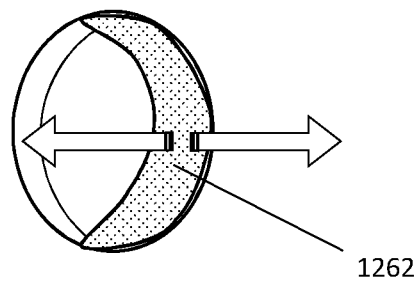
Figure 109:
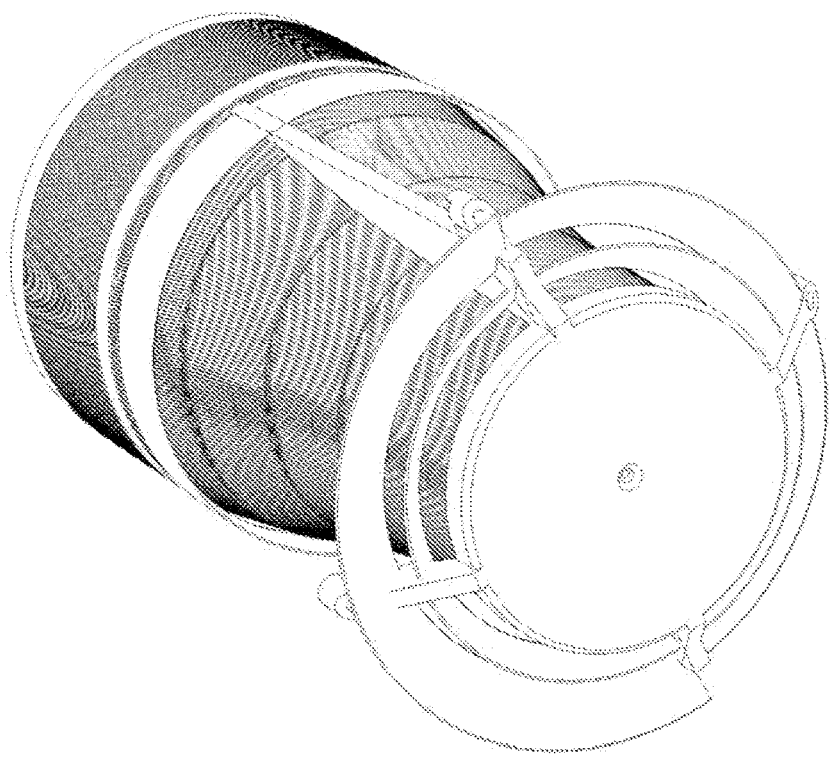
Figure 110:
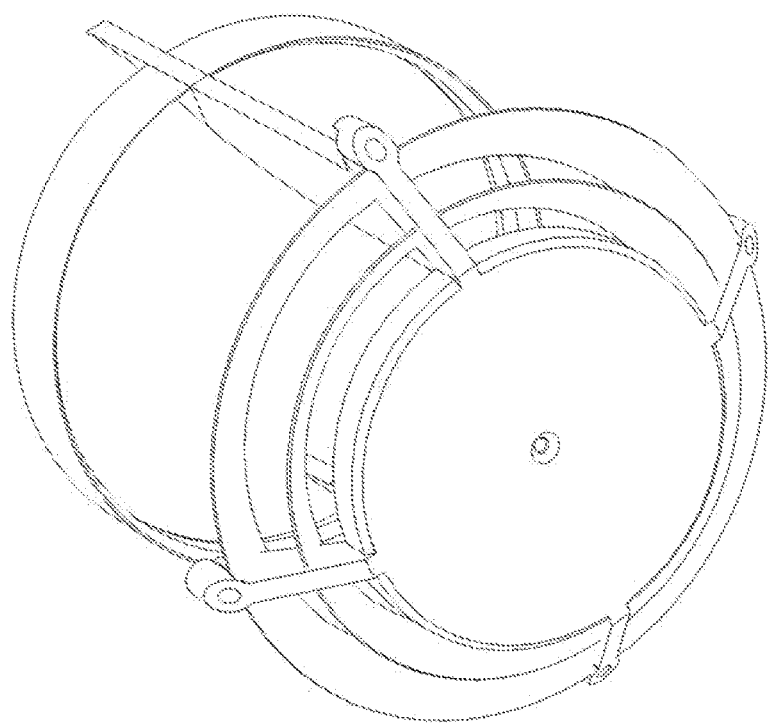
Figure 111:
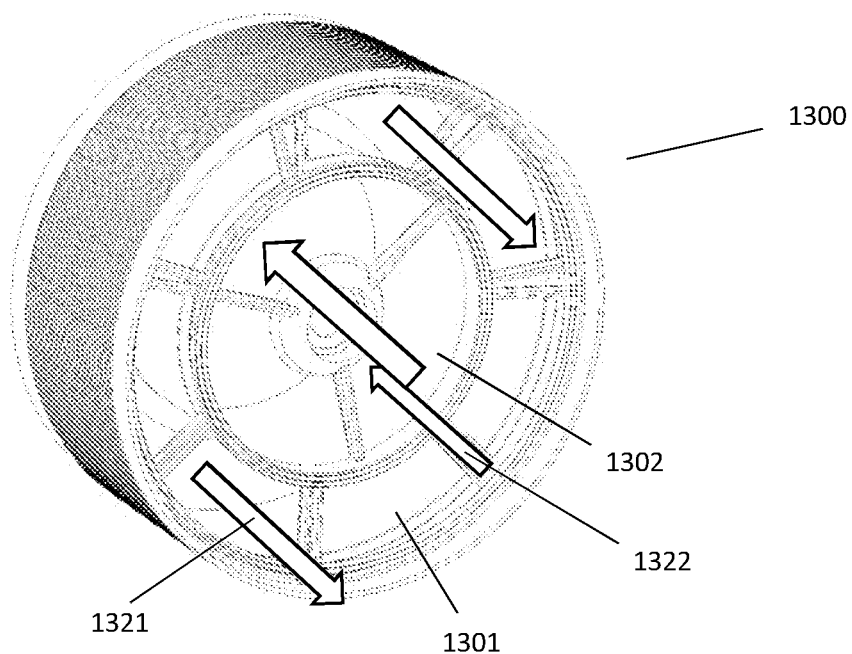
Figure 112:
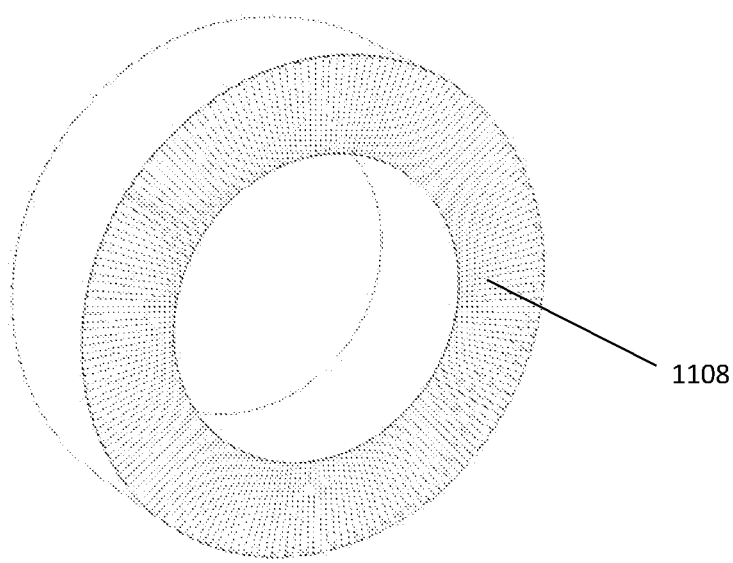
Figure 113:
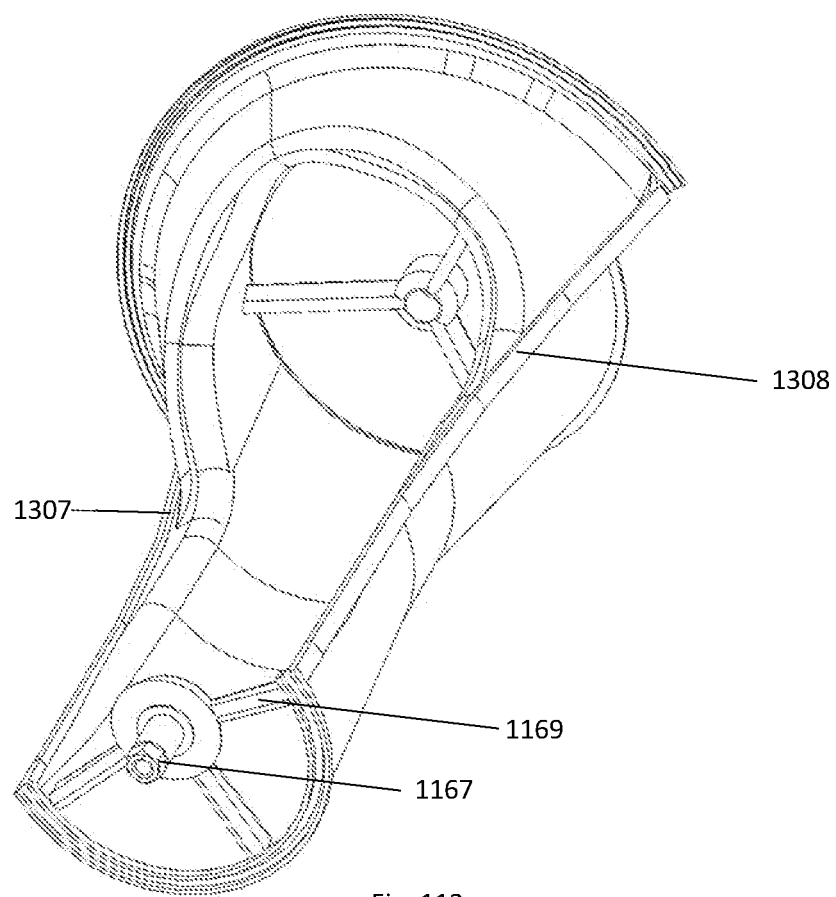
Figure 114:
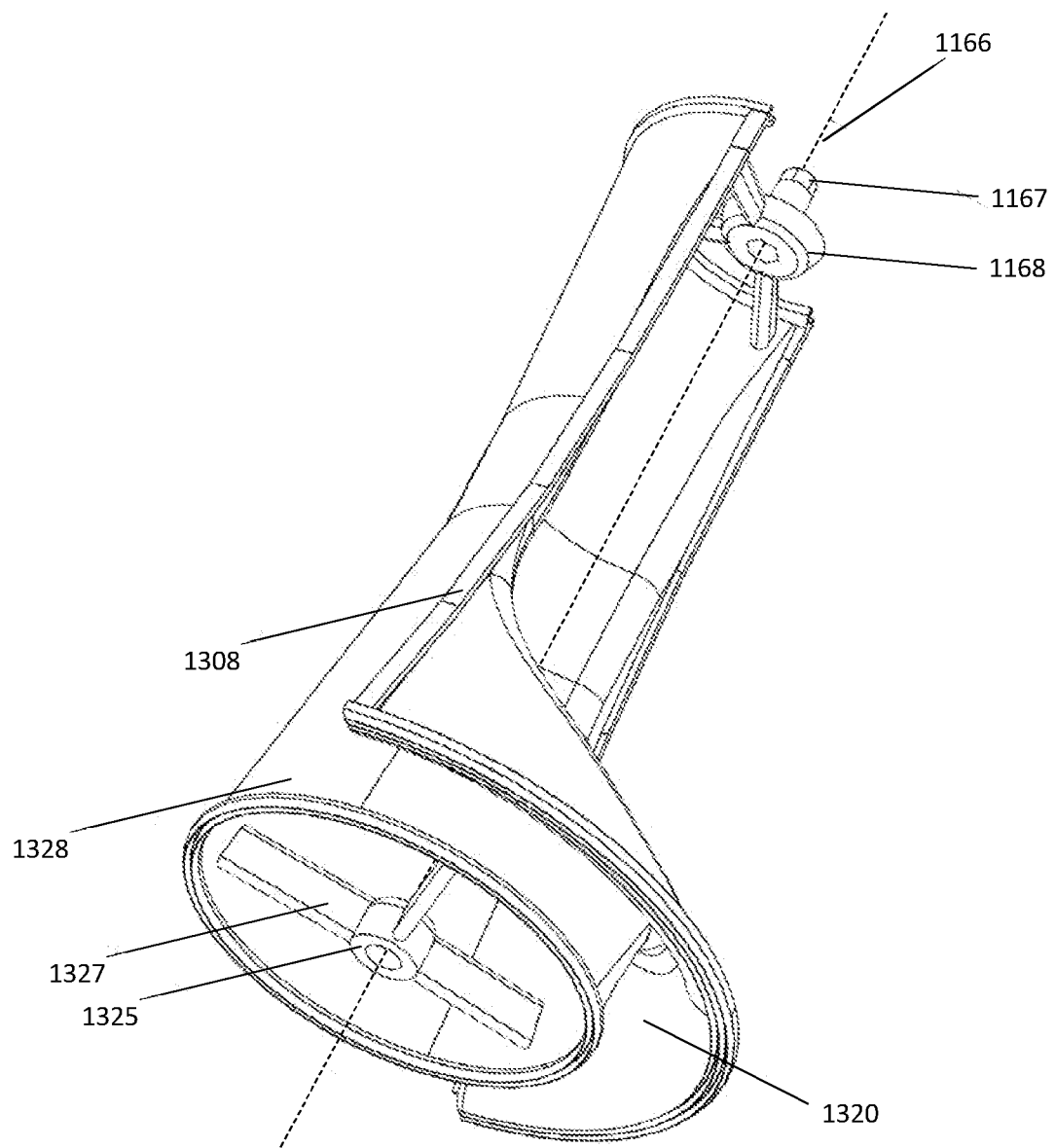
Figure 115:
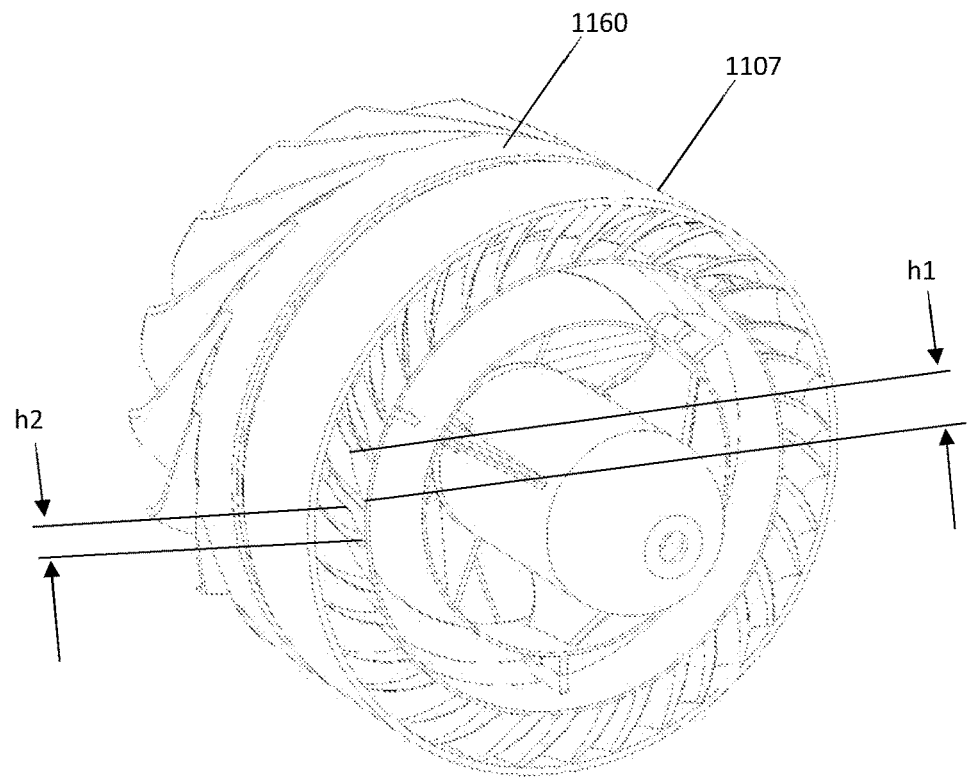
Figure 116:
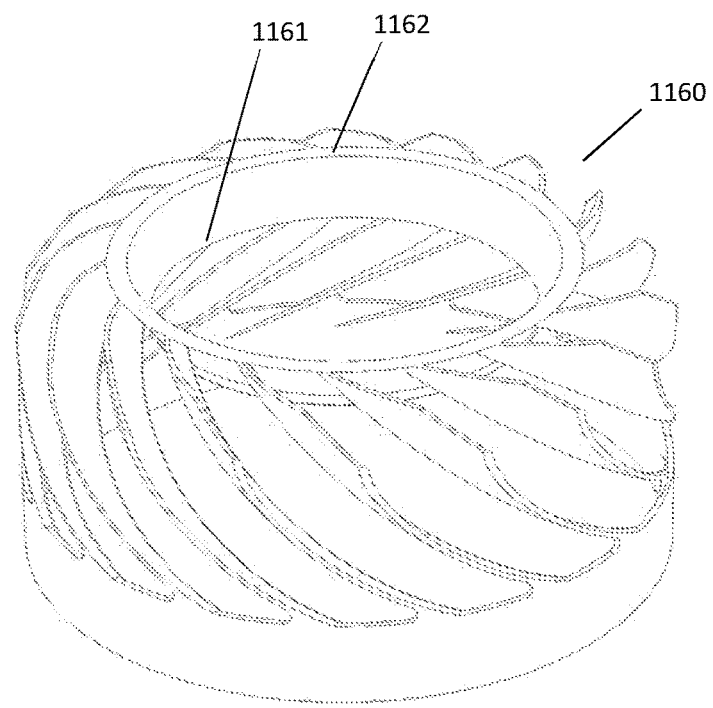
Figure 117:
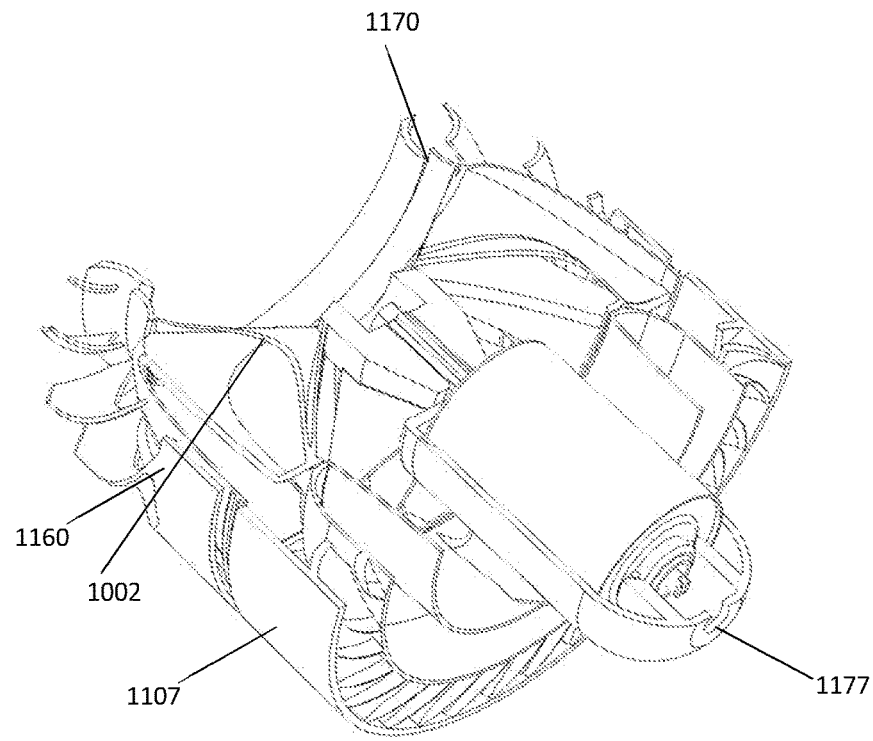
Figure 118:
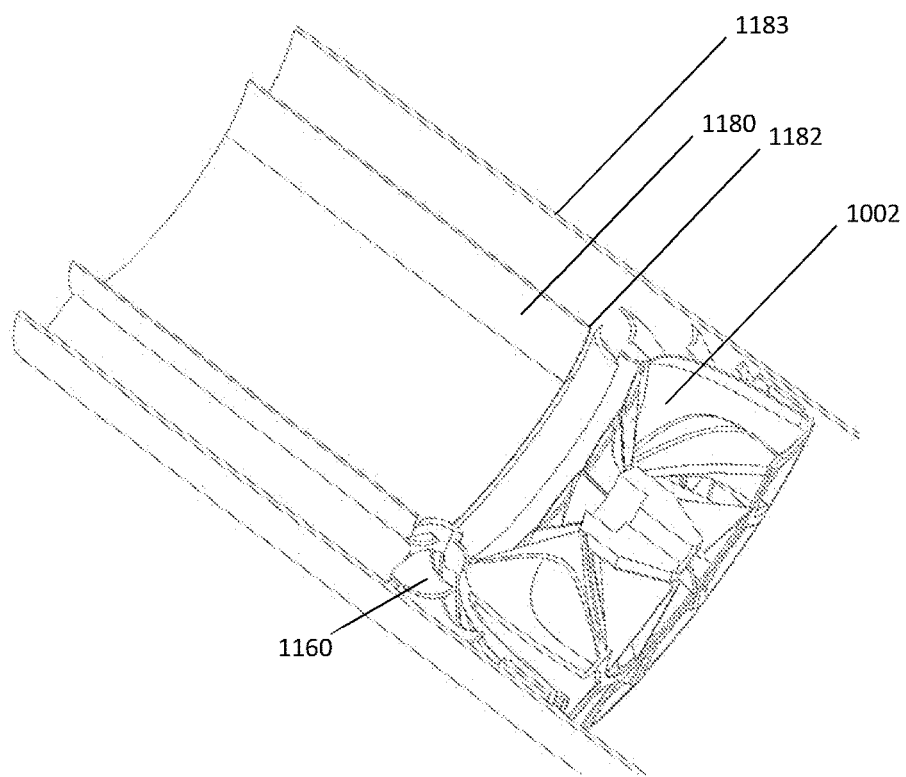
Figure 121A:
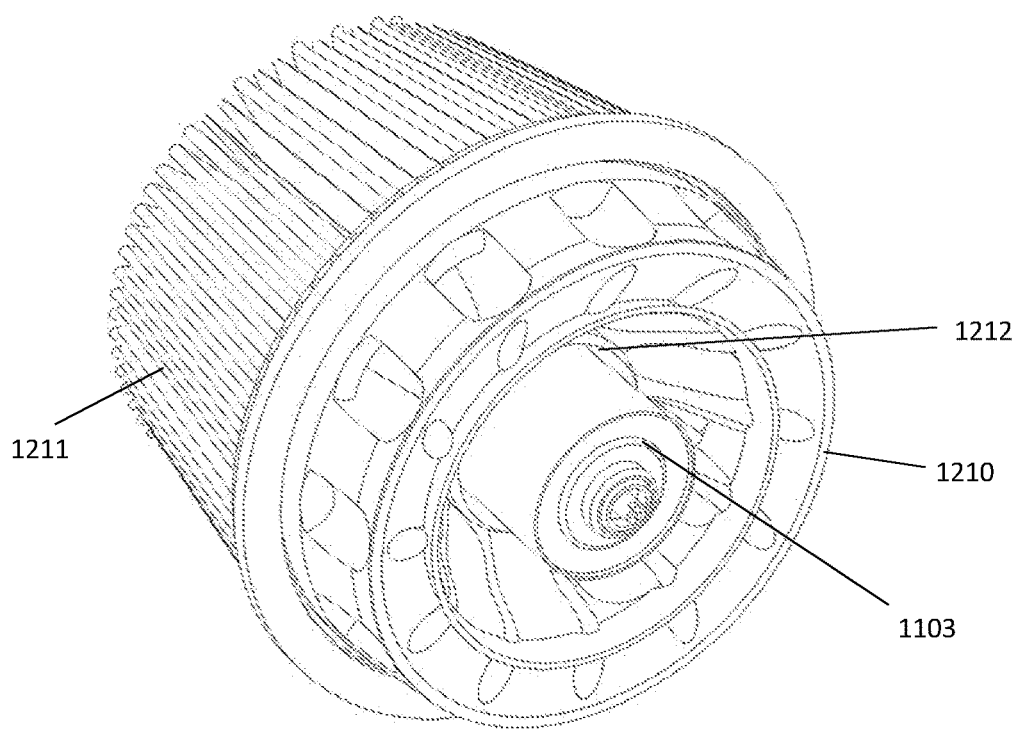
Figure 121B:
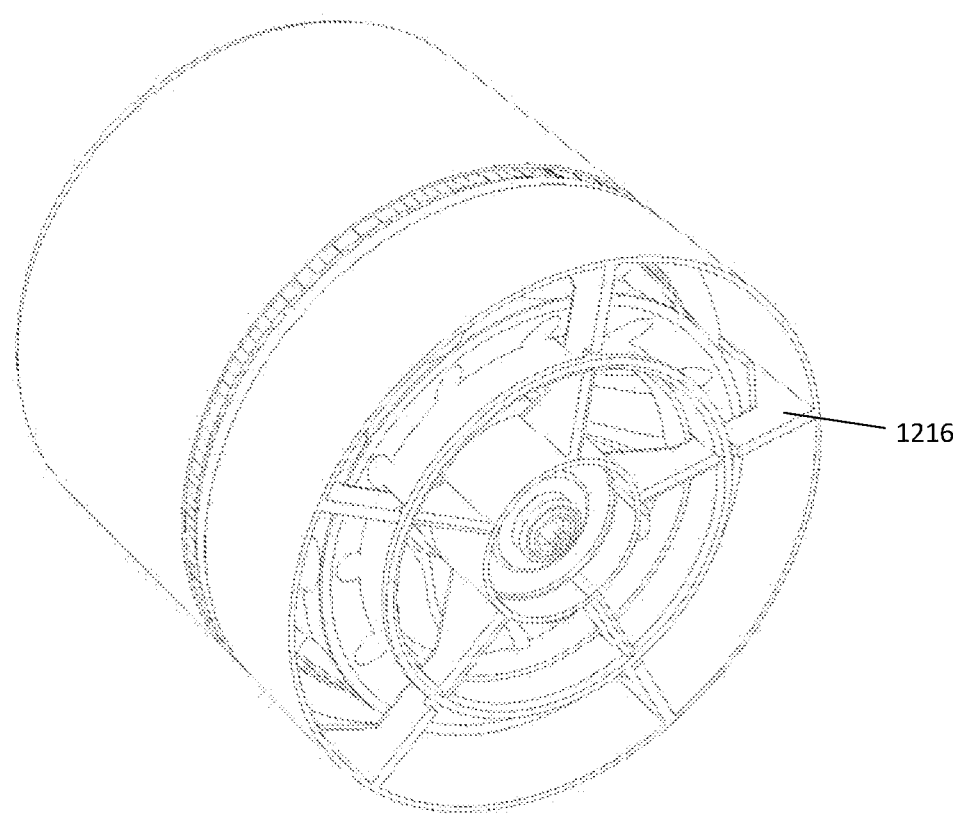
Figure 121C:
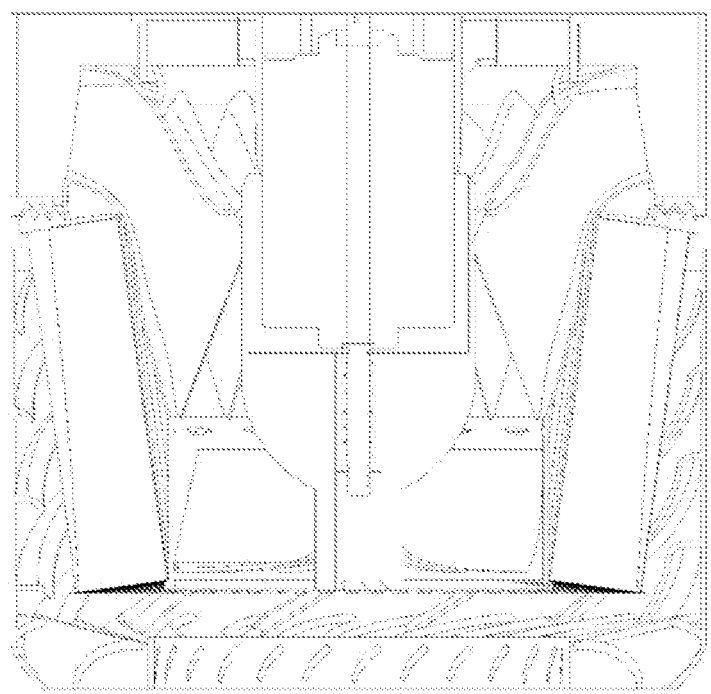
Figure 121D:
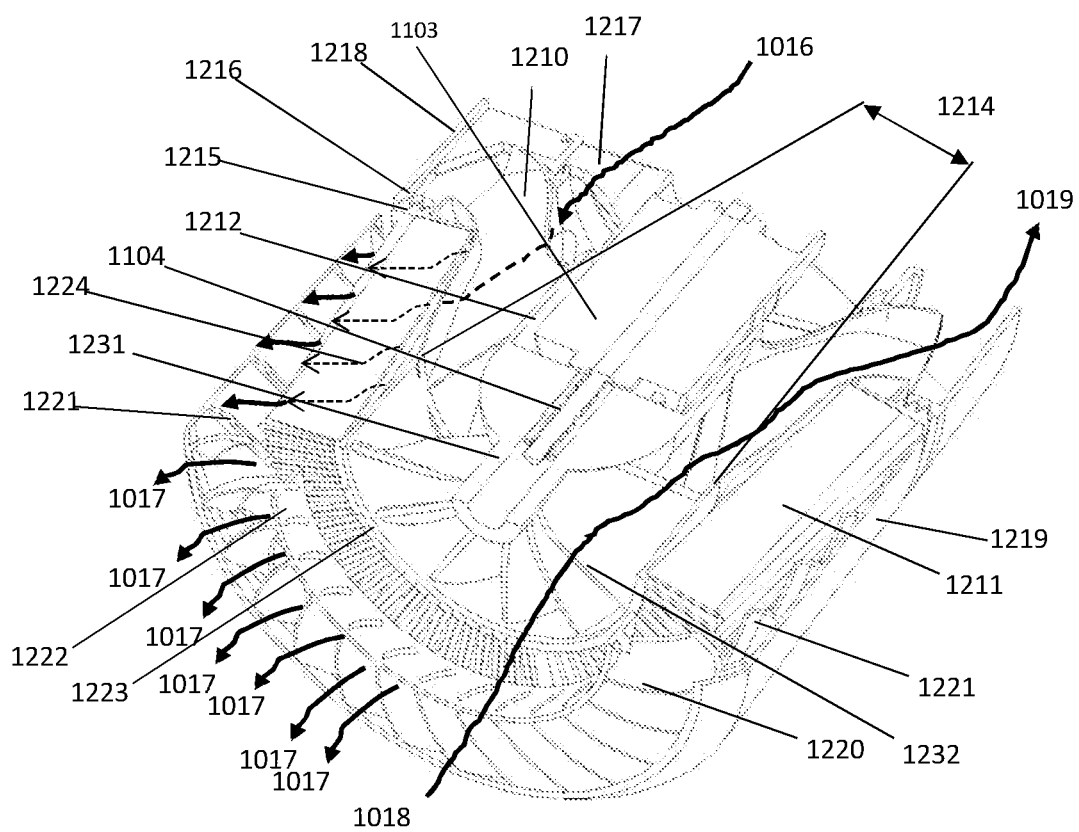
Figure 121E:
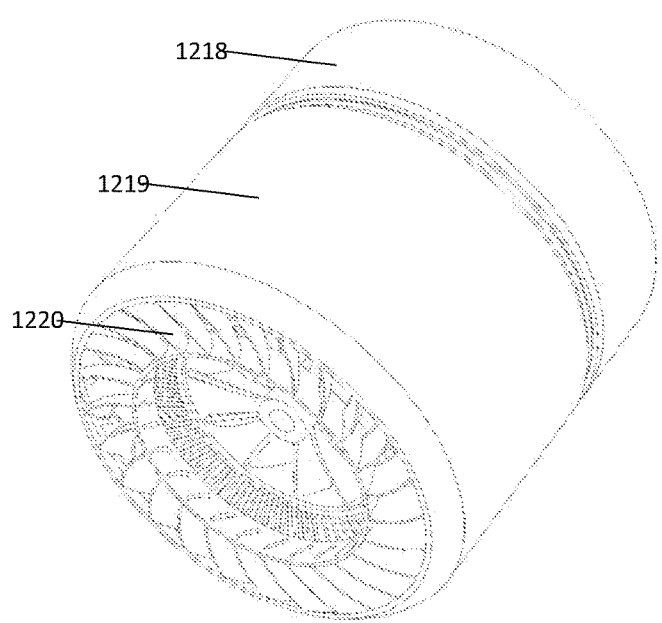
Figure 122A:
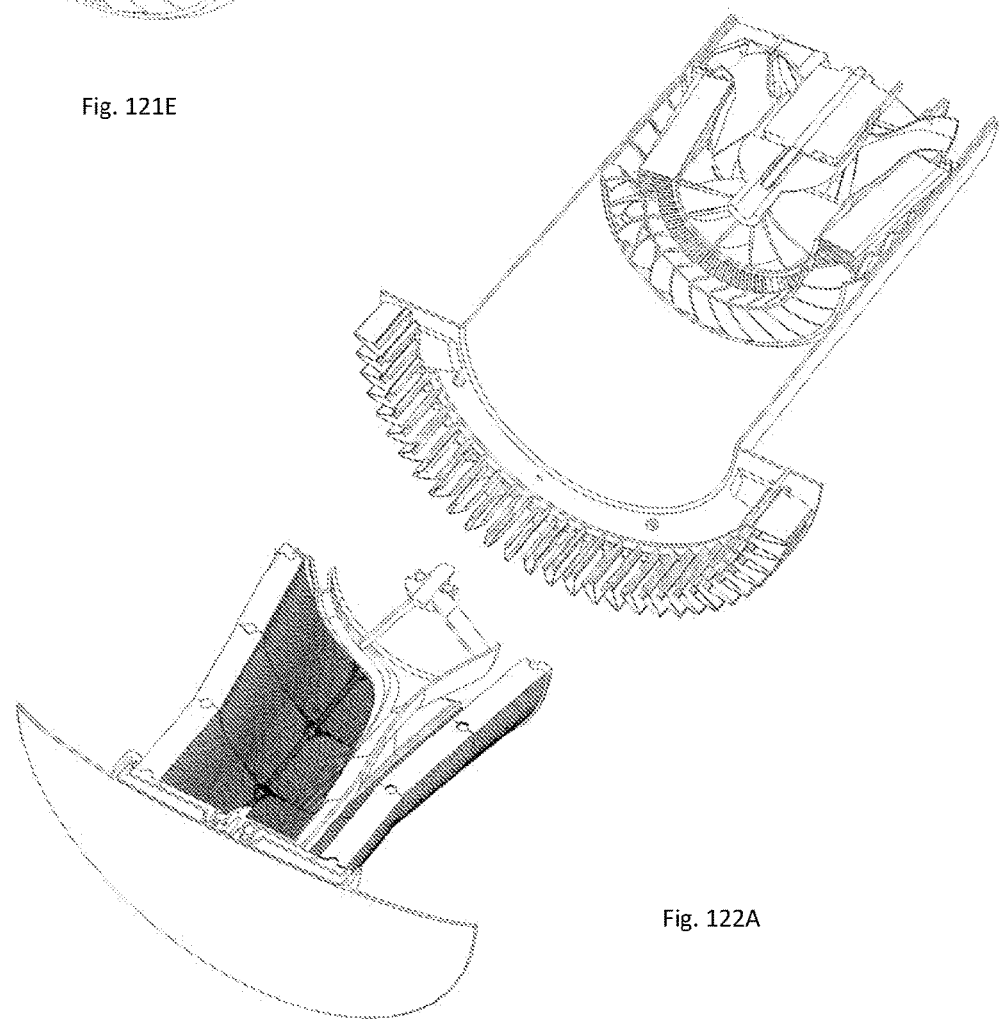

Additional features and advantages of the invention are described in, and will be apparent from, the following brief description of the figures and the following detailed description, wherein:

FIG. 100—Ventilation unit cross section
FIG. 102—Ventilation unit with heat exchange module in an outdrawn position
FIG. 103—Internal elements filter to end cap; Winter heat exchange module, exploded view
FIG. 104—Ventilation unit, cross section, heat exchange module in an outdrawn position
FIG. 105—Ventilation unit without module, exploded view of impeller module, casing and end protection cap
FIG. 106A—Dual mode fan an assembly, exploded view
FIG. 106B—Dual mode impeller, outside oblique view
FIG. 106C—Dual mode impeller, outside view from above
FIG. 106D—Air flow to and from impeller, schematic view
FIG. 107—One embodiment of flow restrictor design
FIG. 108—Detail of flow restrictor in FIG. 107
FIG. 109—Heat exchange module and outside flow separator knifes
FIG. 110—Static outside flow separator knifes
FIG. 111—Filter unit
FIG. 112—Filter
FIG. 113—Center duct structure, bottom oblique view
FIG. 114—Center duct structure, top oblique view
FIG. 115—Outer air director unit for duct extender version of ventilation device and fan assembly.
FIG. 116—Outer air director
FIG. 117—Cross section of dual mode fan assembly and outer air director
FIG. 118—Cross section of dual mode impeller, outer air director, and sleeve extender.
FIG. 119A—Summer module and room unit
FIG. 119B—Summer module and room unit, cross section
FIG. 119C—Summer module, fan unit, and room unit, cross section
FIG. 120—Heat exchange module, fan unit, and room unit, cross section
FIG. 121A—Impeller assembly w/rotating filter, from outdoor side view
FIG. 121B—Impeller assembly w/rotating filter and casing, motor and motor fastening means from outdoor side view
FIG. 121C—Impeller assembly w/rotating filter, cross section side view
FIG. 121D—Impeller assembly w/rotating filter, from outdoor side cross section oblique view
FIG. 121E—Impeller assembly w/rotating filter and casing, motor and motor fastening means from indoor side view
FIG. 122A—Ventilation unit comprising Impeller assembly w/rotating filter, cross section, heat exchange module in an outdrawn position
FIG. 122B—Ventilation unit comprising Impeller assembly w/rotating filter, cross section—side view
FIG. 122C—Ventilation unit comprising Impeller assembly w/rotating filter, cross section—oblique view
FIG. 123A—Ventilation unit comprising Impeller assembly w/rotating filter, cross section
FIG. 123B—Ventilation unit comprising Impeller assembly w/rotating filter, cross section, Heat exchange module assembly outdrawn
FIG. 123C—Ventilation unit comprising Impeller assembly w/rotating filter, cross section, Heat exchange module assembly and impeller assembly outdrawn In the following description the use of specific terms shall be interpreted widely and at least in the meaning as defined in the following:

Air/Gas Flow Directions:

Supply air: is defined to be from the fresh air side through the ventilation device.

Exhaust air: Return air going the opposite direction to Supply air through the ventilation device.

Outdoor: is used to define the fresh air side of the ventilation device, whereas the indoor side is the opposite side of the ventilation unit.

Dual mode impeller: Rotating device for pumping supply and exhaust air simultaneously in two opposite directions.

Dual mode fan: Dual mode, or two-way impeller, motor, motor casing and air director.

Air: The device of the invention is primarily adaptable to be used for air ventilation, but the device and system may be used in any type of gaseous environment. When the term "air" is used in this document, it shall be understood to comprise the meaning of any type of gas.

Heat transfer medium: Porous medium with a large temperature gradient that transfer heat between exhaust air and the supply air.

Heat exchange module: Heat transfer medium including components that directs flows of air through heat transfer medium.

Summer module: A static module, substituting the heat exchange module, optionally comprising a large filter.

Filter module: Filter casing and filter for filtering supply air. The filter module may be connected in rotating connection with the heat transfer medium for transferring the angular momentum needed to rotate the heat transfer medium.

Unit casing: Casing adapted to embrace all parts of the ventilation unit.

Motor housing: A rigid housing that serves as a casing for the impeller motor, that may support one end of a center shaft holding the heat transfer medium.

Supply air director: A part of the dual mode fan comprising foils that may support the motor housing, and reduce rotational spin of the supply air flow from the impeller.

Room unit: A unit on the room side of the inner walls comprising a box/housing/chassis, and ducting adapted for optimal throughput of supply air and exhaust air in various embodiments of the ventilation device.

A valve assembly: An air flow restricting feature comprising a plurality of movable restrictors, typically of an elastomer, for dynamic choking of supply and/or exhaust air, a valve motor and a valve gear assembly.

Now the invention will be described in more detail, with references to the figures where appropriate.

In the following the ventilation device of the invention will be described as part of a complete air handling system arranged for ventilating a room, the room having a wall construction through which a duct sleeve is provided between the room itself and an outside fresh air environment into which the ventilation device will be arranged. The ventilation device may comprise modules for heat exchange, simultaneous two-way air flows, dual mode fan, valve assembly, air filters, and airflow direction guides, as well as duct sleeve and unit casing. It should be understood that the various modules could be implemented as a whole or in various combinations without deviating from the inventive concept. It shall be the claims that define the protection scope of the invention.

In a first embodiment as illustrated in FIG. 101 to 108 the ventilation device 1001 of the invention comprises an dual mode fan 1200, the dual mode fan 1200 comprising a dual mode impeller 1002 mounted to a motor shaft 1004 via a motor shaft casing 1104 receiving a protruding portion of the motor shaft 1004, the motor shaft casing 1104 being centrally longitudinal positioned in the dual mode impeller 1002 and providing a resilient holding force of the received motor shaft 1004, wherein the dual mode impeller 1002 when rotated by the force of the rotating motor shaft, produce an supply airflow 1016, 1017 and an exhaust airflow 1018, 1019. The dual mode impeller 1002 may be rotated by an impeller motor 1103 arranged inside the ventilation device 1001 on the inside side of the impeller 1002. The motor is powered by a power source (not shown) connected to the motor by cable and control lines (not shown).

A control unit 1105 that may be integrated in a supply air director 1107 providing a casing supporting a motor housing 1041 on the inside side of the dual mode impeller 1002, may comprise integrated circuitry and programs for monitoring sensors, processing and/or communicating sensor data and controlling the dual mode fan. Sensors and electronics may be integrated into any part of the ventilation unit, and may sense one or more physical properties like fan speed, air flow, air pressure, air temperature, noise, vibration, moisture, or other. Control features may be implemented in the control unit 1105 to avoid malfunction and optimize efficiency.

In one embodiment of the invention the impeller 1002 is designed in a shape as illustrated in detail in FIGS. 1, 2, 5 and 6A/B. When the motor 1103 is activated and providing a spin 1060 of the impeller 1002, a flow of air 1016 is sucked to the central area 1181 of the outdoor side of the impeller 1002 into a set of supply air channels 1061. The supply channels of the impeller works in a turbine like manner, gaining pressure when air is transported through the radial acceleration field and exiting through an outer orbital ring area 1182 of the indoor side of the impeller 1002. The supply air will thus have acquired rotational forces when exiting the impeller 1002.

After entrance the supply air channels 1061 split to occupy just a portion of the cross sectional area giving room to the exhaust air channels 1062 crossflowing in-between the supply channels 1062. The walls of the supply channels 1061 are shaped to simultaneously provide the walls of the aerodynamic exhaust channels 1062. The exhaust channels 1062 transport exhaust from an inner central part 1102 of the indoor side of the dual mode impeller 1002 to the outer orbital area 184 of the outdoor side of the dual mode impeller 1002. Thus the dual mode impeller 1002 drives airflow simultaneously in two directions, from outdoor side 1016 to indoor side 1017, and from indoor side 1018 to outdoor side 1019.

Figure 106D:
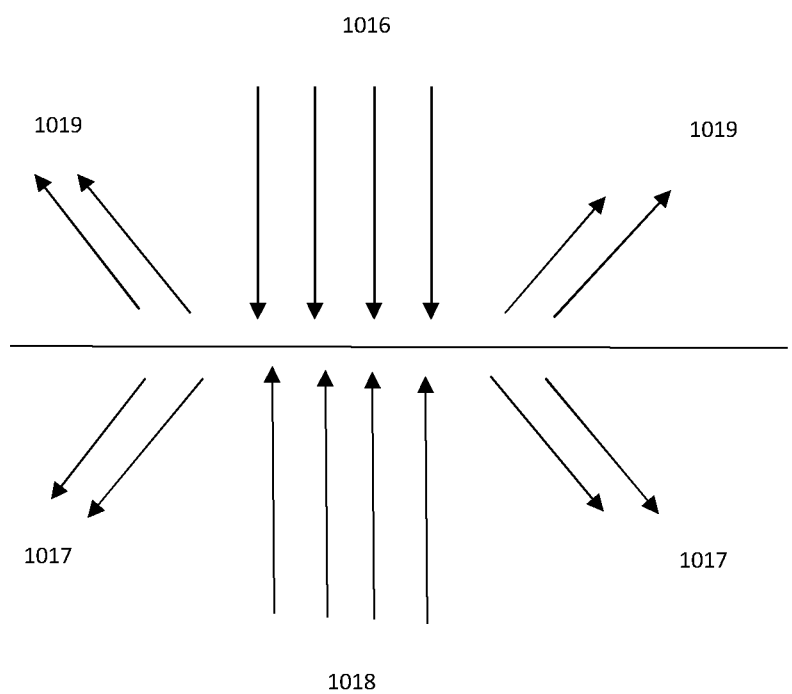

FIG. 106D illustrates schematically how the air flows flow into and out of the impeller on the outdoor side above the horizontal line and on the indoor side below the horizontal line.

There are typically 12 separate channels in each direction, but other design may be provided with fewer or more channels.

Looking now at a first embodiment of the ventilation device 1001 from outdoor side towards indoor side, the supply air flow flows from the dual mode impeller unit through an air director unit 1107 comprising foils 1106. The foils 106 of the air director 1107 is provided for stopping most of the rotational forces of the supply air which results from the rotation of the dual mode impeller 1002. The foils 1106 may be arranged to provide two or more entrance heights h1, h2 to reduce the surfing effect that occurs when encountering boundary layers at "low angle" approach. The air director 1107 is arranged with an orbital flow-through path peripheral outside of a central duct 1111 wherein the motor housing 1041 is arranged. The air director unit 1107 is further providing a supporting structure forming fastening and compartment for optional printed circuit board(s) 1105 and for fastening of the motor housing 1041, the motor housing having a center portion 1177 on its indoor side for providing a connecting point for a fixed center duct structure 1109, 1112. The supporting structure of the air director unit 1107 may also comprise an outer circular wall 1113 having an outer diameter corresponding to the inner diameter of the unit casing 1003, such that when the supporting structure of the air director unit 1107 is arranged in the unit casing 1003, it will provide a fixed support for a motor and provide air labyrinth seals for the rotating parts of the ventilation unit 1001. The dual mode impeller 1002 is one such rotating part, and a first air labyrinth seal 1114 is provided at an interface between the outer wall of the dual mode impeller 1002 in the region being at the indoor side of the impeller 1002 and the inside of the outer circular wall 1113 in the region being at the outdoor side of the outer circular wall 1113. A second air labyrinth seal 1115 or sealing sliding surfaces is provided between the outer orbital ring area 1182 of the indoor side of the dual mode impeller 1002 and the inner central part 1102 of the indoor side of the dual mode impeller 1002, which will be in sealing interaction with a corresponding orbital area 1123 of the supporting structure. The second air labyrinth seal 1115 will further provide an airtight seal between the airflows flowing through the dual mode impeller 1002 simultaneously in different directions.

On the indoor side of the air director unit 1107 an air filter unit 1300 is arranged providing an orbital compartment for the supply air flow 1321, and a central duct for the exhaust air flow 1322. The orbital compartment for the supply air flow 1321 having an inner enclosing wall 1302, and an outer enclosing wall 1301, the orbital compartment being provided for receiving an air filter 1108, and provide an longitudinal supply air flow 1321 path with air tight sealing 1116, 1117, 1118 through the air filter and towards the central duct for the exhaust air flow 1322. The air filter 1108, which extends in a generally perpendicular direction to the longitudinal direction, may be provided with an inner and outer wall structure having sufficient sealing properties to make either one or both of the inner enclosing wall 1302, and an outer enclosing wall 1301 of the air filter unit 1300 superfluous, and thus can be dropped in the design of the filter unit 1300. The filter unit 1300 may further be fixedly connected to the heat exchange module 1110. The air filter unit 1300 further provides a filter unit hub 1306 providing passage and arrangement for a motor side ball bearing 1119 connection 304 to center duct hub 1325 of the center duct structure 1109. The motor side ball bearing 1119 connection 1304 facilitates easy rotation of the air filter unit 1300 and the heat exchange module 1110. The center duct hub 1325 being fixedly held by centering spokes 1327 to an inside of a center duct collar 1328 of the center duct structure 1109. The center duct collar 1328 defines a pipe duct portion of the center duct structure 1109 defining a duct for the exhaust air flow 1322 towards the central duct of the air filter unit 1300. The air filter unit 1300 and the heat exchange module 1110 is further rotationally hinged in an indoor side ball bearing 1120 arrange in a center opening 1310 of a bottom wall 1121 of the heat exchange module 1110. The air speed together with rest rotational forces in the airflow in the outdoor side of the filter unit 1300, causes the heat exchange module 1110 and filter module 1300 to rotate around its own longitudinal center axis 1166. Sensors detecting (not shown) rotation speed of the heat exchange module 1110 and filter module 1300 may be provided. Further breaking means (not shown), for controlling rotation speed of the heat exchange module 1110 and filter module 1300 may also be provided.

In the opposite side of the center duct structure 1109, at the indoor side, a further center duct hub 1168 being fixedly held by centering spokes 1169 to the inside of the center duct structure 1109. The further center duct hub 168 having a protruding portion on its indoor side, the protruding portion is provided to be arranged through the center opening 1310 of a bottom wall 1121 of the heat exchange module 1110 and a distant end 1167 of the protruding portion having a form corresponding to a static endcap 1316 center hole/recess 1317 into which it is to be arranged, thereby holding the center duct structure in a static position in all operation modes. The static endcap 1316 being provided at the indoor end side of the ventilation unit. Typically the distant end 1167 form and corresponding center hole/recess 1317 is formed in a torqs male and female contact form respectively. Other connecting forms or mechanisms may be chosen without deviating from the inventive concept.

For further stability, a center axle may be provided running from the motor side ball bearing 1119 center to the indoor side ball bearing 1120 center arrange in the center of a bottom wall 1121.

The heat exchange module 1110 is typically formed as a cone providing an inner side and an outer side, the cone form may be widest, having the largest diameter, towards the outdoor side and tapering towards a smaller diameter towards the indoor side of the ventilation unit 1001. Having this form provide a path for the supply air 1016, 1017 to flow into the heat exchange module 1110 cone from the inside and towards the outside, whilst exhaust air flow 1018, 1019 flow the opposite way. Other forms may be provided, for example if the cone form of the heat exchange module was turned the opposite direction with its widest end toward the indoor side of the ventilation unit, the supply air 1016, 1017 would flow through the heat exchange module 1110 cone from the inside to the outside, and the exhaust air flow 18, 19 from the outside to the inside.

The heat exchange module 1110 cone is free to rotate around its center axis, rotating a thermal mass of the heat exchange medium, between the supply and exhaust air flow paths. Lamellas in the heat exchange module 1110 cone may be constructed of any type of low thermal conductivity material, like a plastic compound, wood, cardboard, ceramics or others. The low thermal conductivity material of the heat exchange module 1110 may be in the form of lamellas, porous molded material, or other, but in the following lamellas is used as a common term, not excluding any form or material fulfilling the required heat exchange characteristics.

The lamellas have during operation a temperature gradient that provides a high thermal efficiency of the heat exchanger.

The center duct structure 1109 is formed such that it leads the supply air flow from the filter 108 from the inside of and towards a first longitudinal half portion of the heat exchange module 110. The center duct structure 1109 divides the inner volume of the heat exchange module 1110 in two longitudinal halves, and is provided with longitudinal tight fitting center duct knives 1307, 1308 corresponding to the inside longitudinal form of the heat exchange module 1110 which effectively divides the space of the exchange module 1110 inside in the two halves and prevents air flow leakage between supply and exhaust air flows flowing in opposite directions inside the heat exchange module 1110. The center duct structure 1109 is formed as a longitudinal half of a pipe in the indoor portion of the center duct structure 1109, the indoor portion typically being at least half the length of the center duct structure 1109. At the outdoor portion of the center duct structure 1109 the half pipe form grows to comprise a full pipe form of the center duct collar 1328 corresponding to the central duct of the filter module. At the outdoor side of the center duct structure 1109 on the opposite longitudinal half of the pipe in the indoor portion of the center duct structure 1109, an encircling collector channel 1320 having its outer diameter corresponding to the diameter of outer enclosing wall 301 of the air filter unit 1300 and its inner diameter defined by the center duct collar 1328 is provided. The collector channel 1320 provides for collecting supply air from the whole orbital interface towards the filter 1108 and leading it to the longitudinal half defined by the outside of the longitudinal half of a pipe in the indoor portion of the center duct structure 1109 limited on its side by the center duct knives 1307, 1308.

The center duct knives 1307, 1308, the inside of the longitudinal half of a pipe in the indoor portion of the center duct structure 1109, and the underside of the encircling collector channel 1320 provides a channeling path for the exhaust air flow from the inside of the longitudinal half of a pipe in the indoor portion of the center duct structure 1109 through the inside of the center duct collar 1328 and towards the central duct for the exhaust air flow 1322 in the air filter unit 1300.

The center duct structure 1109 leads the exhaust air as it flows from the indoor side of and through the second longitudinal half portion of the heat exchange module 1110 towards the center portion of the air filter module 1300. The center duct knives 1307, 1308 ensures by being tightly fitted towards the inside of the heat exchange module 1110 minimal air flow exchange between the two longitudinal inner half spaces defined by the center duct structure 1109. The tapering form of the heat exchange module 1110 is provided to ensure a uniform differential pressure over the lamellas along the longitudinal length of the heat exchange module, securing uniform transversal velocity through the lamellas, which in turn optimizes the efficiency.

The supply air filter 1108 in the filter module 1300 may be of any form, doughnut, cylindrical orbit, coned, flat, bellow shaped, porous, and other. If sealing longitudinal outer and inner walls are not provided in the filter, this is provided by inner enclosing wall 1302, and an outer enclosing wall 1301 of the air filter unit 1300 itself.

When supply air flow leaves the supply air director it is lead through a rotating low resistance air filter 1108 before the air stream is led by the static center duct structure 1109 leading the air from the filter to a first half side of a rotating heat exchange module 1110. The filter 1108 and the heat exchange cone 1110 may be rotationally connected, and rotates around its own central longitudinal axis by a rest rotational force of the supply air flow still present after the air stream has left the supply air director foils 1106.

On the indoor side of the rotating heat exchange module 1110, a sleeve air guide assembly 1330 is provided comprising static outside flow separator knives 1312, 1313 having an inward profile corresponding to the tapering outer form of the rotating heat exchange module 1110, and an outward profile corresponding to the inside of the unit casing 1003. The static outside flow separator knives 1312, 1313 divides the room between the outside of the rotating heat exchange module 1110 and the inside of the unit casing 1003 in the region of the rotating heat exchange module 1110 in two longitudinal halves, one half which provides a channel for the supply air flow, and the other half which provides a channel for the exhaust air flow in the opposite direction. The static position of the static outside flow separator knives 1312, 1313 corresponds to the static position of the longitudinal tight fitting center duct knives 1307, 1308. The effect of these longitudinal knives 1307, 1308, 1312, 1313 is such that when the rotating heat exchange module 1110 slowly rotates, the flow of air through the rotating heat exchange module 1110 is guided in one longitudinal half of the rotating heat exchange module 1110 statically defined by the position of the longitudinal static outside flow separator knives 1312, 1313 and the longitudinal tight fitting center duct knives 1307, 1308 in a first direction, and through the opposite longitudinal half of the heat exchange module 1110 in the other direction. The rotation of the longitudinal heat exchange module 1110 will result in heat exchange between the air streams flowing in each direction. In the case when indoor temperature is higher than outdoor temperature, the exhaust air will warm up the rotating heat exchange module in the longitudinal half area defined by tight fitting center duct knives 1307, 1308, and as the heated area of the heat exchange module 1110 rotates and enters the opposite side defined by tight fitting center duct knives 1307, 1308 the supply air will be heated by the higher temperature of the heat exchange module 1110.

On the indoor side of the sleeve air guide assembly, a number of encircling air direction foils 1314 are provided to achieve an even distribution to and from the room unit on the indoor side. The endcap 1316 is provided for bearing and holding of the rotating heat exchange module 1110 when assembled. The center hole 1317 is provided for holding the static central duct structure 1109 by receiving its protruding member 1167, and the base of the protruding member 1167 may form the center for the indoor side ball bearing 1120. The sleeve air guide assembly 1330 may comprise one or more encircling foil support rings 1311 towards the outdoor end of the sleeve air guide assembly 1330 to ensure correct and stable positioning of the longitudinal static outside flow separator knives 1312, 1313.

Experiments indicate that the rotating heat exchange module 110 eliminates condensation problems under almost every condition.

In a further embodiment of the invention an air filter may be attached to the indoor side of the impeller as illustrated in FIGS. 121A-E and 122A-C. In this embodiment both the impeller 1210 and filter 1211 is arranged connected together in a rotating relationship. Extending from the indoor side of the impeller is a circular impeller duct 1213 with an inner diameter adapted to fit the outer diameter 1214 of the exhaust inflow of the impeller. An exhaust air spin element 1232 comprising a plurality of propeller blades/foils that are attached on their inner side to and equally orbital spaced apart around a central portion 1231 of the impeller structure, the central portion 1231 stretching longitudinally towards the indoor side, the propeller blades pointing outwards from the central portion 1231 towards and optionally attached on their outer side to the inside of the circular impeller duct 1213 and the propeller blades are curved towards the impeller exhaust inlet such that when impeller rotate aid to put rotation on exhaust air before being directed towards and into the spinning impeller. This reduce noise and resistance to the exhaust air 1018, 1019 flow.

The filter 1211 is pipe formed, preferable formed as a cone, and attached to the outside of the impeller 1210 and impeller duct 1213 in the longitudinal direction spanning over the supply air outlet channels of the impeller 1210 and the impeller duct 1213 in a manner such that when supply air 1016, 1017 flows out of the impeller 1210 it flows towards the inside of a first portion of the longitudinal oriented pipe formed filter 1211. A second portion of the pipe formed filter 1211 spans over the outside of the circular impeller duct 1213. The coned form of the pipe formed filter 1211 has its larger inside diameter at the impeller side. The lower inside diameter of the coned form filter 1211 of the corresponds to the outside diameter of the circular impeller duct 1213, and the narrow end of the pipe formed filter 1211 fits in a closed manner over the impeller duct 1213 such that when that supply air 1016, 1017 is distributed along the inside of the pipe formed filter 1211, all air is pushed through the filter in a generally perpendicular to the longitudinal direction supply air flow path 1224 through the air filter 1211. The pipe formed filter 1211 rotates with the impeller 1210. Inside distance members (not shown) may be arranged outside the impeller duct to ensure sufficient room for the supply air 1016, 1017 to reach the whole longitudinal inside surface of the pipe formed filter 1211. These distance members may be omitted as the air pressure from a spinning impeller 1210 may sufficiently push the pipe formed filter 1211 outwards to allow sufficient room for distribution of the supply air 1016, 1017 flow along the inside surface of the filter. The impeller may in this embodiment comprise a protruding flange 1215 formed as a base on its indoor facing side for receiving the outdoor end of the pipe formed filter 1211. An outer portion of the outdoor facing side of the protruding flange 1215 comprise an air labyrinth seal or sealing gliding surface, the seal operates in an engaging manner with a corresponding static seal formed flange 1216 being fixedly attached to a impeller unit casing 1218. The static seal formed flange 1216 defining the level at which the assembly of the impeller 1210, the coned formed filter 1211 and the impeller duct 1213 is arranged in the impeller unit casing 1218 and a filter casing 1219.

The supply air 1016, 1017 flows/are thrown outwards and through the pipe formed filter 1211 when the impeller 1210 and pipe formed filter 1211 is rotating. Outside the pipe formed filter 1211, a portion of the static filter casing 1219 may comprise on its inside, between the static seal formed flange 1216 and an air director unit 1220, threads like auger members 1221 that defines a space and path for the supply air to exit the outside surface of the pipe formed filter 1211 and flow towards the air director unit 1220. The air director unit 1220 comprise an air director inner ring 1222, wherein the air director inner ring 1222 diameter is comparable to the impeller duct 1213 inside pointing diameter 1223. An impeller inner duct air seal (not shown) is provided between the air director inner ring 1222 and the impeller duct 1213 inside pointing diameter 1223. The impeller inner duct air seal (not shown) prevents supply air path 1016, 1017 to be isolated from the exhaust air path 1018, 1019. The threads like auger members 1221 provides for the air to be directed downstream towards the indoor side in a controlled spiral path, wherein the threads like auger members 1221 also reduces the tunnel effect.

The impeller 1210, the impeller duct 1213 and the pipe formed filter 1211 are connected, and will when motor 1103 is activated rotate together. The motor is encompassed in an impeller motor housing 1212 arranged in the center of the impeller 1210, the impeller motor housing 1212 may be an integrated central portion of the impeller 1210, further providing an opening towards the outdoor side such that a motor 1103 being fixedly attached to the static impeller unit casing 1218 enters the impeller motor housing 1212 from the outdoor side. The impeller 1210, the impeller duct 1213 and the pipe formed circular filter 1211 may be dismounted by pulling it out of the static impeller unit casing 1218 on the indoor side of the ventilation unit 1230. The pipe formed circular filter 1211 may then be removed by pulling it off the impeller 1210 and impeller duct 1213. The impeller 1210 may be cleaned and a new pipe formed circular filter 1211 can be attached around the impeller duct 1213 before the assembly of the impeller 1210, the impeller duct 1213 and the pipe formed circular filter 1211 is mounted in the static impeller unit casing 1218 by pushing it into the static impeller unit casing 1218 until the air labyrinth seal or sealing gliding surface of the protruding flange 1215 connects to the static seal formed flange 1216 being fixedly attached to the static impeller unit casing 1218, and the impeller 1210 connects to the motor 1103.

The static filter casing 1219 the air director unit 1220 may be formed in one piece, and at least the static filter casing 1219 is provide with an outer diameter dimensioned to closely fit inside the unit casing 1003 in a retaining manner when pushed inside the unit casing 1003.

Figures 122B, 122C:
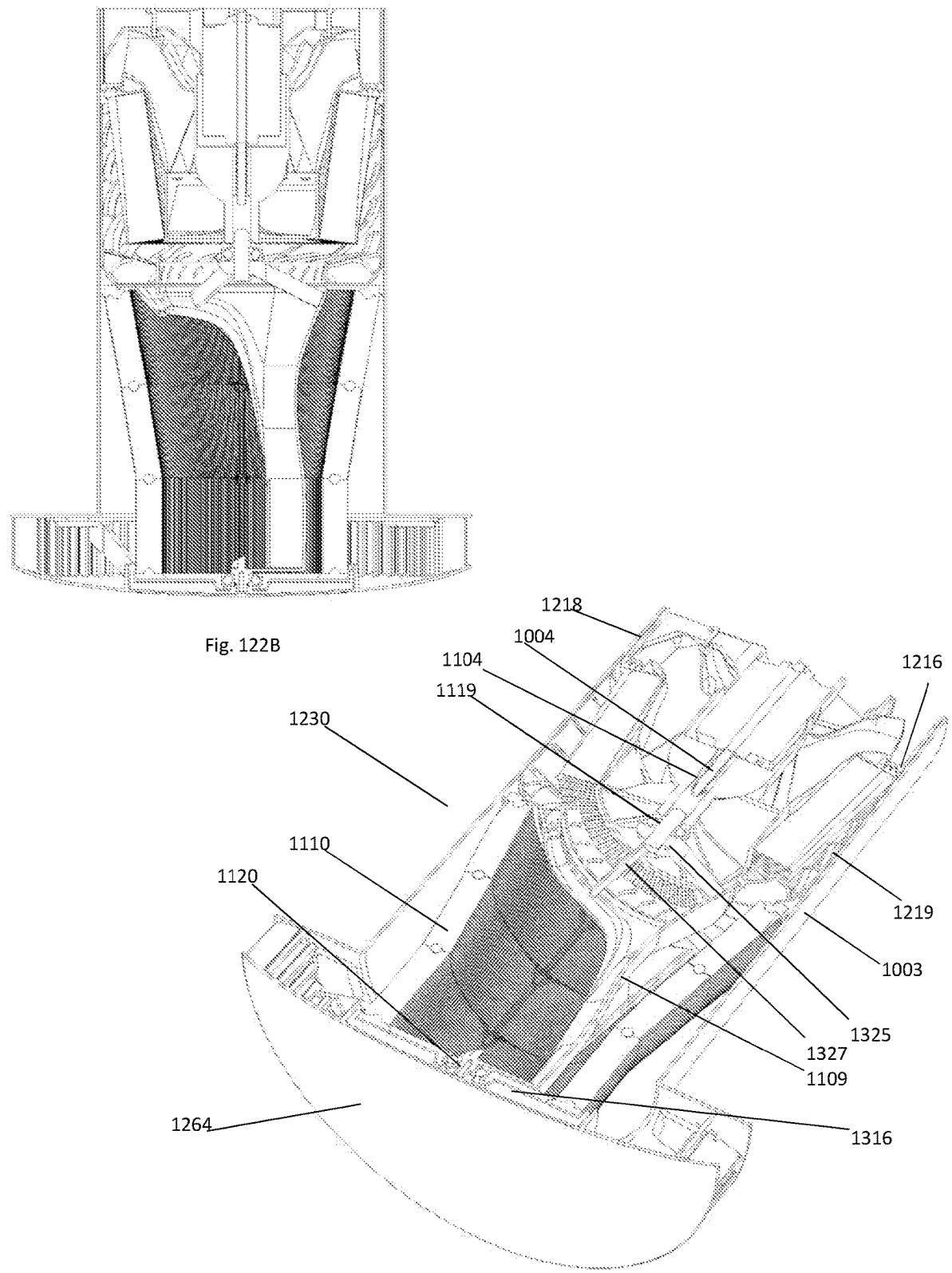

One embodiment of the ventilation unit 1230 will then be assembled as illustrated in the cross section FIG. 122C wherein an indoor cover 1264 and the unit casing 1003 provides holding support for the ventilation assembly comprising the rotating heat exchange module 1110 and the fixed center duct structure 1109 being connected to a static end cap 1316 via the an indoor side ball bearing 1120. The an indoor side ball bearing 1120 also providing a rotating connection point for the rotating heat exchange module 1110. On the outdoor side of the fixed center duct structure 109 a center duct hub 1325 being fixedly held by centering spokes 1327 connected in the far outdoor side of the fixed center duct structure 109 provides for a motor side ball bearing 1119. The motor side ball bearing 1119 further provides for rotating connection holding the impeller assembly with impeller 1210 and pipe formed rotating filter 1211 in place pushing it towards the static seal formed flange 1216 being fixedly attached to a impeller unit casing 1218. A retaining center recess of the impeller comprising an axle casing 1104 for receiving the motor shaft 1004 provides the rotation connection between the motor and the impeller assembly, and when mounting the impeller assembly the axle casing 1104 may be designed to provide a resilient spring force holding the motor axle 1004. Other connecting mechanisms may be provided, such as but not limited to male-female formed protrusion and recess, bolt and nut connection, click connectors, splint fixation of axle in center duct of impeller assembly or other.

Figure 123A:
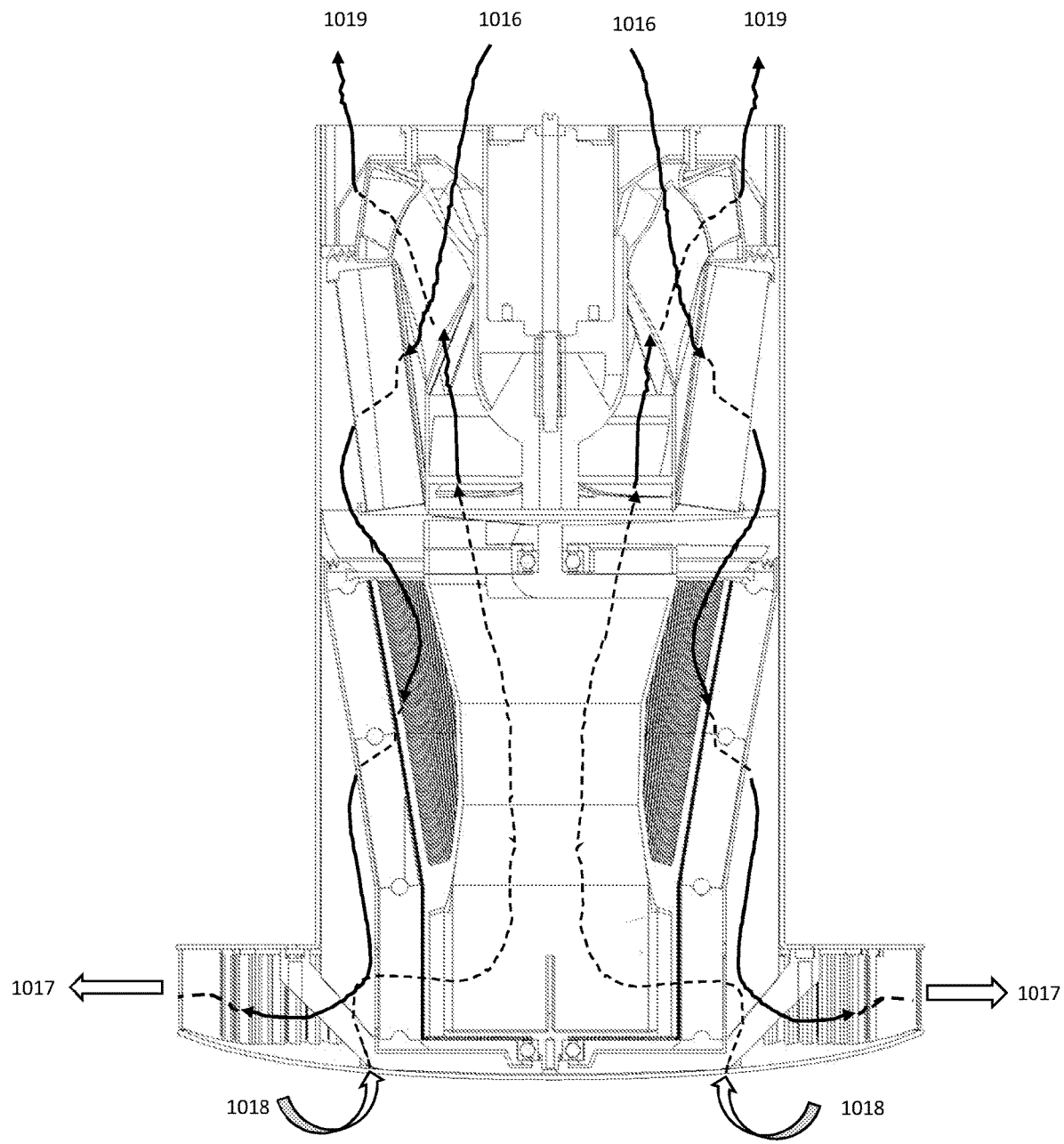
Figure 123B:
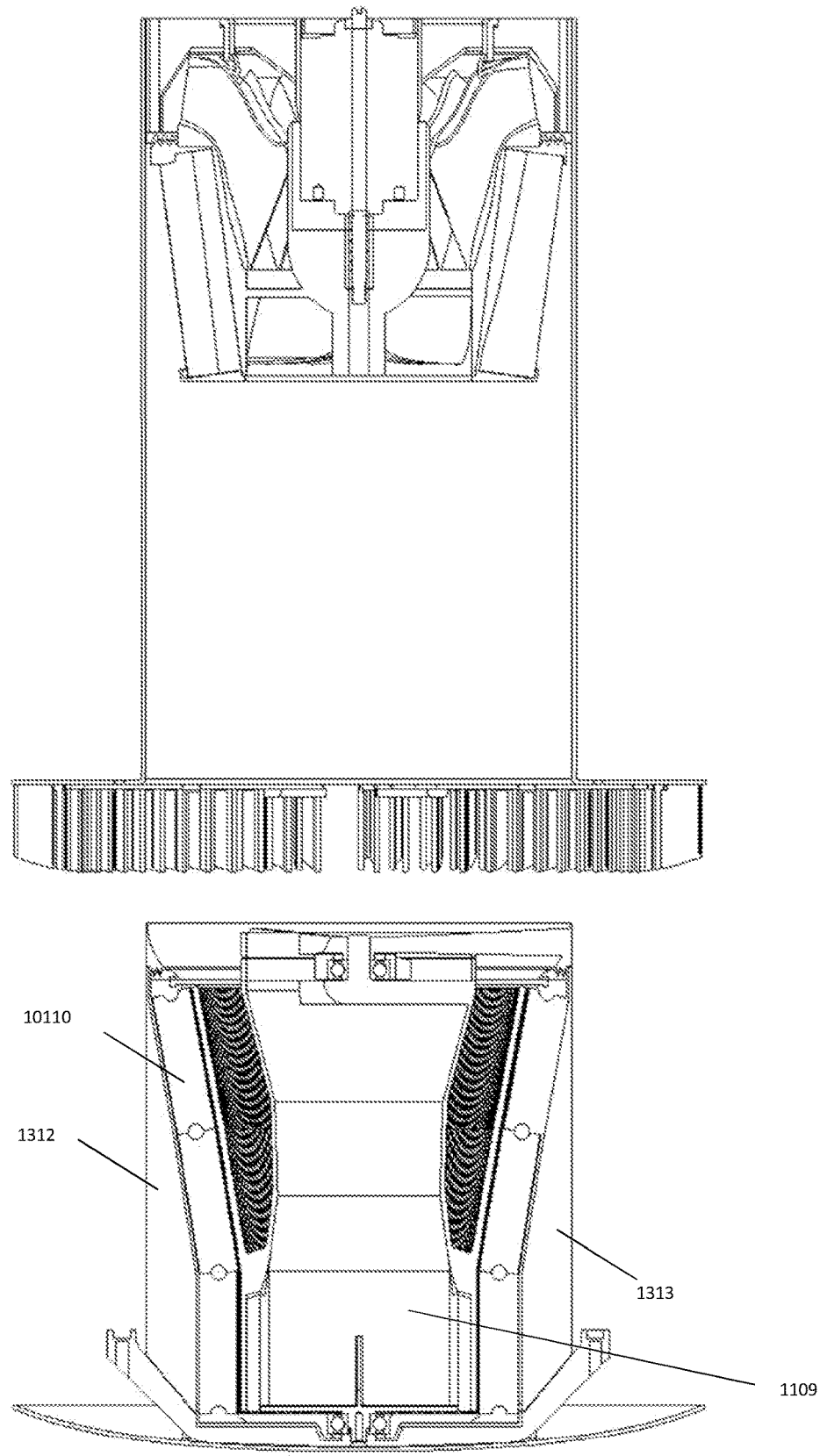
Figure 123C:
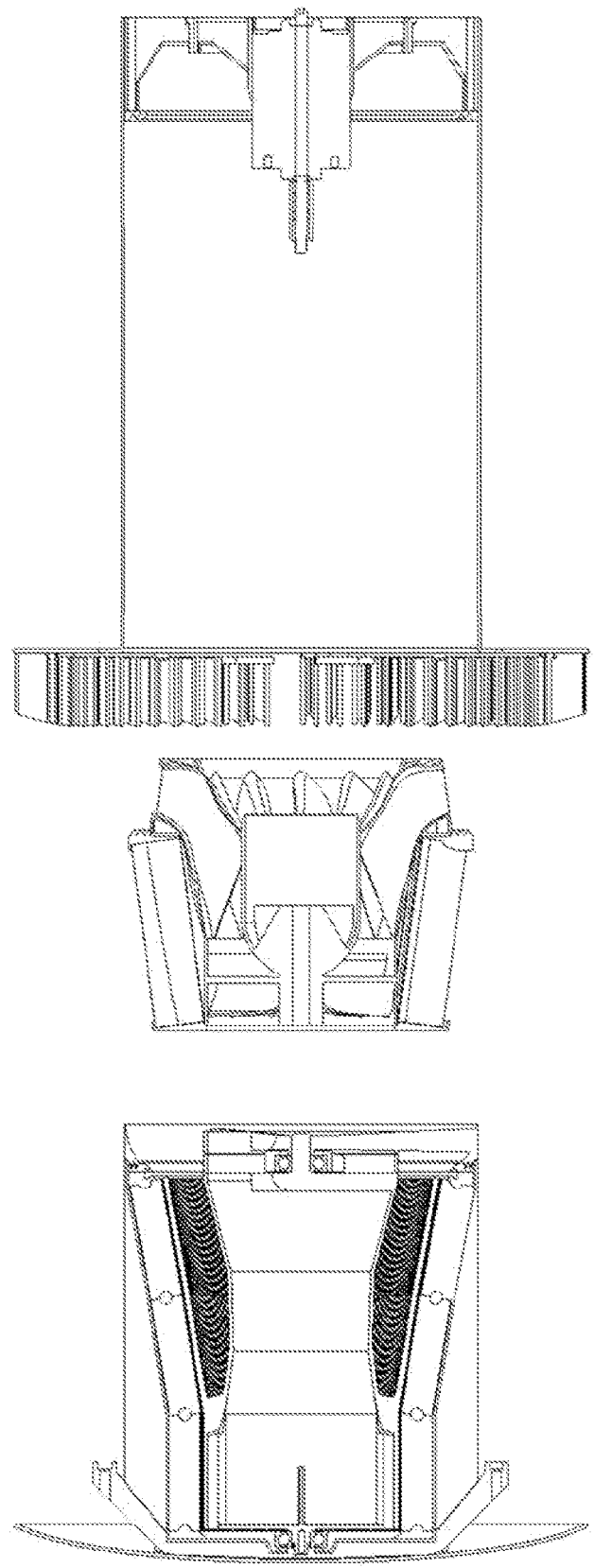

A further embodiment of the ventilation unit is illustrated in FIG. 123A-C wherein the heat exchange module is shown outdrawn in FIG. 123 B and further the impeller and rotating filter is outdrawn in FIG. 123C. The path of supply air 1016, 1017 and exhaust air flow 1018, 1019 is illustrated in FIG. 123A.

The ventilation unit 1001 may in a further embodiment be adapted to provide maximum ventilation effect/air flow. In such a case the rotating heat exchange module 1110, room unit and filter unit 300 may be substituted with a static module 1190, room module and optional filter, hereafter called a summer module, as illustrated in FIG. 119 A-C. The summer module is primarily for use when heat is not required to be exchanged, and filtering and/or high air flow for transport of excessive heat is of more importance. The summer module 1190 is arranged in the unit casing 1003 on the indoor side of the dual mode fan 1200. The summer module 1190 comprise an inner central duct 1193 and an orbital longitudinal duct 1194 defined by the outside surface of the wall of the inner central duct 1193 and the inside surface of the unit casing 1003. The summer module 1190 provides a direct path for the exhaust air flow from the indoor side of the ventilation unit 1001 through the inner central duct 1193 and into the inner central part 1102 of the indoor side of the dual mode impeller 1002 in the dual mode fan 1200. In the opposite direction it channels the supply air directly from the outer orbital ring area 1182 of the indoor side of the impeller 1002 in the dual mode fan 200 through the orbital longitudinal duct 1194 to the indoor side of the ventilation unit 1001.

The summer module 1190 may further be provided with a pollen/smog filter 1192, for filtering of the supply air, arranged in the path of the supply air 1016,1017. The pollen/smog filter 1192 may be formed in a cone form having the wider circumference in the indoor side of the pollen/smog filter 1192, and arranged in the orbital longitudinal duct 1194 defined by the outside surface of the wall of the inner central duct 1193 and the inside surface of the unit casing 3. The pollen/smog filter 1192 inside diameter in the narrow end which will be closest to the dual mode fan 1200, has an inside circumference corresponding to the outside diameter of the inner central duct 1193, and thus no supply air can slip through on the inside of the pollen/smog filter 1192. In the other end the outside diameter of the widest part of the pollen/smog filter 1192 close to the indoor side of the ventilation unit corresponds to the inside diameter of the unit casing 1003, and thus no supply air can slip pass the filter on the outside without going through it before entering the room unit of the ventilation unit 1001. In this manner the supply air must pass through the pollen/smog filter 1192 when flowing from the dual mode fan 1200 to the indoor side of the ventilation unit 1001. Filtering properties may be adapted to requirements for throughput and degree of pollen and pollution.

In one embodiment of the invention the rotating heat exchange module 1110 and room unit in the first embodiment is provided as an exchangeable assembly, that easily can be exchanged with a static summer module 1190 and a second embodiment of a room unit comprising an optional pollen/smog filter 1192. This makes the unit a powerful air cleaner as well as an effective cooling device in warm climates/seasons.

A room unit comprising a peripheral encircling flow guide 1260, 1263 and an indoor cover 1122, 1264 terminates the indoor side of ventilation unit 1001 wherein the flow guide may be defined by an assembly able to partially restrict airflow in one or both directions.

Figure 120:
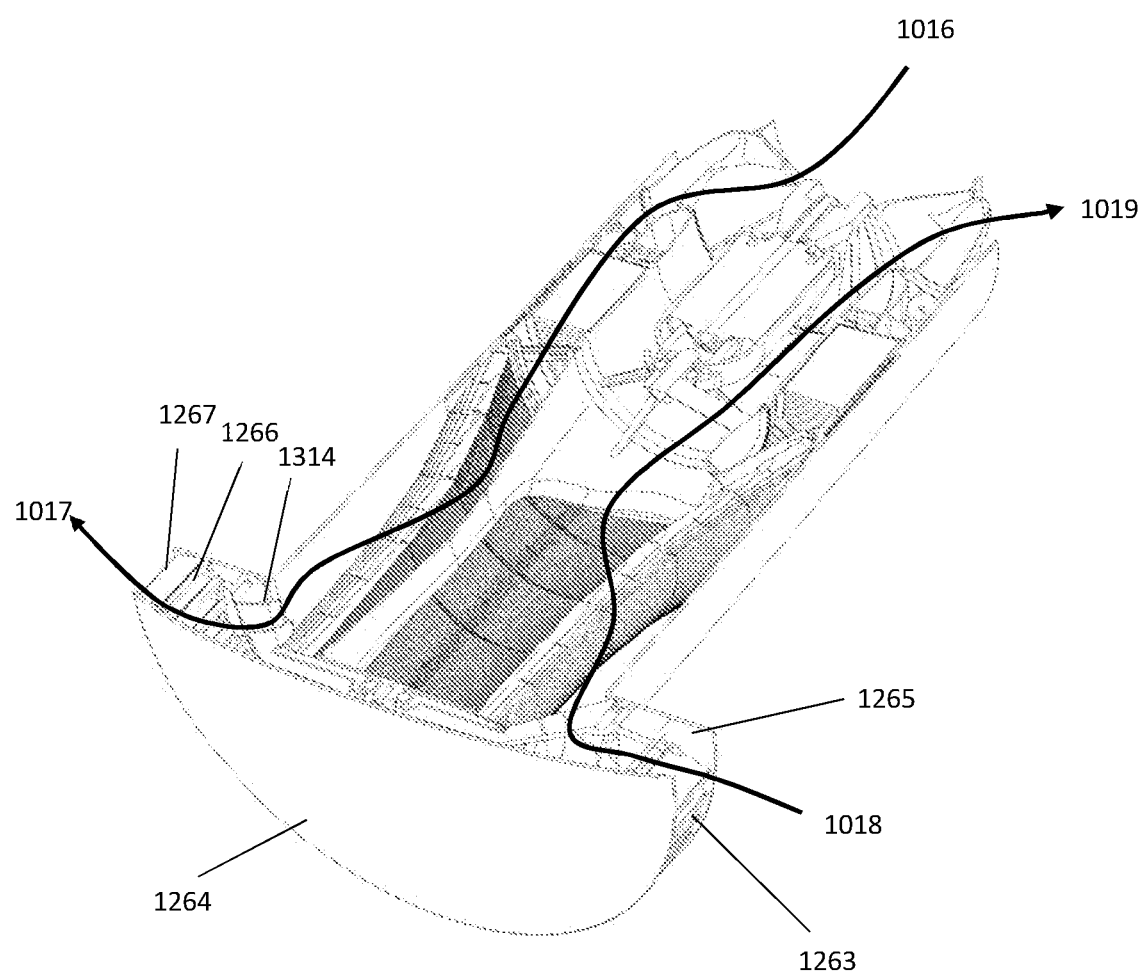

In one embodiment of the room unit, as defined in FIG. 120, the air flow is guided by a plurality of foils 1263 arranged perpendicular to the air flow in a peripheral orbital ring between the indoor cover 1264 and an encircling base 1265. When the room unit is arranged on the ventilation unit 1001 comprising a rotating heat exchange module 1110 and longitudinal static outside flow separator knives 1312, 1313, the supply air will blow out between the foils 1263 at one half of the peripheral orbital ring between the indoor cover 1264 and an encircling base 1265, and exhaust air will be sucked in in the opposite half. The foils may be rotationally hinged on one side 1266, 1267, and connected to a foil rotation means (not shown) on the opposite side 1266, 1267, and thus be rotatable to place more foil area into the air flow and thus restrict the air flow in either flow direction. The rotation means may be driven by one or more small electrical motors arranged in the room unit so that both flows can be choked independently. Thus for example 4 modes may be provided: low supply air flow/low exhaust air flow, low supply air flow/high exhaust air flow, high supply air flow/low exhaust air flow, and high supply air flow/high exhaust air flow. Fewer modes may be used, and more providing intermediate positions to be selectable. It is then possible to provide either vacuum, equilibrium or overpressure conditions on the indoor side of the ventilation unit. This enables balancing the unit to achieve maximum efficiency during varying differential pressure.

In one scenario example can a "sleeping mode" ensure that ventilation by the ventilation unit is kept at a minimum. For instance bed rooms during the day. In order to avoid severe leakage of hot air on windy days, both supply and exhaust air flows may be choked to a maximum.

In a further scenario where individual choking is required may be during pollen season using the summer module. In windy days the chokes may be set to deliver an overpressure to the indoor side, wherein the supply air comprising clean pollen free air is pushed into the house, thereby maintaining the overpressure inside the house and prevent leakage of pollen through small gaps and cracks into the house.

In a second embodiment of the room unit for use with a static summer module 1190, as defined in FIG. 119 A-C, the supply air flow 1016, 1017 flows from the orbital longitudinal duct 1194 defined by the outside surface of the wall of the inner central duct 1193 and the inside surface of the unit casing 1003, through the optional pollen/smog filter 1192 and exits the ventilation unit 1001 guided by a plurality of house unit foils 1263 arranged perpendicular to the air flow in a peripheral orbital ring between an inflow cover 1195 and an encircling base 1265. The encircling base 1265 may be omitted by using the room wall itself as a channeling surface. The inflow cover 1195 is formed as an outwards bending flange being connected to the indoor end of the inner central duct 1193 in one end and extends outwards in diameter to provide guiding of the supply air through the house unit foils 1263. The house unit foils 1263 may be rotationally hinged on one side 1266, 1267, and connected to a foil rotation means (not shown) on the opposite side 1266, 1267, and thus be rotatable to place more foil area into the air flow and thus restrict the supply air flow. The rotation means may be driven by one or more small electrical motors arranged in the room unit. Exhaust air 1018, 1019 is guided into the room unit by a circular room unit exhaust duct 1196 defined by the outside surface of the inflow cover 1195 and the inside surface of the exhaust cover 1191. The exhaust cover 1191 may advantageously be formed with a concave form mirroring the curving of the inflow cover 1195, such that when the exhaust air flow flows through the circular room unit exhaust duct 1196 and into the inner central duct 1193 the exhaust air flow have little turbulence. Further house unit foils (not shown) may be arranged in the path of the exhaust air flow in the circular room unit exhaust duct 1196, these foils may also be rotationally hinged and connected to a foil rotation means (not shown) as described above.

The room unit flow guide 1260 may in a further embodiment as shown in FIGS. 101, 104, 105, 107 and 108 comprise a perforated 1261 surface through which the airflow must pass. The flow guide 1260 may additional have a dynamically modifiable restriction capability. This may be achieved by adding a second movable perforated film 1262 to the flow guide 1260. By adding controlling means such as a stepper motor connected to the second movable perforated film 1262 it is possible to slide the perforations of the second movable perforated film 1262 across the perforations 1261 of the flow guide 260, and hence alter the flow resistance through the flow guide 1260. The air flow is directed towards the indoor side on one half side of the flow restrictor and in the opposite direction on the other half side. The flow may be restricted in one of or both half sides of the flow guide 1260, and such enable the ventilation unit 1001 to provide pressurized or vacuum effect on the indoor side of the ventilation unit 1001.

It is acknowledged that although the room units plays a role in optimized operation of the ventilation unit of the invention, it is possible to provide any of the embodiments of the room units described above as a standalone device for implementation of other ventilation unit types.

The ventilation unit 1001 is in one embodiment installed in a wall between an out-door environment and an inside room. The wall typically comprises a through channel with a cross section corresponding to the outer cross section of the unit casing 3 including tolerances. The cross section form may be uniform through the whole wall depth (wall thickness), as may be the case with the ventilation unit. The ventilation unit may have a cylindrical outer form. A duct sleeve (not shown) may be provided to be installed in the through channel in the wall. The duct sleeve internal form may correspond to the outer form of the ventilation unit 1001 and its additional cabling and optional sensor connections. The duct sleeve may have through holes for power and optional control signal cabling and connectors being adapted to connect to cabling provided in the ventilation unit for powering of motors, sensors and electronics comprised in the ventilation unit 1001. The connectors and form may be such that the ventilation unit 1001 can be slid into the duct sleeve and a snap latch lock may hold it in place and be fully operational. Other locking mechanisms may be used to provide both for continuous operation mode and for embodiments where change between heat exchange mode and summer mode assemblies is enabled.

A ventilation unit 1001 is installed such that the impeller side is directed towards the outdoor side environment in a manner such that the impeller can run freely. Optional is mounting of an impeller protection cover outside the impeller, wherein the impeller protection cover also may provide channeling and separation of the air streams going into 1016 and being pushed out 1019 of the impeller 1002.

In a third embodiment of the ventilation unit 1001 a further extender duct and further air direction module as illustrated in the FIGS. 115, 116, 117 and 118 is provided for enabling installation of the ventilation unit 1001 in thicker walls. Thus in such walls the impeller 1002 will in a standard length version be arranged some way into the wall seen from the outside. The extender provides an inner central extender duct 1180 for leading the supply air 1016 from outdoor side of the ventilation unit to the impeller 1002, and a concentric outer duct 1181 around the inner central extender duct 1180 for leading exhaust air 1019 from the impeller to the outdoor side of the ventilation unit 1001. For longer extender ducts it may be advantageous to provide a further air direction module 1160 for stopping the air spin of the exhaust air 1019 exiting from the impeller 1002 towards the outdoor side of the ventilation unit 1001. An air labyrinth seal 1170 is provided on an orbital flange 1171 that separates the inflow channels from the outflow channels of the impeller 1002 on the outdoor side, connecting to the inner portion 1161 of a concentric inner flange of the further air direction module 1160. Likewise the circular inner portion 1182 of the inner central extender duct 1180 is arranged in a sealing manner to the outer portion 1162 of the concentric inner flange of the further air direction module 1160, such that supply air flowing in the inner central extender duct 1180 does not leak to the exhaust air flow flowing in the opposite direction through the concentric outer duct 1183 around the inner central extender duct 1180 leading exhaust air 1019 from the impeller to the outside.

A further embodiment of the heat exchange module and filter module (not shown) may be provided with a fixed filter module, non-rotating, and a motor driven rotating heat exchange module. Heat exchange module may be driven by a geared axle connected to the impeller motor, or by a separate motor used solely for rotating the heat exchange module.

The dual mode fan may in a further embodiment of the invention be combined with a counter flow heat exchanger, standalone as a mobile device or installed in a wall duct providing an optimized unit for drying out rooms having a moisture and/or radon problem, such as in cellars. In such an environment neither heat exchange or air filtering is of importance, and the task is to shift sufficient volume of air out of the indoor side room of the air flow. Exhaust air must be transported outside, and dry air must be supplied. Thus a typical counterflow unit with draining capacity may be connected in series with the fan unit.

The ventilation unit embodiments either as defined above or where any number of features from the above described embodiments are individually combined, may be provided with wired or wireless communication means which enables a communication contact with a provided remote monitoring and control system. This remote monitoring and control system may comprise a cloud service, applications/apps provided for standalone handheld computers such as laptop, tab, smartphone or other, communication means and analysis programs. Thus monitoring and controlling of ventilation characteristics may be provided as a service or user defined from a remote controller. Sensors and motors in the ventilation unit may be controlled remotely.

Two or more ventilation units may be in communication contact via the communication means comprised in the ventilation unit or via the remote monitoring and control system. Sensor may additionally be installed in the environment on the indoor side of the ventilation units and being in contact with the control unit 1105 in the ventilation units and/or the remote monitoring and control system to provide further flexible controlling feature of a ventilation system.

The invention may further be provided in a first device embodiment of a dual mode impeller assembly for use in a room ventilation unit comprising a dual mode impeller 1002, 1210 and a motor 1103 for providing the spinning force to the dual mode impeller 1002, 1210, wherein the dual mode impeller 1002, 1210 has a cylinder shape for rotating around its longitudinal center axis 1166, the dual mode impeller comprising a plurality of supply air channels 1061 and exhaust air channels 1062, wherein when the dual mode impeller 1002, 1210 is rotated the supply air channels 1061 propels supply air 1016, 1017 from, and into, a central portion 1181 of a first side of the dual mode impeller 1002, 1210 towards, and out of, an outer orbital portion 1182 of a second side of the dual mode impeller 1002, 1210, and the exhaust air channels leads exhaust air 1018, 1019 in the opposite direction from, and into, a central portion 1102 of the second side of the dual mode impeller 1002, 210 and towards, and out of, an outer orbital ring area 1184 on the first side of the dual mode impeller 1002, 1210, the supply air channels walls are designed such that they form parts of the walls of the exhaust air channels 1062 crossflowing in-between the supply air channels 1061.

A second dual mode impeller assembly according to the first device embodiment, further comprising an circular formed air filter 1108, 1211 arranged on the second side of the dual mode impeller 1002, 1210, the circular formed air filter 1108, 1211 having a first side facing towards the dual mode impeller for receiving the supply air 1016, 1017 that flows out of the outer orbital portion 1182 of the second side of the dual mode impeller 1002, 1210.

A third dual mode impeller assembly according to the first or second device embodiment, wherein a longitudinal central duct 1111, 1213 is provided for separating supply air 1016, 1017 on its outside and exhaust air 1018, 1019 on its inside at the second side of the dual mode impeller 1002, 1210, wherein a first portion of the longitudinal central duct 1111, 1213 is provided with a diameter adapted to correspond to the diameter of the central portion 1102, 1214 of the second side of the dual mode impeller 1002, 1210, and the longitudinal central duct 1111, 1213 is arranged in a sealing manner to the dual mode impeller 1002, 210 such that little or no air between supply air flow 1016, 1017 and exhaust air flow 1018, 1019 can be mixed, and wherein at least a portion of the circular formed air filter 1108, 1211 is arranged over and outside the longitudinal central duct 1111, 1213.

A fourth dual mode impeller assembly according to any of the first to third device embodiment, further comprising a circular formed static air director 1107, 1220 arranged in the supply air flow 1016, 1017 path on the second side of the dual mode impeller 1002, 1210, the circular formed static air director 1107, 1220 comprising foils arranged within an orbital flow-through path peripheral outside of a central duct 1111, 1222, the foils of the air director 1107, 1220 is provided for stopping most of the rotational forces of the supply air which results from the rotation of the dual mode impeller 1002, 1220.

A fifth dual mode impeller assembly according to the fourth device embodiment, wherein the foils are provided with two or more entrance heights h1, h2 to reduce the surfing effect that occurs when encountering boundary layers at "low angle" approach.

A sixth dual mode impeller assembly according to the first device embodiment, wherein the dual mode impeller further comprise a centrally longitudinal arranged motor shaft casing 104 with a central recess for receiving and holding a portion of a motor shaft 4.

A seventh dual mode impeller assembly according to the sixth device embodiment, wherein the motor shaft casing 104 comprise one of a resilient material, male-female formed protrusion and recess, bolt and nut connection, click connectors, or splint fixation of axle in center duct of impeller assembly for providing a holding force on the received motor shaft 4

An eighth dual mode impeller assembly according to any of the first to seventh device embodiment, further comprising a heat exchange module 1110 arranged in a longitudinal direction on the second side of the impeller, the heat exchange module 1110 is arranged to spin around a half pipe formed center duct structure 1109, the heat exchange module 1110 further comprising an encircling collector channel 1320 for receiving all supply air 1016, 1017 flowing from the outer orbital portion 1182 of the second side of the dual mode impeller 1002, 1210 leading it to and through one longitudinal half of the heat exchange module 1100, and exhaust air 1018, 1019 flow through the other longitudinal half of the heat exchange module 1110, the center duct structure 1109 being provided with a half pipe structure to separate the air flows inside the heat exchange module 1110 in two longitudinal halves, and the center duct structure 1109 further on its sides having center duct knives 1307, 1308 extending outward on either side, the center duct knives 1307, 1308 having its radially peripheral end form adapted to the curvature of the inside of the heat exchange module 1110, and the dual mode impeller assembly further comprising a sleeve air guide assembly 1330 comprising static outside flow separator knives 1312, 1313 having an inward profile corresponding to the tapering outer form of the rotating heat exchange module 1110, and an outward profile corresponding to the inside of a unit casing 1003, the center duct knives 1307, 1308 and the static outside flow separator knives 1312, 1313 being arranged longitudinally aligned pair wise on the inside and outside of the heat exchange module.

A ninth dual mode impeller assembly according to any of the second to eighth device embodiment, wherein the dual mode impeller 1002, 1210 and the circular formed air filter 1211 is arranged connected together in a rotating relationship, wherein the circular formed air filter 1211 is pipe formed and extends in a generally longitudinal direction over a portion of the second side of the dual mode impeller 1002, 1210 and a portion of the longitudinal central duct 1213, and providing a generally perpendicular to the longitudinal direction supply air flow path 1224 through the air filter 1211.

A tenth dual mode impeller assembly according to any of the second to eighth device embodiment, wherein the heat exchange module 1110 and the circular formed air filter 1108, 1211 is arranged connected together in a rotating relationship, wherein the circular formed air filter 1108, 1211 extends in a generally perpendicular direction to the longitudinal direction, and providing a longitudinal supply air flow 1321 path through the air filter 1108.

A first ventilation unit embodiment comprising dual mode impeller assembly according to any one of the first to tenth device embodiment, further comprising a peripheral encircling flow guide 1260, 1263 and an indoor cover 1122, 1264 for termination of the indoor side of the ventilation unit.

A second ventilation unit according to first ventilation unit embodiment, wherein the flow guide 1260, 1263 may be defined by an assembly able to partially restrict airflow in one or both directions.

Third Priority Applications: No 20190732

It is a goal of the invention of the third priority to provide an air fan/filtering unit also for use in domestic homes, either as a ceiling mounted device or as a device arranged for being placed on a table/floor, and solving all or some of the problems described above by reducing the secondary effects caused by tangential air speeds.

It is provided a low noise emitting air purifying device.

It is in a first embodiment of the invention provided an air filtering unit for ceiling mount, preferably at a light/electrical connection point/outlet. The unique design of the filtering unit allows higher air flow than traditional air fan flow, but with significantly less noise and less tangential air movement out of the fan/filter unit. Thus enabling a purifying capacity of equal or higher than comparable air fan/filter units also for the sub micro particles.

In further embodiments of the invention it is provided air fan/filtering units constructed for being arranged at tables or placed on the floor. Such devices face additional challenges, in that the rotating elements of the air filter device must be shielded from the environment. Such devices with shielding comprising unique features for partially or completely removal of operation noise are provided. The traditional problem related to tangential movement of air out of the units often prohibit the devices to be arranged in the vicinity of people, due to the draught becoming unacceptable strong One embodiment according to the invention comprise a casing holding a horizontally mounted fan/filter unit, and that directs the air stream partially or completely vertically upwards.

Common to all embodiments is that unwanted draught and noise is reduced without making tradeoffs like increasing size or reducing throughput.

Alternative embodiments of the invention comprise additional features such as carbon filtering, ionizing, light, heating, scent addition, humidification, loudspeakers and others.

Key feature of the various embodiments of the invention comprise a low noise emitting air purifying device assembly which is arranged on the downstream side of the filters, utilizing a low noise air directing device jet effect that will throw the air in a backward direction relative the spinning direction of the fan/filter. The low noise air directing device jet effect helps the motor propelling the rotating assembly hence reducing the power consumption and eliminating a portion of the resistance against the spinning of the assembly.

Figure 201:
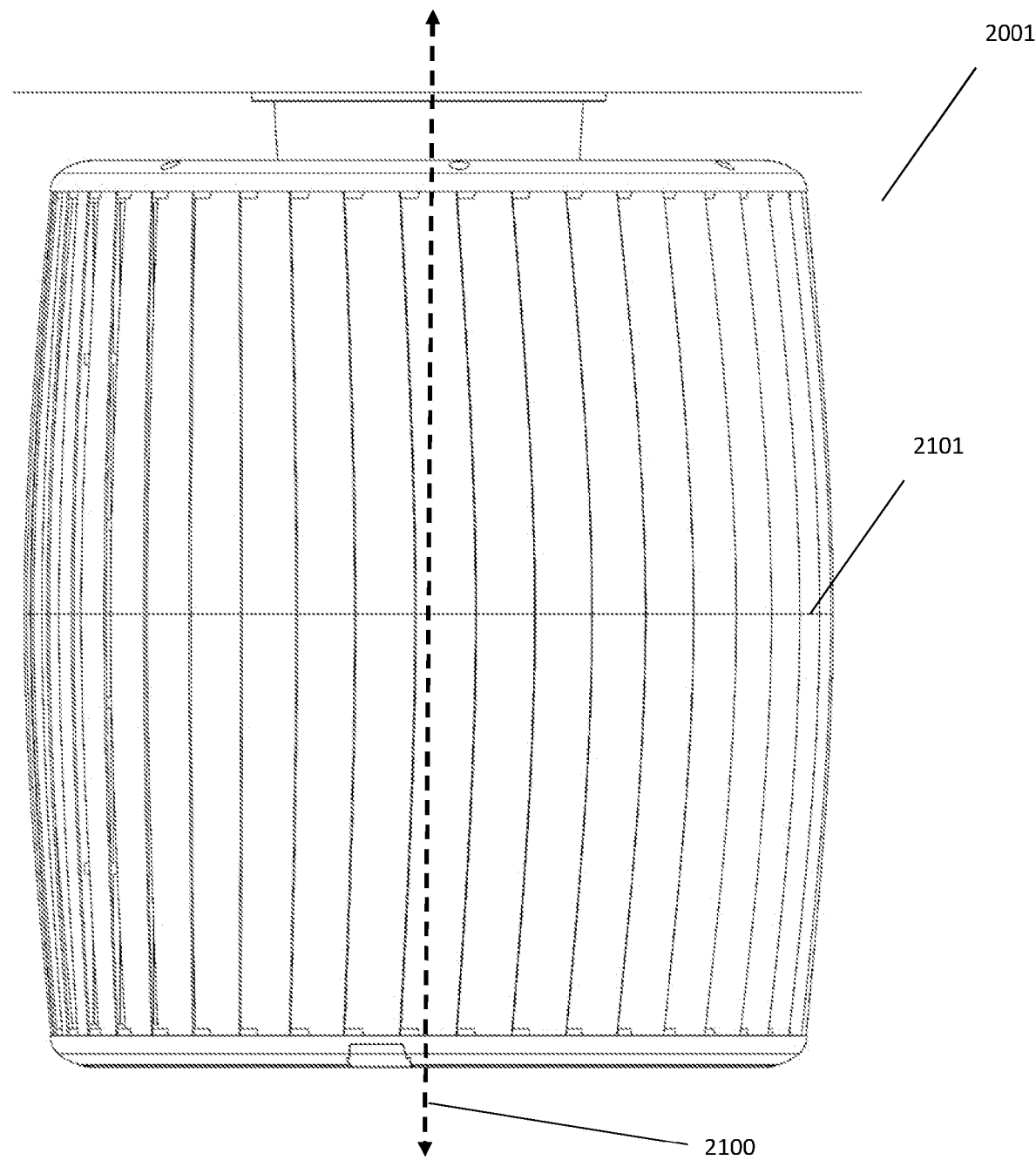

Additional features and advantages of the invention are described in, and will be apparent from, the following brief description of the figures and the following detailed description, wherein:

FIG. 201—Ceiling fan assembly, side view

Figure 202:
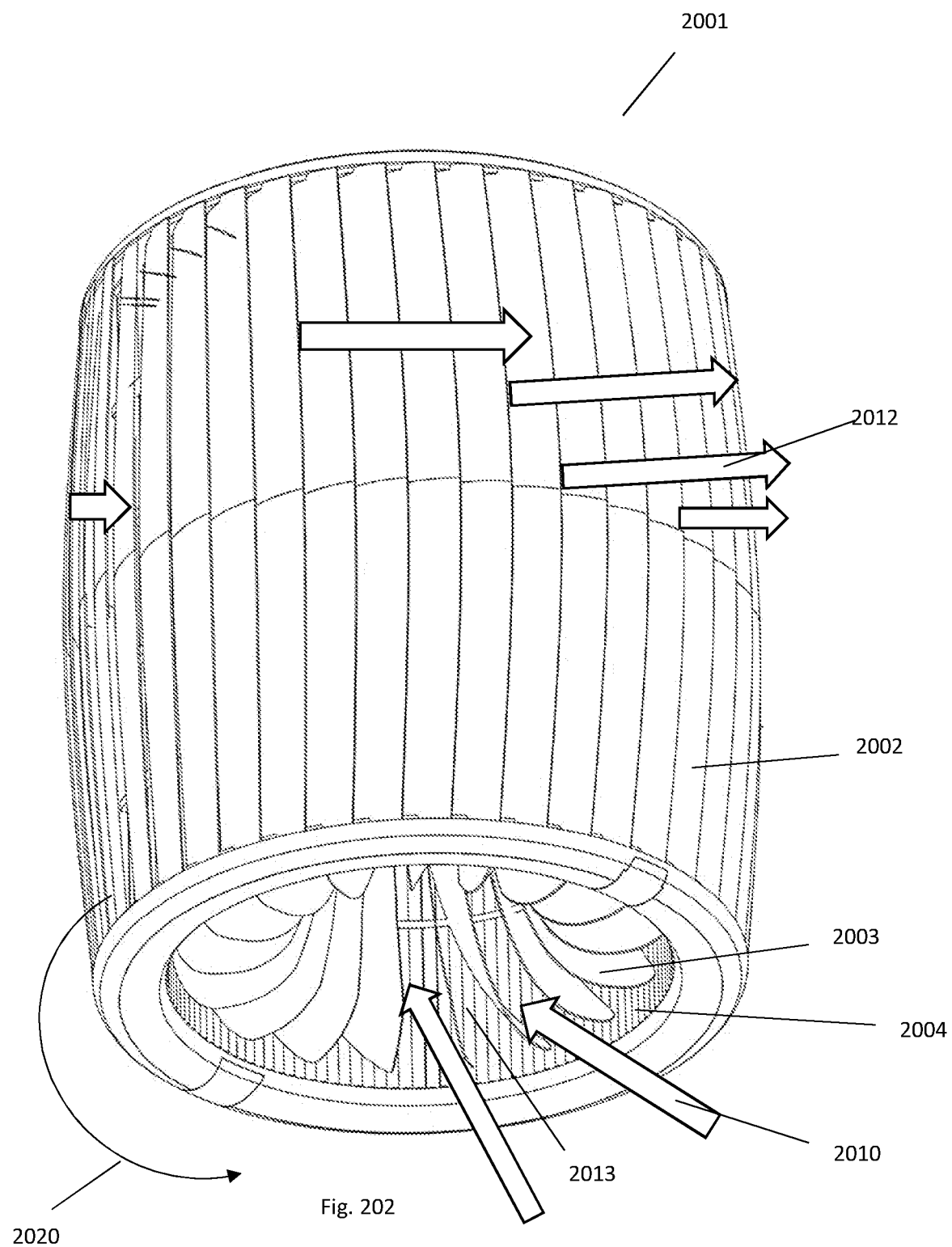

FIG. 202—Ceiling fan assembly, oblique view from below

Figure 203:
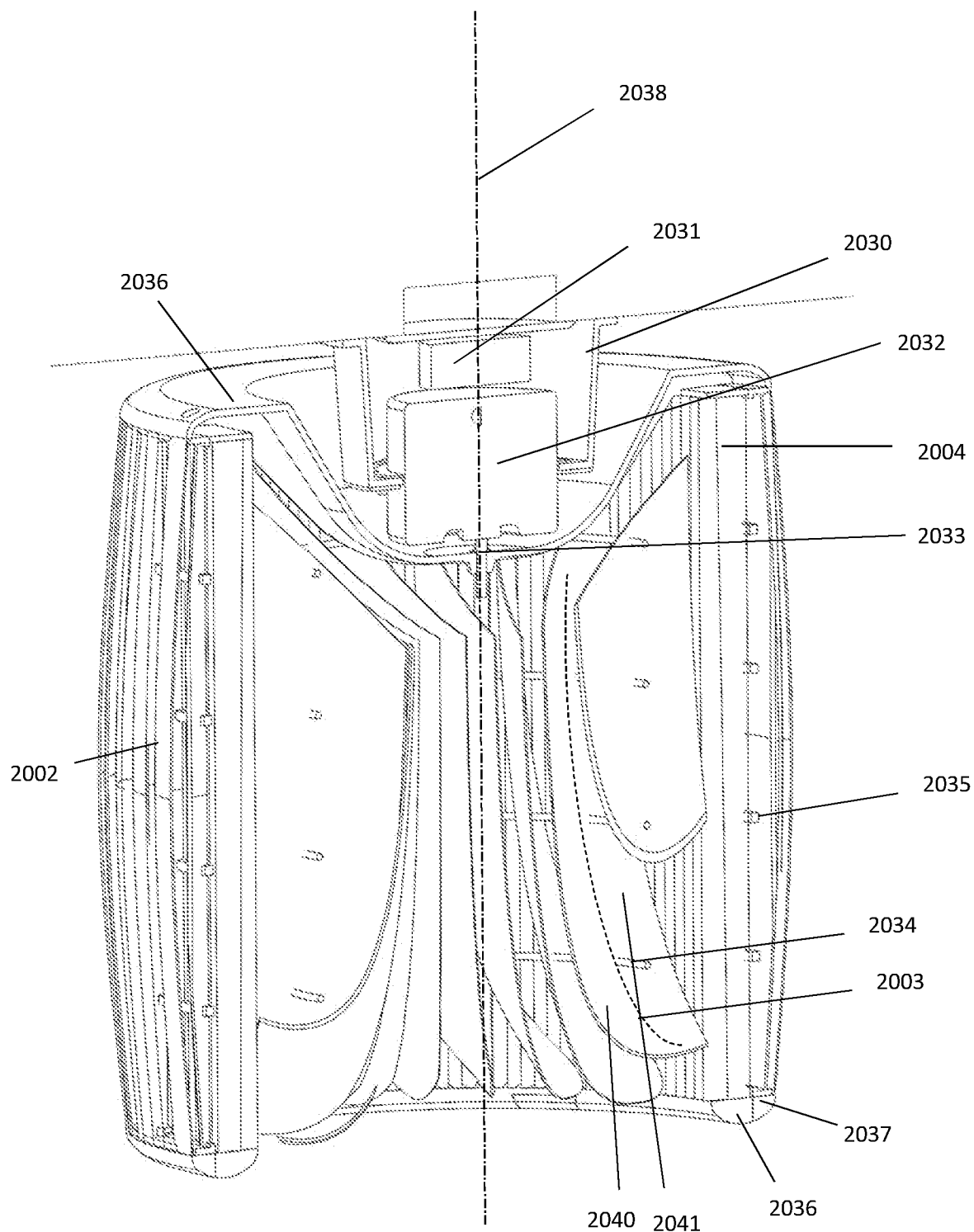

FIG. 203—Ceiling fan assembly, cross section oblique view from above

Figure 204:
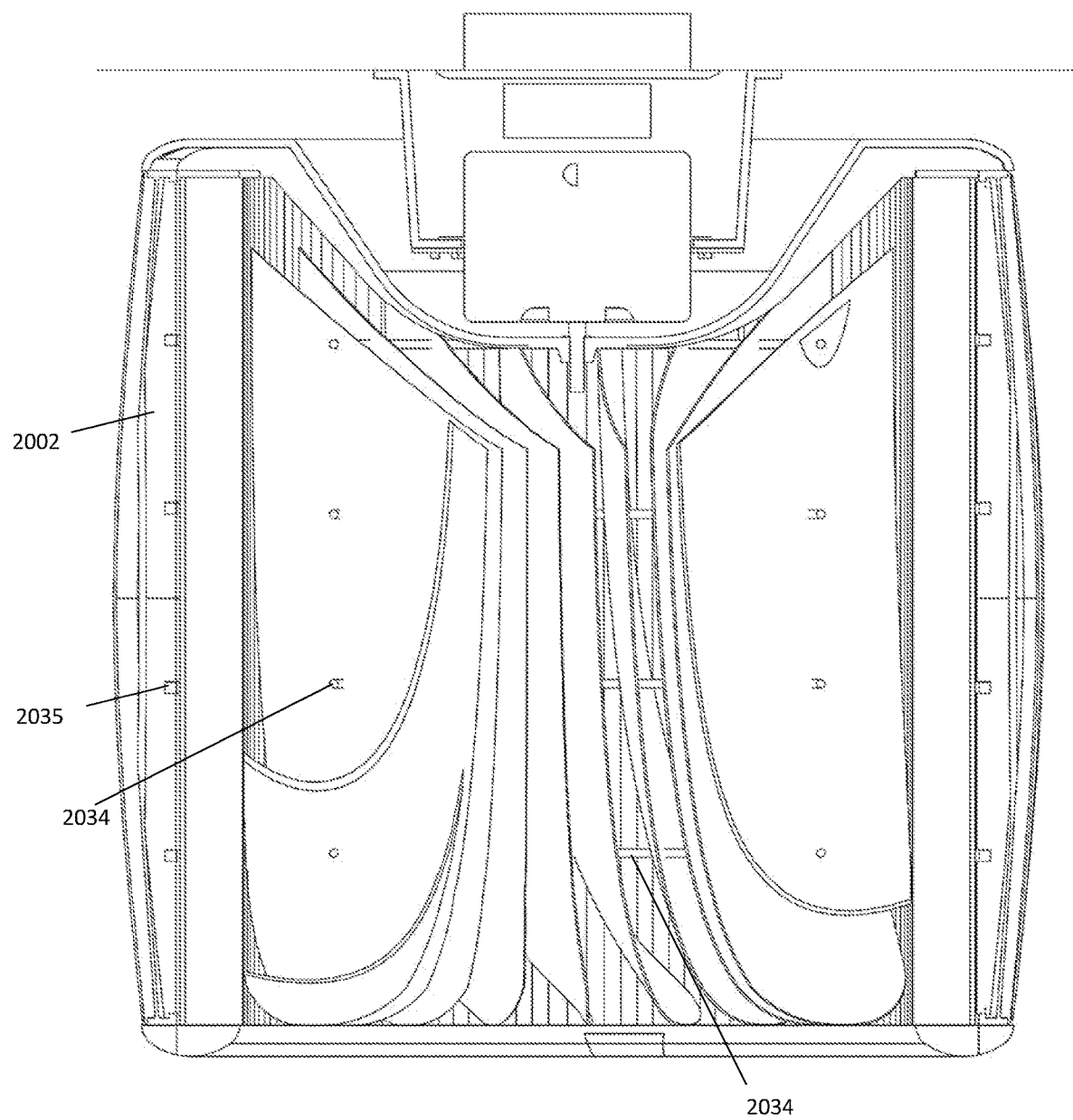

FIG. 204—Ceiling fan assembly, cross section side view

Figure 205:
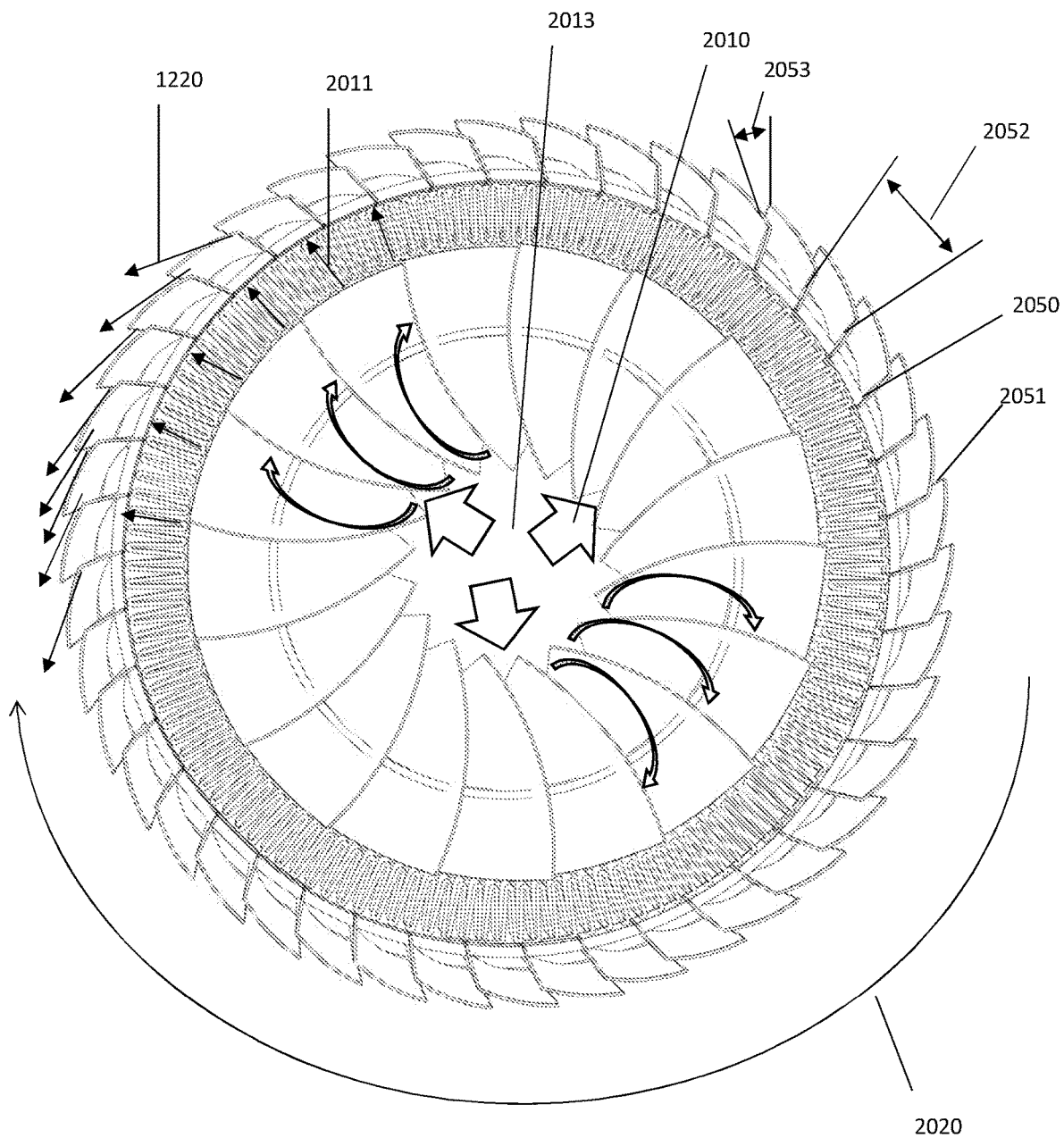

FIG. 205—Ceiling fan assembly, view from below

Figure 206:
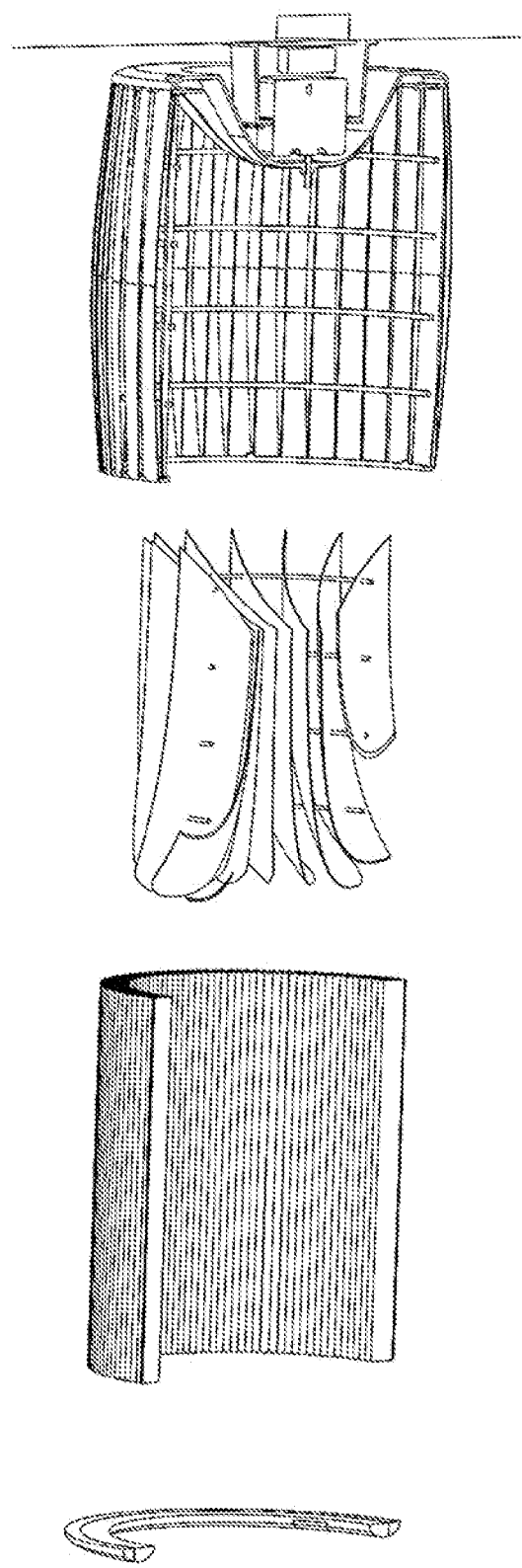

FIG. 206—Ceiling fan assembly, cross section, exploded view

Figure 207:
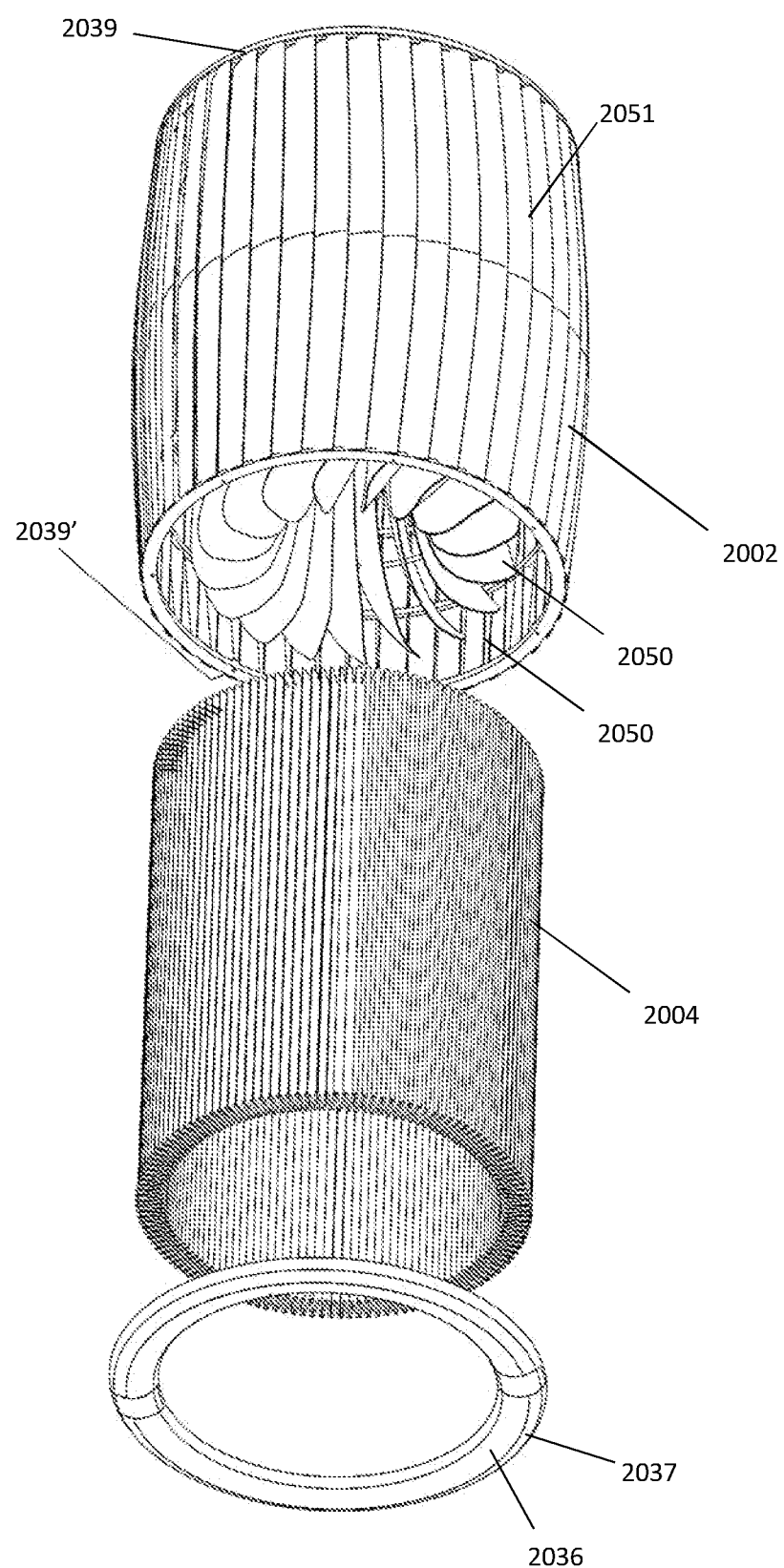

FIG. 207—Ceiling fan assembly, cross section, partially exploded view

Figure 208:
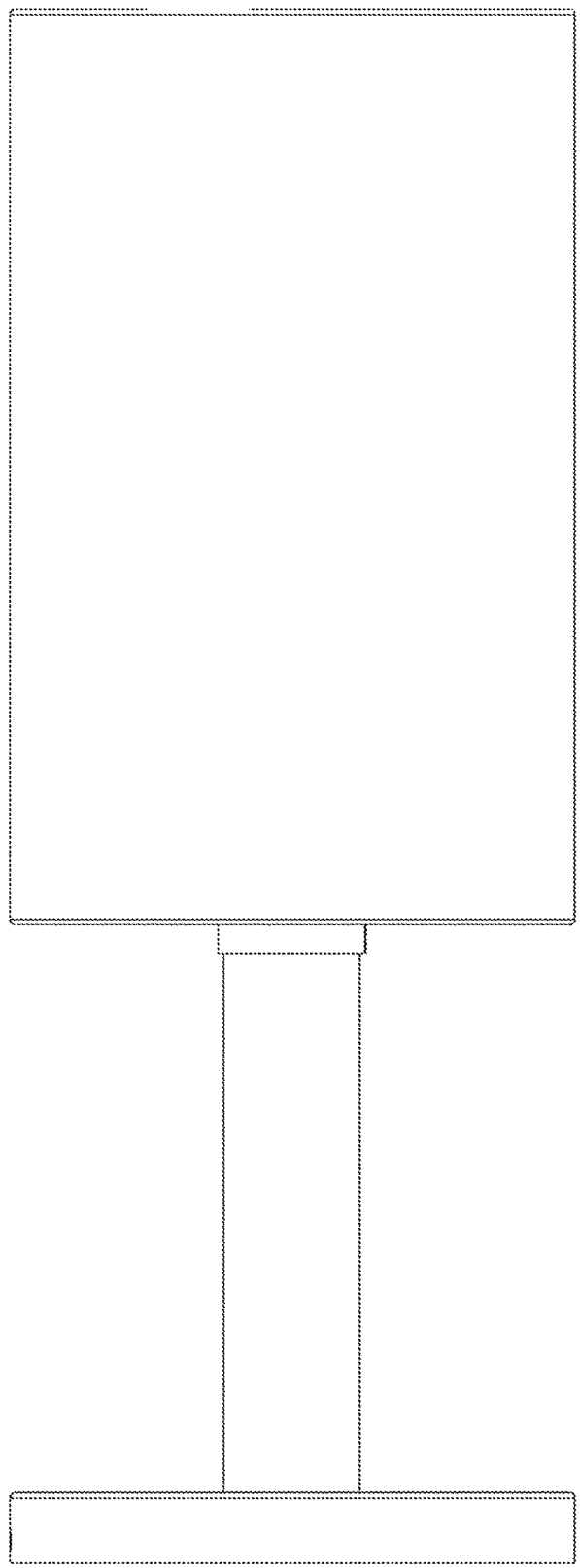

FIG. 208—Table fan assembly, side view

Figure 210:
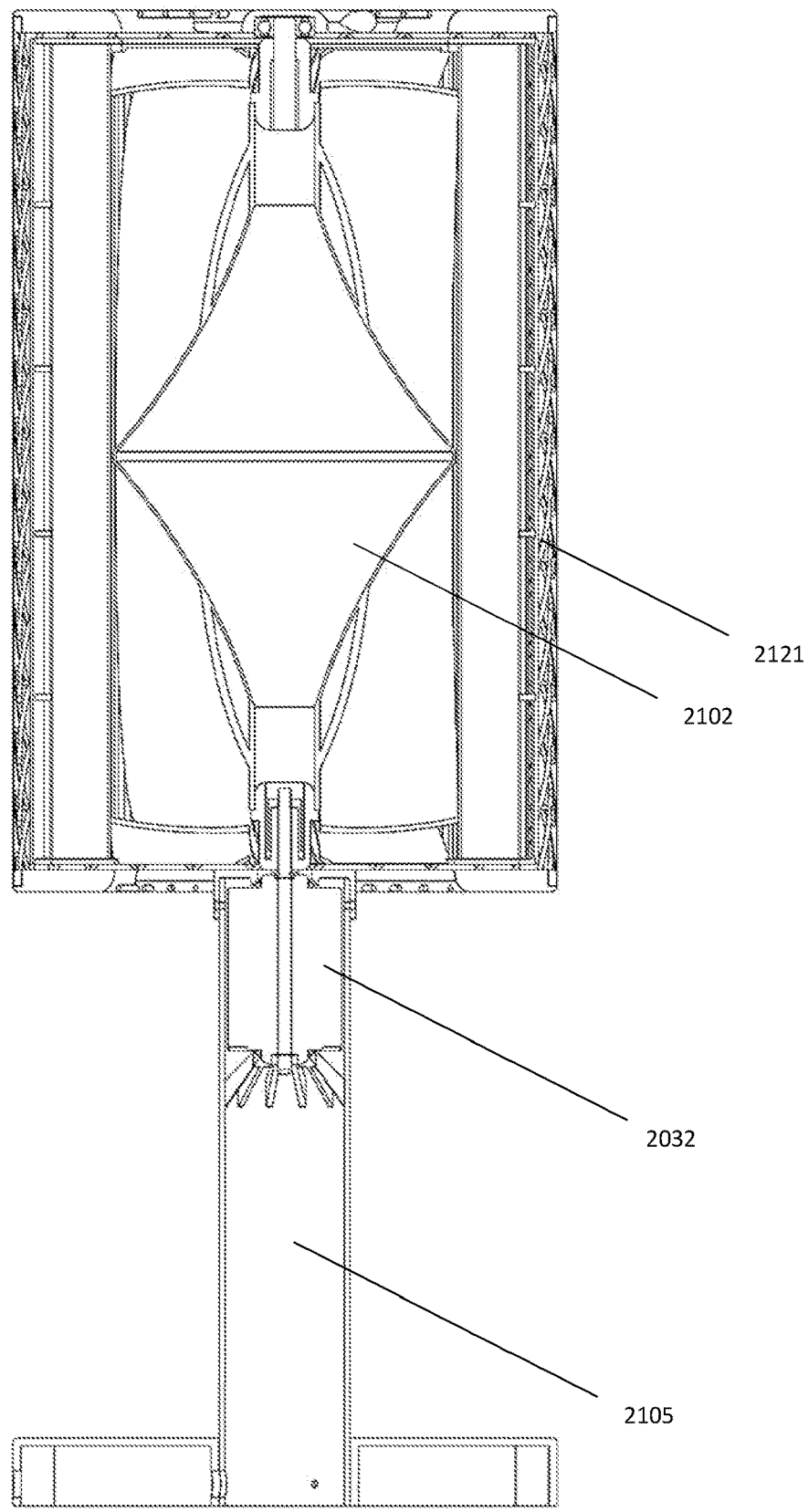
Figure 211:
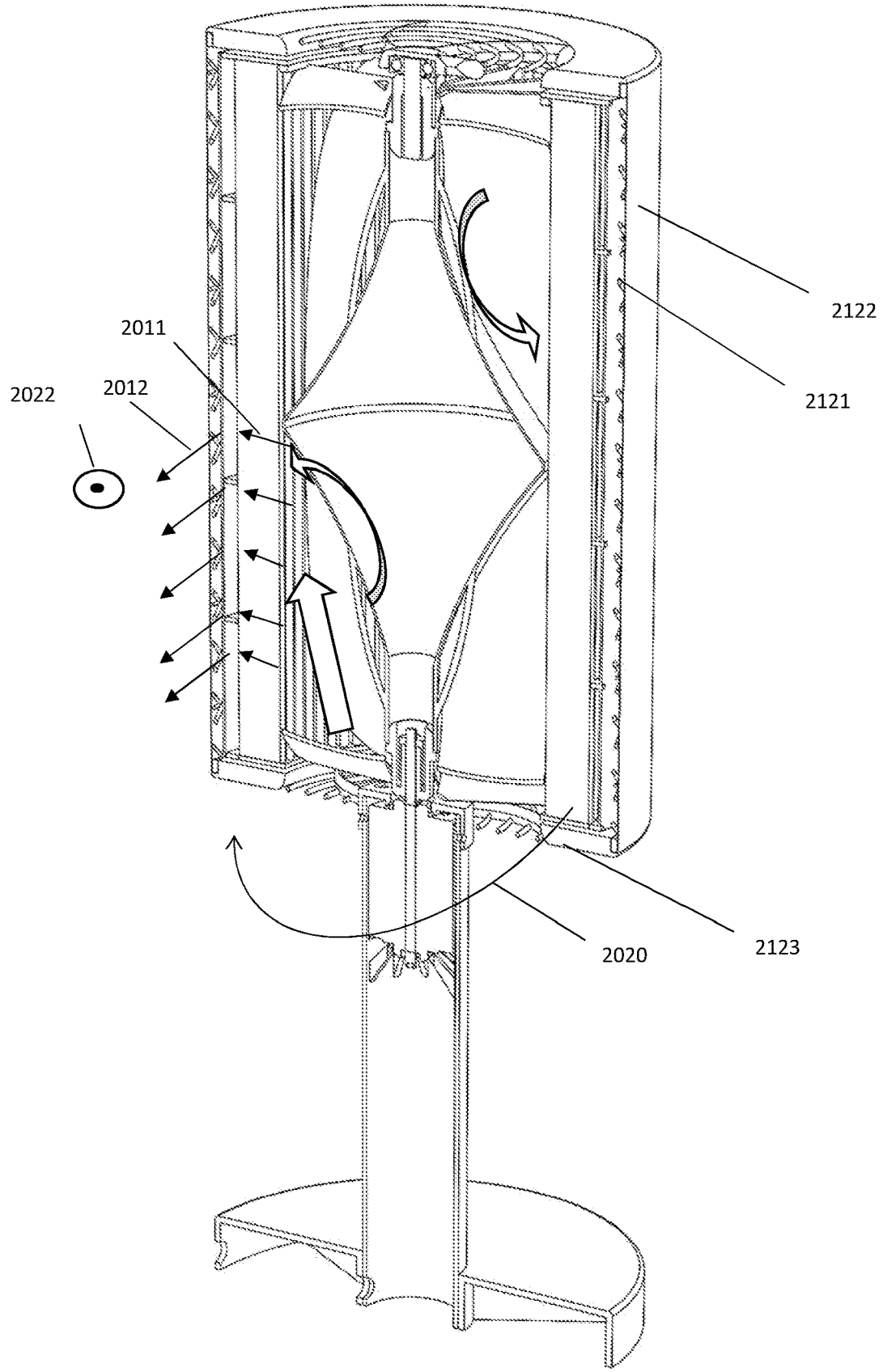
Figure 213A:
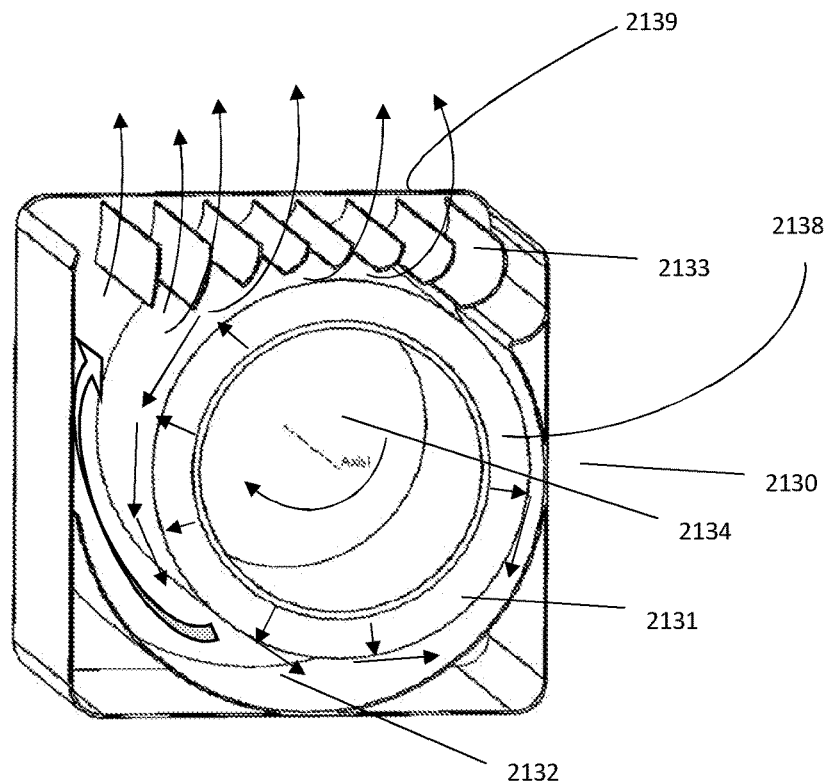
Figure 213B:
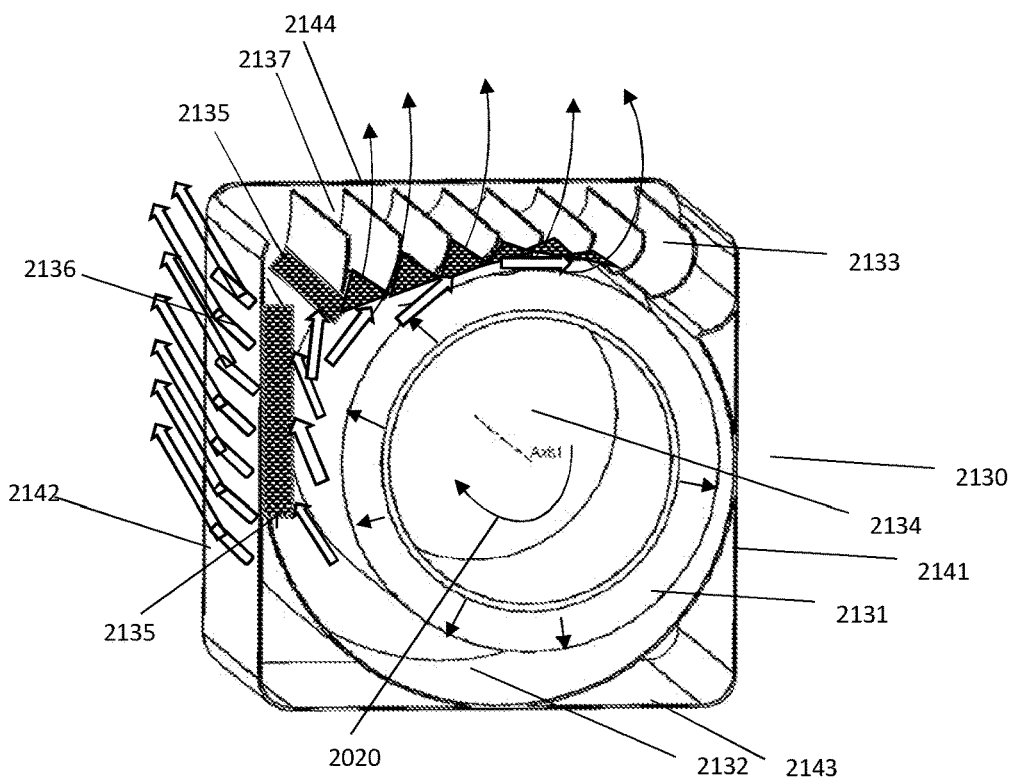
Figure 214B:
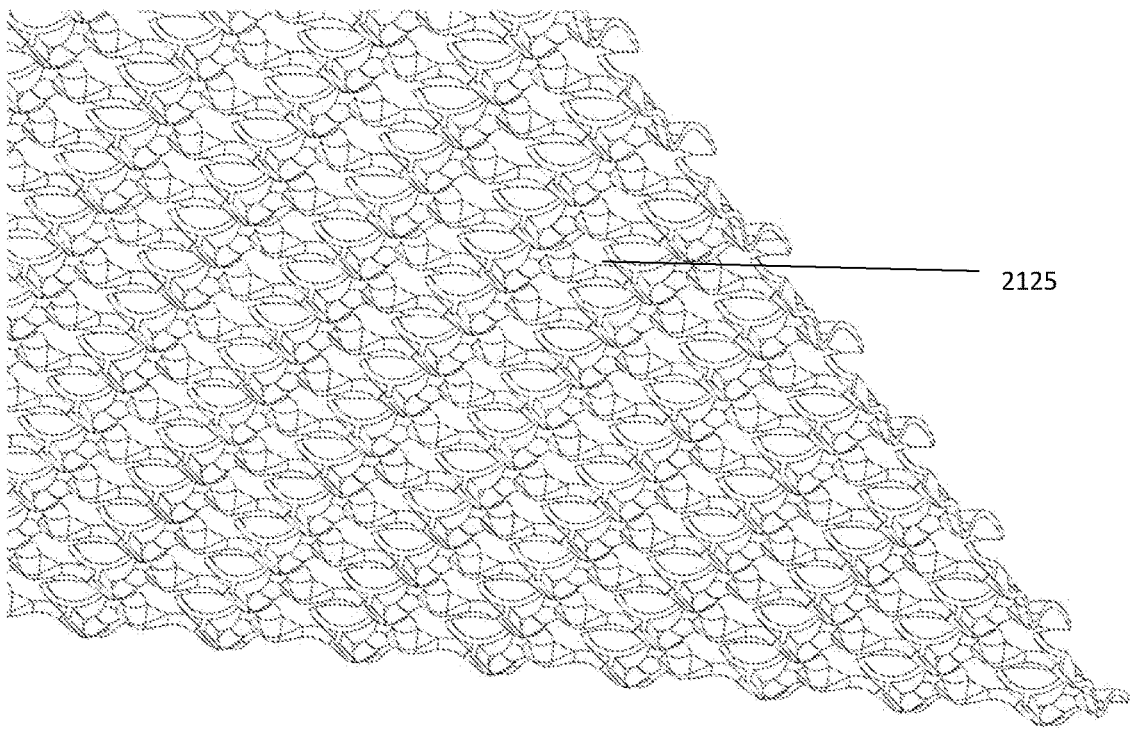
Figure 216A:
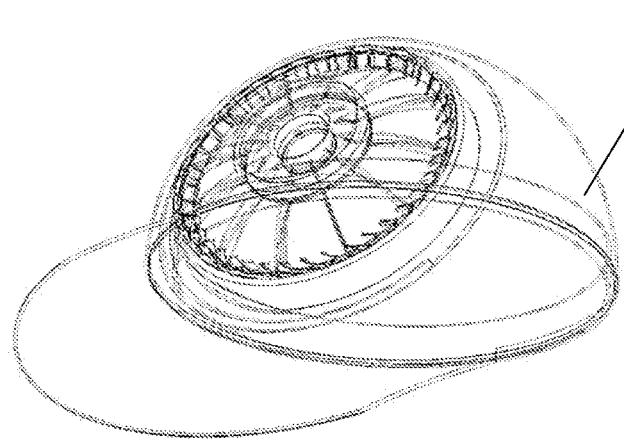
Figure 216B:
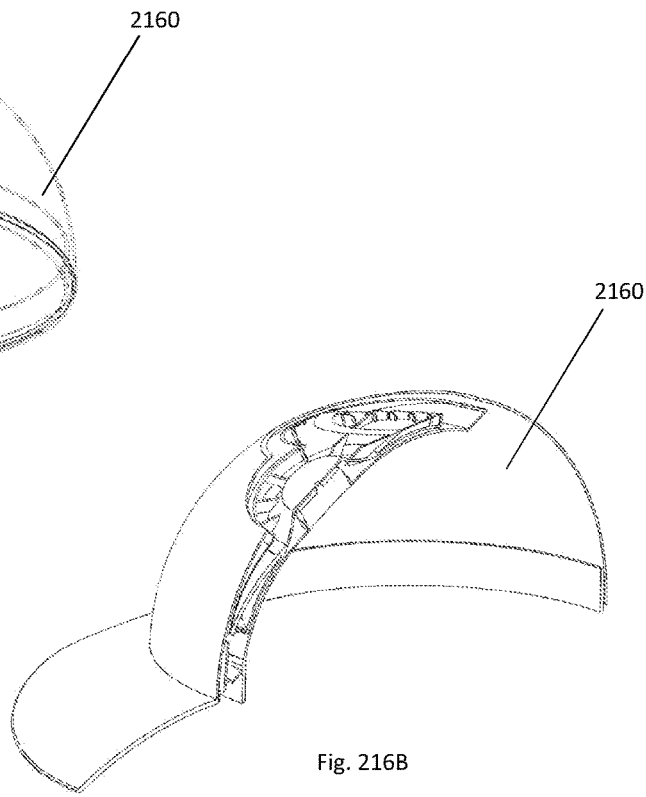
Figure 216C:
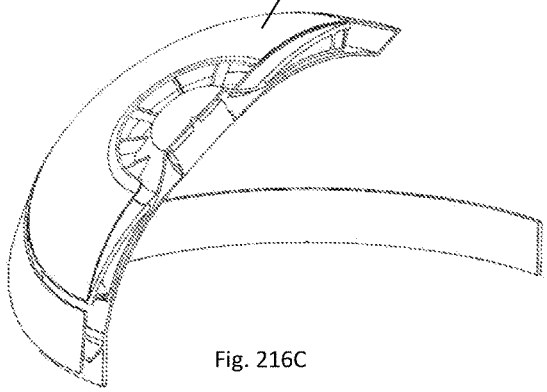
Figure 216D:
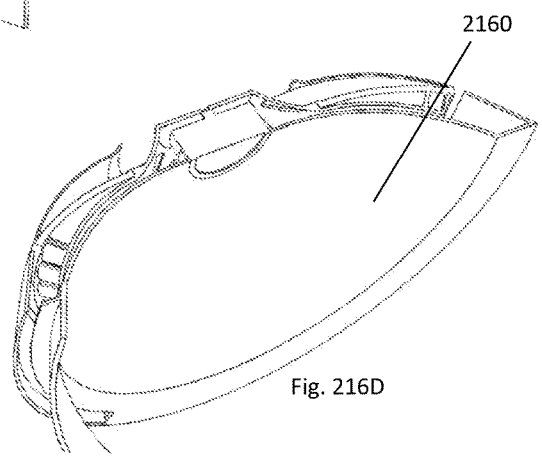

FIG. 209—Table fan assembly, view from above
FIG. 210—Table fan assembly, cross section side view
FIG. 211—Table fan assembly, cross section oblique view from above
FIG. 212A—Table fan assembly exploded view, longitudinal formed outer foils
FIG. 212B—Table fan assembly exploded view, concentric cylinder shaped solid cover
FIG. 213A—Floor fan assembly principle, longitudinal formed outer foils
FIG. 213B—Floor fan assembly principle, air director mesh
FIG. 214A-B—air director mesh, inside
FIG. 215A-C—air director mesh, outside
FIG. 216A-B—Caps embodiment and cross section side view
FIG. 216A-B—Helmet embodiment cross section side views In the following description the use of specific terms shall be interpreted widely and at least in the meaning as defined in the following:

CMH: Cubic Meter per Hour

CADR: Clean Air Delivery Rate, typically 3 values are measured: Smoke, pollen and dust. CADR is normally measured according to the ANSI/AHAM AC-1 standard, giving a value of the fraction volume of a standard 28.5 M3 room that is filtered to remove all particles of either smoke, pollen or dust in the particular fraction multiplied by the flow throughput. In other words, the rate of delivered cleaned air.

Air: The device of the invention is primarily adaptable to be used for air filtering, but the device and system may be used in any type of gaseous environment. When the term "air" is used in this document, it shall be understood to comprise the meaning of any type of gas.

Now the invention will be described in more detail, with references to the figures where appropriate.

FIG. 201 to 207 illustrates a first embodiment of the invention, wherein the ceiling mounted air fan/filter assembly 2001 comprising a rotating fan assembly consisting of at least a set of circularly mounted fan blades 2003 each mounted in a longitudinal direction 2100 providing an axial fan shape at an intake section 2040 and a radial fan shape at the exit section 2041, and when the fan/filter assembly rotates 2020 around a longitudinal center axis 2038, it is a spinner of the entering air.

The air flow generated by the fan blade 3 is distributed along the inside of a filter 2004 comprised in the air fan/filter assembly 2001. The filter 2004 may be formed as a circular concentric sleeve of for example a pleated shaped filter media, mounted outside the circle of longitudinal fan blades 2003. Other filter materials may be used. The filter 2004 is rotationally mounted to the fan blades 2003, and rotates around the longitudinal center axis 2038 together with the fan blades 2003.

The fan blades 2003 may be shaped to meet the entering air flow 2010 with matching foil angle and to pre-spin the air to exert radial pressure to the filter 2004. The air is partly pushed by the blades 2003 and partly pulled into the inner duct 2013 by the suction generated by the rotating filter 2004 and outer frame 2002. The figures illustrate an embodiment wherein the air is pulled into the fan/filter assembly 2001 only from the underside, and the top side of the fan/filter assembly 2001 is closed by a circularly formed end cap 2036. It should be understood that in a different embodiment, the end cap may be air permeable, formed as a mesh, or a plate, or other, comprising openings to let air through in a similar way, and wherein the fan blades 2003 are formed to propel air from both longitudinal openings of the fan/filter assembly 2001, from below and from above, when the fan/filter assembly 2001 is rotating. The fan blade assembly may comprise one or more armor rings 34 providing an even distance between the blades 2003.

The air fan/filter assembly 2001 further comprise a set of longitudinal formed outer foils 2002 arranged around the filter 2004 and fan blades 2003. The outer foils 2002 being rotationally connected to the filter 2004 and the fan blades 2003, and arranged to have a generally tangential direction relative the outside of the filter 2004, wherein an inner side edge 2050 are arranged closer to the outside of the filter 2004, and an outer side edge 2051 being arranged to lie radially outside the inner side edge 2050 of the neighbor outer foil 2002 in the opposite spinning direction 2020. The inflow area/distance 2052 defined by the area between all the inner side edges 2050 of the outer foils 2002 are larger than the outflow area defined by the area/distance 2053 between all the outer side edges 2051 of the outer foils 2002, and thus create a plurality of low noise air directing devices, wherein the outflow area form a type of outlet nozzle 2053.

The outer foils 2002 may be hinged to a frame 2035, 2039, 2039', and the nozzle openings 2053 may be changed by altering the foil 2002 direction relative the outside of the filter 2004, and thereby altering the outflow areas. The changing of the angle of the outer foils may be continuous, or according to a set of predefined angles, and the changing of the angle may be provided by a manually operated arrangement or an automatic or remotely operated arrangement.

The outer foils 2002 assembly may comprise one or more foil armor rings 2035 for maintenance of the outer foils 2002 form and the distance between them.

The outer foils 2002 assembly distance between them may be provided in a non-periodical pattern which may enhance noise reduction further.

When the air fan/filter assembly 2001 rotates air flow 2010 is pulled into the inner duct 2013 of the air fan/filter assembly 2001 from the below (optionally from both below and above), and the energy imposed on the air flow by the fan blades 2003, is partly used to push the air through 2011 the filter, and partly to increase the air flow speed through 2012 the low noise air directing device outlet openings of the outer foils 2002. The air is thus thrown out of the air fan/filter assembly 2001 in the opposite direction of the spinning direction 2020 of the air fan/filter assembly 2001.

The effect of the low noise air directing device jet generating outer foils 2002 is that all or a portion of the tangential air flow speed exiting from the filter 2004 is eliminated, thus draught and noise is also eliminated/reduced.

The invention can provide the same Clean Air Delivery Rate, CADR, with a smaller product size (diameter) and less power consumption than compared with prior art devices. The result is that highly effective pollen and dust filtering may be provided for domestic homes with limited ceiling height.

Without a static exit grille and the noise related to air passing such openings, the roof embodiment of the invention open for use of lower grade, higher permeability filters, enabling to shift a much higher volume of pollen cleaned air without adding noise. For the table and floor embodiments, higher permeability through the filter 2004 will further eliminate noise components as the velocity of the reverse jets are increased. Hence, the tangential velocity and in turn the exit velocity through the exit vents are reduced.

In one embodiment of the invention, the outer foils 2002 may be arranged slightly diagonal (not shown) to the longitudinal direction 2100, in order to divert the air flow upwards or downward. In an even further embodiment the outer foils 2002 may be designed in a fishbone pattern out from an "equator"-level 2101 (not shown) and in that manner throw air upward from the upper half portion of the outer fouls 2002, and downwards from the lower half portion of the outer foils 2002.

In a further embodiment of invention, the outer foils may alter between two or more positions/orientations such that the air flow when exiting the air fan/filter assembly 2001 may be altered.

The position/orientation may be dynamically changeable by mechanical manual switch, remotely controlled, or automatically changing.

In an even further embodiment the outer foils 2002 may alter its position/orientation/angle between different mode of operations such as for example between: a position providing a first tangential air velocity by the -jet effect, and a position providing a second lower tangential air velocity. In a further embodiment it is possible to provide a plurality of positions. In the latter mode of operation it would be possible to operate the air fan/filter assembly 2001 in a way imitating a traditional ceiling fan.

In yet a further embodiment of the invention it is provided outer foils 2002 designed in various patterns to enable a multitude of various exiting air flow patterns, and in this way using the customized low noise air directing effect to meet custom needs related to sir flow pattern exiting the air fan/filter assembly 2001.

In an even further embodiment the low noise air directing device of the outer foils 2002 may be substituted by a concentric cylinder shaped solid cover 2124, 2125 comprising a plurality of jet nozzles 2150, as illustrated in FIGS. 212B, 214A and B, and FIGS. 215A, 215B and 215C. FIGS. 214 A and 214B illustrates one embodiment of a section of such concentric cylinder material seen from the inside 2125, the side facing the filter where the air stream is lead into 2151 the nozzles 2150, and FIGS. 215A, 215B and 215C illustrates a similar example embodiment section from the outside 2124 where the air flow jets out 2152 of the jet nozzles 2150. FIG. 212B illustrates the concentric cylinder shaped cover 2124, 2125 arranged in a table version air fan/filter assembly 80 as described below, but the concentric cylinder shaped cover 2124, 2125 may also be implemented both in the ceiling mounted air fan/filter assembly 2001 described above and the floor mounted air fan/filter assembly 2131 described below.

Further it may be provided a ceiling bracket 30 for mounting the air fan/filter assembly 2001 to a ceiling connection point comprising: electrical wiring for providing the motor and controller with power, controller, communication module and connectors 2031, and a motor 20 2032 provided with a motor axle 2033 for driving and controlling the air fan/filter assembly 2001.

The connection between the fan blades 2003, the filter 2004, and the outer foils 2002 may be provided by a circular end collar 2036, 2037 in the bottom end of the air fan/filter assembly 2001, and/or the end cap 2036 in the top end of the air fan/filter assembly 2001.

FIG. 206 and FIG. 207 illustrates the air fan/filter assembly 2001 in two versions of exploded views. Under maintenance as shown in FIG. 207 it may be possible to remove the filter 2004 by dismounting the circular end collar 2036, 2037 and then pull the filter out of the air fan/filter assembly 2001. A new filter may be inserted and the circular end collar 2036, 2037 reattached. The fan blades and outer foils are attached to the end cap 2036.

FIG. 208 to 212 illustrates an embodiment of the invention in a table version air fan/filter assembly 80. The same principles as above apply, with the addition of an optional mesh 2121 arranged around the air fan/filter assembly 80. for protection of accidental contact between the spinning outer foils and a person/animal. An air permeable fabric/cover 2122 may additionally be arranged outside the mesh 2121. Center cones 2102 is provided for additional channeling of air stream when input from both above and below. Motor 2032 may be arranged in the stand 2105, as well as other components for control an, power and cabling (not shown).

FIG. 211 illustrates how the air stream 2011 flows through the filter 2004, and the rest pressure of the air is channeled through the low noise air directing device jet generating outer concentric device 2002, 2124, 2125, and is thrown in a direction 2012 opposite to the rotating direction of the fan/filter assembly 2080. The direction of the exit air 2012 is illustrated with the arrowhead 2022 symbol for movement towards the reader opposite the rotating direction 2020.

In yet a further embodiment the table version air fan/filter assembly 2080 may be provided as a free hanging device from the ceiling, hanging for example in a power cord, or a line (battery powered).

A bottom cap 2 123 and a top cap 2123' is provided statically arranged to protect the underside as well as the top side of the air fan/filter assembly 80. The bottom cap 2123 and a top cap 2123' comprise in its inner portion a mesh covered opening corresponding in diameter to the inner diameter of the filter 2004. The bottom cap 2123 and a top cap 2123' inner portion lets the air flow into the air fan/filter assembly 2080. the mesh covers openings may also comprise a highly air permeable filter (not shown) for avoiding larger size dust particles to be blown into the filter 2004 of the air fan/filter assembly 80. The bottom cap 2123 and a top cap 2123' is connected to the stand 2105, the bottom cap 2123 directly, and the top cap 2123' via the mesh 2121/sleeve 2122 and the bottom cap 2123.

The mesh 2121 may be designed with only non-vertical mesh elements, as vertical elements have a louder noise pattern when a horizontal airstream passes through the mesh 2121. Diagonal mesh elements will have lower noise pattern.

The mesh 2121 and sleeve are statically connected to the stand 105.

It is also within the scope of the invention to provide a protection mesh 2121, as described for the table version, also on the ceiling mounted air fan/filter assembly 2001.

FIG. 213A, illustrates a principle sketch for a floor mounted casing 2130 wherein the air fan/filter assembly 2131 is only partially shown. A snail house like collector channel 2132 is arranged around the air fan/filter assembly 2131 to collect the air stream from the low noise air directing formed outer foils, and lead the air stream towards an opening in the top of the casing 2130. The top opening 2137 comprise air directing foils 2133 to direct the airflow for example directly upwards.

In a further embodiment the floor mounted casing 2130 may be partially or fully covered by a high permeability fabric or cover (not shown) to prevent any accidental items to come into the air outlets 2136, 2137.

The floor mounted casing 2130 is provided in two embodiments, one with above defined fan/filter assembly 2001 as described in FIG. 213A, and one wherein the fan/filter assembly 2001 is provided without the outer low noise air directing device jet, but with an air director mesh 2135 to reduce the output velocity of the fan/filter assembly as described in FIG. 213B.

The an air director mesh 2135 arranged between the casing 2130 and the rotating assembly 2131 will reduce the tangential velocity, wherein the air director mesh 2135 is designed for optimal even throughput over the air director mesh 2135. By choosing a fine mesh it is possible to dampen the noise generating turbulence and at the same time reduce the tangential velocity. In other words: Invention is balancing the normal and the tangential permeability by the mesh size and form to avoid noise generating turbulence when air stream passes the air director mesh 2135 threading.

The permeability of the air director mesh 2135 is balanced such that the radial flow throughput is evenly distributed over the desired exit opening 2136, 2137.

The reduce exit velocity gives significantly decrease potential noise from turbulence, which in turn provides freedom to the design of the exit grille 2133, 2136 such that the shape/form can be chosen according to desired design criteria of the casing. The balanced air director mesh for even distribution of air partially conserves the local velocity direction.

In a further embodiment of the floor mounted assembly, the air fan/filter assembly 2131 may be provided without the outer foils 2002. Such version may throw the air in a vertical upward direction, and since the draught or inconvenience effects may be ignored provided a device able to purify a higher volume of air. The casing 2130 and directing foils 2133 controls the exiting air flow form the air fan/filter assembly 2131.

The floor mounted air fan/filter assembly 2131 comprise a fan having an axial fan which provides an operation mode of a radial fan. A unique feature with invention is that the filter 2004 is mounted around the fan/impeller 2003 being rotational connected. The air fan/filter assembly 2131 may further comprise a filter/mesh module covering the air intake orifice 2134 in order to catch larger dust particles.

The floor mounted air fan/filter assembly 2131 may have an air intake orifice 2134 on both sides of the fan, similarly to the table version air fan/filter assembly 2080, and thus optionally be provided with two filter/mesh modules covering each air intake orifices 2134.

The filter/mesh module may comprise a self-cleaning function.

Common for all the above described embodiments is the possibilities to combine one or more of additional features such as: carbon filtering, ionizing, light, heating, scent addition, humidification, loudspeakers and others.

Carbon filtering may for example be incorporated with the filter 2004 in a sandwich type arrangement, such that the carbon filter rotates with the filter 2004.

Lighting may be an additional feature, which when implemented with the ceiling mounted low noise emitting air purifying device according to the invention may be provided with a socket for lighting device. The socket may be arranged on the top- or bottom-side of the motor 2032, and may use same power source/supply as the motor 2032.

All embodiments of the invention may comprise one or more of: electrical wiring for providing the motor and controller with power, controller, communication module and connectors 2031, and a motor 2032. Controller and communication module may communicate with a remote device either over a wired or a wireless communication channel. The remote device may be one of or similarly to: simple physical switch, Smart phone APP, cloud service and cloud connected computer application, Wireless communication any be any type of communication protocol, including Wi-Fi and Bluetooth.

In an even further embodiment a very narrow implementation of the invention is arranged in a headgear, such as a helmet, caps, protection hood or the like to provide a constant stream of purified air towards the facial area of the parson wearing the headgear. The air may be delivered concentrated without or very low noise. One example of such implementation is illustrated in FIG. 216.

The invention can also be described as a first device embodiment of a low noise emitting air purifying device comprising:
- a rotating fan assembly 2001, 2080, 2131 comprising:
- a radial fan, the radial fan comprising a plurality of fan blades 2003 rotating around a longitudinal center axis 38, wherein the fan blades 2003 are mounted in a longitudinal direction 100 providing an axial fan shape at an intake section 2040 and a radial fan shape at the exit section 2041, a filter 2004 mounted radially outside the radial fan, wherein the filter 2004 is rotationally connected to the radial fan, and
- the low noise emitting air purifying device further comprising:
- a low noise air directing device arranged peripherally to the fan assembly, and
- a motor 32 for rotating the fan assembly in a rotating direction 2020.

A second device embodiment of the low noise emitting air purifying device according to the first device embodiment, wherein the air directing device direct the airflow with a directional distribution to provide optimal flow distribution.

A third device embodiment of the low noise emitting air purifying device according to the first or second device embodiment, wherein the air directing device is rotationally connected to the fan assembly 2001, 2080, 2131.

A fourth device embodiment of the low noise emitting air purifying device according to any one of the first to third device embodiment, wherein the air directing device comprising: nozzle openings 2053, 2150 for providing air jet flow 2012 in a direction opposite to the rotating direction 2020 of the rotating fan assembly 2001, 2080, 2131 to reduce power consumption and exit air velocity.

A fifth device embodiment of the low noise emitting air purifying device according to the fourth device embodiment, wherein the nozzle openings 2053, 2150 are provided with a non-periodical pattern.

A sixth device embodiment of the low noise emitting air purifying device according to any one of the first to fifth device embodiment, wherein the air directing device comprising: a plurality of longitudinal formed outer foils 2002 arranged around the filter 2004 and fan blades 2003, wherein the outer foils are arranged to direct the airflow out of the air purifying device in a defined pattern, and the outer foils 2002 are rotational connected to the rotating fan assembly 2001, 2080, 2131.

A seventh device embodiment of the low noise emitting air purifying device according to the sixth device embodiment, wherein the outer foils 2002 are hinged to a frame 2035, 2039, 2039', and the nozzle openings 2053 may be altered between two or more outflow areas.

An eighth device embodiment of the low noise emitting air purifying device according to the seventh device embodiment, wherein the changing of the angle of the outer foils 2002 is continuous, and the changing of the angle may be provided by a manually operated arrangement, or an automatic, or a remotely operated arrangement.

A ninth device embodiment of the low noise emitting air purifying device according to the fourth or fifth device embodiment, wherein the air directing device comprising a concentric cylinder shaped solid cover 2124, 2125 having nozzle openings 2150 for providing the air jet flow 2152 having a direction 2012 opposite to the rotating direction 2020 of the rotating fan assembly 2001, 2080, 2131.

A tenth device embodiment of the low noise emitting air purifying device according to any one of the first to ninth device embodiment, further comprising a ceiling bracket 2030 for mounting the air fan/filter assembly 2001 to a ceiling connection point.

An eleventh device embodiment of the low noise emitting air purifying device according to any one of the first to ninth device embodiment, further comprising a stand 2105 for arranging the air fan/filter assembly 2080 on a table.

An twelfth device embodiment of the low noise emitting air purifying device according to any one of the first to ninth device embodiment, comprising:
  a floor mounted casing 2130 having a front side 2138 and a back side 2139, wherein at least one of the front side 2138 and the back side 2139 comprise an air intake orifice 2134, two sides 2141, 2142, a bottom side 2143 and a top side 2144, wherein
  the top side 2144 comprising an opening 2137, and the floor mounted casing 2130 further comprise a collector channel 2132 wherein the rotating fan assembly 2131 is horizontally mounted.

A thirteenth device embodiment of the low noise emitting air purifying device according to the twelfth device embodiment, wherein the collector channel 2132 having a snail house like design and being arranged around the rotating fan assembly 2131 to collect the air stream from the rotating fan assembly 2131 and lead the air stream towards the opening 2137 in the top side 2144 of the casing 2130, and
  the top side 144 comprising air directing foils 2133 arranged to direct the air flow, for example directly upwards.

A fourteenth device embodiment of the low noise emitting air purifying device according to any one of the first to second device embodiment, comprising:
  a floor mounted casing 2130 having a front side 2138 and a back side 2139, wherein at least one of the front side 2138 and the back side 2139 comprise an air intake orifice 2134, two sides 2141, 2142, a bottom side 2143 and a top side 2144, wherein the top side 2144 comprising an opening 2137, and the floor mounted casing 2130 further comprise a collector channel 2132 wherein the rotating fan assembly 2131 is horizontally mounted.

A fifteenth device embodiment of the low noise emitting air purifying device according to the fourteenth device embodiment, wherein the side 2141, 2142 being arranged upstream relative the top side 14 in the spinning direction 2020 of the rotating fan assembly 2131 comprising air outlets 2136.

A sixteenth device embodiment of the low noise emitting air purifying device according to any one of the fourteenth to fifteenth device embodiment, further comprising one or more air director mesh 2135 arranged between the casing 2130 and the rotating assembly 2131 for the radial flow throughput to be evenly distributed over the desired exit openings 2136, 2137.

A seventeenth device embodiment of the low noise emitting air purifying device according to any one of the fourteenth to sixteenth device embodiment, wherein the top side 2144 comprising air directing foils 2133 arranged to direct the air flow, for example directly upwards.

An eighteenth device embodiment of the low noise emitting air purifying device according to any one of the first to seventeenth device embodiment, further comprising one or more of carbon filtering. ionizing, light, heating, scent addition, humidification, and loudspeaker.

A nineteenth device embodiment of the low noise emitting air purifying device according to any one of the first to ninth and twelfth to eighteenth device embodiment, wherein the low noise emitting air purifying device is arranged in a headgear to send purified air towards the facial area of a person wearing the headgear.

The invention claimed is:

1. An air filter device, comprising:
  at least one pleated air filter; and
  a motor for rotating the at least one pleated air filter, wherein the at least one pleated air filter has a cylindrical form, and wherein the air filter device is further designed so that a dimensionless number (Gu) is greater than 0.8,
  wherein the Gu is determined based on a height of the at least one rotating pleated air filter ($f_h$), an outer pressure generating radius ($r_o$), an inner radius of the at least one rotating pleated air filter ($r_i$), a pleat spacing ($p_s$), and a filter efficiency ($\varepsilon$), such that $Gu=f_h*p_r/(2*r_o*\varepsilon^{\wedge 1/4})$, where $p_r=(r_o-r_i)/p_s$,
  wherein the Gu correlates to a function of a commercial usefulness based on, and accounting for, needs of a customer comprising one or more of a clean air delivery rate (CADR), a noise emitted (dB), a product size, a product functioning, or a cost,
  wherein the pleat spacing is a distance between two adjacent pleat tops on the inner radius and the filter efficiency is an American Society of Heating, Refrigerating, and Air-Conditioning Engineers (ASHRAE) efficiency,
  the air filter device further comprising:
  radial fan blades arranged radially adjacent to the at least one rotating pleated air filter,
  the radial fan blades being rotationally connected to the at least one rotating pleated air filter, wherein the radial fan blades are formed as a radial flow impeller arranged inside the at least one rotating pleated air filter, and
  the radial fan blades are formed with an axial angle of attack.

2. The air filter device of claim 1, wherein the Gu is greater than 1.2.

3. The air filter device of claim 1, wherein the Gu is greater than 1.5.

4. The air filter device of claim 1, wherein the cylindrical form is open in one or both ends, such that when the at least one rotating pleated air filter rotates, centrifugal forces drive air through the at least one rotating pleated air filter resulting in a suction upstream of the at least one rotating pleated air filter sucking air into and through the one or both open ends, and filtered air exiting radially outwards downstream of the at least one rotating pleated air filter in all directions.

5. The air filter device of claim 1,
  wherein the radial fan blades having a total blade height being greater than or equal to 12 millimeters (mm).

6. The air filter device of claim 5, wherein the total blade height is greater than or equal to 15 mm.

7. The air filter device of claim 5, wherein a radial blade geometry comprises a forward attacking angle ($\alpha_b$) between fifteen degrees (15°) and 75° relative an inner radius ($R_i$) of the at least one rotating pleated air filter.

8. The air filter device of claim 5, wherein the radial fan blades are formed as a radial flow impeller arranged outside the at least one rotating pleated air filter.

9. The air filter device of claim 1, further comprising:
an inflow impeller for providing spin to inflow air into the at least one rotating pleated air filter.

10. The air filter device of claim 9, wherein the inflow impeller and the radial flow impeller are combined as one impeller having blades in a morphed form, the one impeller working as an axial to radial fan for providing an even air flow along and into pleats of the at least one rotating pleated air filter.

11. The air filter device of claim 1, further comprising:
a pleated filter end cap connected to one or both longitudinal ends of the at least one rotating pleated air filter.

12. The air filter device of claim 1, further comprising:
one or more ring formed foils arranged at an entrance opening of the at least one rotating pleated air filter for directing inflowing air and for providing a safety grill to an interior of the at least one rotating pleated air filter.

13. The air filter device of claim 1, wherein an air barrier arranged mostly perpendicular to a longitudinal direction is provided at an inflow side of the at least one rotating pleated air filter, to prevent ambient air flow from mixing with the air flow exiting from the at least one rotating pleated air filter.

14. The air filter device of claim 1, further comprising air directing foils, the air directing foils being radially arranged around the at least one rotating pleated air filter.

15. The air filter device of claim 13, wherein one or more of the at least one rotating pleated air filter are mounted inside a chassis, wherein the chassis is equipped with inlet vents and outlet vents, and a collector for guidance of air exiting the one or more of the at least one rotating pleated air filter, in accordance with an air flow path generated by the at least one rotating pleated air filter.

16. The air filter device of claim 15, wherein a cross sectional area formed between the collector and a surface of the one or more of the at least one rotating pleated air filter, is gradually increasing along a circumference and rotation direction of the one or more of the at least one rotating pleated air filter, and wherein the collector encircles only a portion of a corresponding one or more of the at least one rotating pleated air filter.

17. The air filter device of claim 16, wherein the portion of a first of the one or more of the at least one rotating pleated air filter is not encircled by the collector and is directed substantially upwards.

18. The air filter device of claim 17, wherein a portion of a second of the one or more of the at least one rotating pleated air filter is not encircled by the collector and is directed substantially to the upward rotating side of the at least one rotating pleated air filter.

19. The air filter device of claim 16, further comprising a static air barrier arranged mostly perpendicular to an air inflow direction at the inflow side of the at least one rotating pleated air filter, the static air barrier having corresponding openings arranged at the inlet of the at least one rotating pleated filter, to prevent ambient air flow from mixing with the air flow exiting from the at least one rotating pleated air filter.

20. The air filter device of claim 1, further comprising a set of statically arranged longitudinal lamellas, encircling a rotating circular formed pleated air filter and reaching radially outwards and tangential in a direction of the exiting air flow to further improve a suction effect and an overall flow rate.

21. The air filter device of claim 1, wherein the at least one rotating pleated air filter has a conical shape, and a cone diameter is largest at an inflow opening, and the inner and outer radius values are defined as the average radius over the filter height.

22. The air filter device of claim 1, wherein the one rotating pleated air filter further comprises an integrated cone formed fan element arranged to taper from its largest diameter arranged at the deepest point for the air to exit through the at least one rotating pleated air filter, and the integrated cone tapers away from the at least one rotating pleated air filter inside towards an inflow area of the at least one rotating pleated air filter, such that better control of a distribution of a deeper air flow along an inner filter surface is provided.

23. The air filter device of claim 22, wherein two oppositely arranged cone formed fan elements with associated impellers ensure inflow air distribution from both sides of the rotating pleated air filter.

24. The air filter device of claim 1, further comprising a set of tiltable capsule formed blades arranged outside the at least one rotating pleated air filter for providing air channels with exit jets in-between for direction exiting air in preferred angles relative to a horizontal plane, each of the capsule formed blades having a capsule formed blades connector element at a longitudinal middle on the inside of each capsule formed blades.

25. The air filter device of claim 24, wherein the capsule formed blades connector element is a pivot pin, and each pivot pin is formed to be gripped by a corresponding gripping element on the longitudinal middle of an outside of the at least one rotating pleated air filter.

* * * * *